United States Patent
Turney et al.

(10) Patent No.: US 11,900,287 B2
(45) Date of Patent: Feb. 13, 2024

(54) MODEL PREDICTIVE MAINTENANCE SYSTEM WITH BUDGETARY CONSTRAINTS

(71) Applicant: Johnson Controls Technology Company, Auburn Hills, MI (US)

(72) Inventors: Robert D. Turney, Watertown, WI (US); Sudhi R. Sinha, Milwaukee, WI (US); Michael J. Wenzel, Grafton, WI (US); Mohammad N. Elbsat, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 572 days.

(21) Appl. No.: 16/457,314

(22) Filed: Jun. 28, 2019

(65) Prior Publication Data

US 2019/0325368 A1    Oct. 24, 2019

Related U.S. Application Data

(63) Continuation-in-part of application No. 15/895,836, filed on Feb. 13, 2018, now Pat. No. 11,487,277.
(Continued)

(51) Int. Cl.
*G06Q 10/20* (2023.01)
*G06Q 10/0631* (2023.01)
*G06N 5/02* (2023.01)

(52) U.S. Cl.
CPC ......... *G06Q 10/06315* (2013.01); *G06N 5/02* (2013.01); *G06Q 10/20* (2013.01)

(58) Field of Classification Search
CPC ............ G05B 23/0283; G05B 23/0294; G06Q 30/0206; G06Q 10/20; G06Q 10/06315; G06N 5/02; G06N 5/01; G06N 7/01
(Continued)

(56) References Cited

U.S. PATENT DOCUMENTS

| 5,216,612 A | 6/1993 | Cornett et al. |
| 5,301,109 A | 4/1994 | Landauer et al. |

(Continued)

FOREIGN PATENT DOCUMENTS

| CA | 2499695 | 4/2004 |
| CN | 101415011 A | 4/2009 |

(Continued)

OTHER PUBLICATIONS

U.S. Appl. No. 16/457,314, filed Jun. 28, 2019, Turney et al.
(Continued)

*Primary Examiner* — Juan C Ochoa
(74) *Attorney, Agent, or Firm* — Foley & Lardner LLP

(57) ABSTRACT

A model predictive maintenance (MPM) system for building equipment. The MPM system includes an equipment controller configured to operate the building equipment to affect a variable state or condition in a building. The MPM system includes an operational cost predictor configured to predict a cost of operating the building equipment over a duration of an optimization period. The MPM system includes a budget manager configured to generate one or more budget constraints. The MPM system includes an objective function optimizer configured to optimize an objective function subject to the one or more budget constraints to determine a maintenance and replacement schedule for the building equipment. The objective function includes maintenance and replacement costs of the building equipment and the predicted cost of operating the building equipment.

20 Claims, 22 Drawing Sheets

Related U.S. Application Data

(60) Provisional application No. 62/511,113, filed on May 25, 2017.

(58) Field of Classification Search
USPC .................................................. 703/2, 6
See application file for complete search history.

(56) References Cited

U.S. PATENT DOCUMENTS

| | | |
|---|---|---|
| 5,446,677 A | 8/1995 | Jensen et al. |
| 5,581,478 A | 12/1996 | Cruse et al. |
| 5,630,070 A | 5/1997 | Dietrich et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,062,361 B1 | 6/2006 | Lane |
| 7,124,059 B2 | 10/2006 | Wetzer et al. |
| 7,401,057 B2 | 7/2008 | Eder |
| 7,457,762 B2 | 11/2008 | Wetzer et al. |
| 7,464,046 B2 | 12/2008 | Wilson et al. |
| 7,552,467 B2 | 6/2009 | Lindsay |
| 7,627,544 B2 | 12/2009 | Chkodrov et al. |
| 7,693,735 B2 | 4/2010 | Carmi et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,014,892 B2 | 9/2011 | Glasser |
| 8,078,330 B2 | 12/2011 | Brickfield et al. |
| 8,104,044 B1 | 1/2012 | Scofield et al. |
| 8,126,574 B2 | 2/2012 | Discenzo et al. |
| 8,170,893 B1 | 5/2012 | Rossi |
| 8,229,470 B1 | 7/2012 | Ranjan et al. |
| 8,396,571 B2 | 3/2013 | Costiner et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,880,962 B2 | 11/2014 | Hosking et al. |
| 8,903,554 B2 | 12/2014 | Stagner |
| 8,941,465 B2 | 1/2015 | Pineau et al. |
| 8,990,127 B2 | 3/2015 | Taylor |
| 9,058,568 B2 | 6/2015 | Hosking et al. |
| 9,058,569 B2 | 6/2015 | Hosking et al. |
| 9,070,113 B2 | 6/2015 | Shafiee et al. |
| 9,116,978 B2 | 8/2015 | Park et al. |
| 9,185,095 B1 | 11/2015 | Moritz et al. |
| 9,185,176 B2 | 11/2015 | Nielsen et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,235,847 B2 | 1/2016 | Greene et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,424,693 B2 | 8/2016 | Rodrigues |
| 9,507,686 B2 | 11/2016 | Horn et al. |
| 9,514,577 B2 | 12/2016 | Ahn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,740,545 B2 | 8/2017 | Aisu et al. |
| 9,753,455 B2 | 9/2017 | Drees |
| 9,760,068 B2 | 9/2017 | Harkonen et al. |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,094,586 B2 | 10/2018 | Pavlovski et al. |
| 10,101,731 B2 | 10/2018 | Asmus et al. |
| 10,116,461 B2 | 10/2018 | Fairweather et al. |
| 10,169,454 B2 | 1/2019 | Ait-Mokhtar et al. |
| 10,171,586 B2 | 1/2019 | Shaashua et al. |
| 10,187,258 B2 | 1/2019 | Nagesh et al. |
| 10,190,793 B2 | 1/2019 | Drees et al. |
| 10,250,039 B2 | 4/2019 | Wenzel et al. |
| 10,359,748 B2 | 7/2019 | Elbsat et al. |
| 10,437,241 B2 * | 10/2019 | Higgins .................. G06Q 10/20 |
| 10,438,303 B2 | 10/2019 | Chen et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,591,875 B2 * | 3/2020 | Shanmugam ........ G05B 19/418 |
| 10,705,492 B2 | 7/2020 | Harvey |
| 10,708,078 B2 | 7/2020 | Harvey |
| 10,762,475 B2 | 9/2020 | Song et al. |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,003,175 B2 | 5/2021 | Xenos et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0072988 A1 | 6/2002 | Aram |
| 2002/0123864 A1 | 9/2002 | Eryurek et al. |
| 2002/0147506 A1 | 10/2002 | Eryurek et al. |
| 2002/0177909 A1 | 11/2002 | Fu et al. |

(56) References Cited

U.S. PATENT DOCUMENTS

| | | |
|---|---|---|
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0158803 A1 | 8/2003 | Darken et al. |
| 2003/0171851 A1 | 9/2003 | Brickfield et al. |
| 2003/0200059 A1 | 10/2003 | Ignatowski et al. |
| 2004/0049295 A1* | 3/2004 | Wojsznis ............ G05B 13/042 700/28 |
| 2004/0054564 A1 | 3/2004 | Fonseca et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0091004 A1 | 4/2005 | Parlos et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0005191 A1 | 1/2007 | Sloup et al. |
| 2007/0028179 A1 | 2/2007 | Levin et al. |
| 2007/0203693 A1 | 8/2007 | Estes |
| 2007/0203860 A1 | 8/2007 | Golden et al. |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2009/0204267 A1* | 8/2009 | Sustaeta ................ G06Q 10/04 700/291 |
| 2009/0210081 A1 | 8/2009 | Sustaeta et al. |
| 2009/0240381 A1 | 9/2009 | Lane |
| 2009/0313083 A1 | 12/2009 | Dillon et al. |
| 2009/0319090 A1 | 12/2009 | Dillon et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0241285 A1 | 9/2010 | Johnson et al. |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0018502 A1 | 1/2011 | Bianciotto et al. |
| 2011/0035328 A1 | 2/2011 | Nielsen et al. |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0093310 A1 | 4/2011 | Watanabe et al. |
| 2011/0125737 A1 | 5/2011 | Pothering et al. |
| 2011/0130857 A1 | 6/2011 | Budiman et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178643 A1 | 7/2011 | Metcalfe |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2011/0231028 A1 | 9/2011 | Ozog |
| 2011/0231320 A1 | 9/2011 | Irving |
| 2012/0011126 A1 | 1/2012 | Park et al. |
| 2012/0011141 A1 | 1/2012 | Park et al. |
| 2012/0016607 A1 | 1/2012 | Cottrell et al. |
| 2012/0022698 A1 | 1/2012 | Mackay |
| 2012/0036250 A1 | 2/2012 | Vaswani et al. |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0092180 A1 | 4/2012 | Rikkola et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0245968 A1 | 9/2012 | Beaulieu et al. |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2012/0296482 A1 | 11/2012 | Steven et al. |
| 2012/0310860 A1 | 12/2012 | Kim et al. |
| 2012/0316906 A1 | 12/2012 | Hampapur et al. |
| 2013/0006429 A1 | 1/2013 | Shanmugam et al. |
| 2013/0007063 A1 | 1/2013 | Kalra et al. |
| 2013/0010348 A1 | 1/2013 | Massard et al. |
| 2013/0020443 A1 | 1/2013 | Dyckrup et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0103481 A1 | 4/2013 | Carpenter et al. |
| 2013/0113413 A1 | 5/2013 | Harty |
| 2013/0167035 A1 | 6/2013 | Imes et al. |
| 2013/0170710 A1 | 7/2013 | Kuoch et al. |
| 2013/0204443 A1 | 8/2013 | Steven et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0274937 A1 | 10/2013 | Ahn et al. |
| 2013/0275174 A1 | 10/2013 | Bennett et al. |
| 2013/0275908 A1 | 10/2013 | Reichard |
| 2013/0282195 A1 | 10/2013 | O'Connor et al. |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0339080 A1 | 12/2013 | Beaulieu et al. |
| 2014/0032506 A1 | 1/2014 | Hoey et al. |
| 2014/0039709 A1 | 2/2014 | Steven et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0163936 A1 | 6/2014 | Hosking et al. |
| 2014/0172184 A1 | 6/2014 | Schmidt et al. |
| 2014/0189861 A1 | 7/2014 | Gupta et al. |
| 2014/0201018 A1 | 7/2014 | Chassin |
| 2014/0207282 A1 | 7/2014 | Angle et al. |
| 2014/0244051 A1 | 8/2014 | Rollins et al. |
| 2014/0249680 A1 | 9/2014 | Wenzel |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0277769 A1 | 9/2014 | Matsuoka et al. |
| 2014/0278461 A1 | 9/2014 | Artz |
| 2014/0316973 A1 | 10/2014 | Steven et al. |
| 2014/0327555 A1 | 11/2014 | Sager et al. |
| 2015/0008884 A1 | 1/2015 | Waki et al. |
| 2015/0019174 A1 | 1/2015 | Kiff et al. |
| 2015/0042240 A1 | 2/2015 | Aggarwal et al. |
| 2015/0088576 A1 | 3/2015 | Steven et al. |
| 2015/0105917 A1 | 4/2015 | Sasaki et al. |
| 2015/0134123 A1 | 5/2015 | Obinelo |
| 2015/0145468 A1 | 5/2015 | Ma et al. |

(56) References Cited

U.S. PATENT DOCUMENTS

| | | |
|---|---|---|
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0309495 A1 | 10/2015 | Delorme et al. |
| 2015/0311713 A1 | 10/2015 | Asghari et al. |
| 2015/0316903 A1 | 11/2015 | Asmus et al. |
| 2015/0316907 A1 | 11/2015 | Elbsat et al. |
| 2015/0316918 A1 | 11/2015 | Schleiss et al. |
| 2015/0324422 A1 | 11/2015 | Elder |
| 2015/0326015 A1* | 11/2015 | Steven ............... H02J 3/28 700/291 |
| 2015/0331972 A1 | 11/2015 | McClure et al. |
| 2015/0341212 A1 | 11/2015 | Hsiao et al. |
| 2015/0348417 A1 | 12/2015 | Ignaczak et al. |
| 2015/0371328 A1 | 12/2015 | Gabel et al. |
| 2015/0379080 A1 | 12/2015 | Jochimski |
| 2016/0011753 A1 | 1/2016 | McFarland et al. |
| 2016/0020608 A1 | 1/2016 | Carrasco et al. |
| 2016/0033946 A1 | 2/2016 | Zhu et al. |
| 2016/0035246 A1 | 2/2016 | Curtis |
| 2016/0043550 A1 | 2/2016 | Sharma et al. |
| 2016/0065601 A1 | 3/2016 | Gong et al. |
| 2016/0070736 A1 | 3/2016 | Swan et al. |
| 2016/0077880 A1* | 3/2016 | Santos ............... G06Q 10/0631 718/104 |
| 2016/0078229 A1 | 3/2016 | Gong et al. |
| 2016/0090839 A1 | 3/2016 | Stolarczyk |
| 2016/0092986 A1 | 3/2016 | Lian et al. |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0148137 A1 | 5/2016 | Phan et al. |
| 2016/0148171 A1 | 5/2016 | Phan et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0190805 A1 | 6/2016 | Steven et al. |
| 2016/0195856 A1 | 7/2016 | Spero |
| 2016/0209852 A1 | 7/2016 | Beyhaghi et al. |
| 2016/0212165 A1 | 7/2016 | Singla et al. |
| 2016/0216722 A1 | 7/2016 | Tokunaga et al. |
| 2016/0218505 A1 | 7/2016 | Krupadanam et al. |
| 2016/0239660 A1 | 8/2016 | Azvine et al. |
| 2016/0239756 A1 | 8/2016 | Aggour et al. |
| 2016/0246908 A1 | 8/2016 | Komzsik |
| 2016/0275630 A1 | 9/2016 | Strelec et al. |
| 2016/0281607 A1 | 9/2016 | Asati et al. |
| 2016/0305678 A1 | 10/2016 | Pavlovski et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0329708 A1 | 11/2016 | Day |
| 2016/0350364 A1 | 12/2016 | Anicic et al. |
| 2016/0356515 A1 | 12/2016 | Carter |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0363948 A1 | 12/2016 | Steven et al. |
| 2016/0370258 A1 | 12/2016 | Perez |
| 2016/0373453 A1 | 12/2016 | Ruffner et al. |
| 2016/0378306 A1 | 12/2016 | Kresl et al. |
| 2016/0379149 A1 | 12/2016 | Saito et al. |
| 2016/0379326 A1 | 12/2016 | Chan-Gove et al. |
| 2017/0003667 A1 | 1/2017 | Nakabayashi et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0083822 A1 | 3/2017 | Adendorff et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0097647 A1 | 4/2017 | Lunani et al. |
| 2017/0098086 A1 | 4/2017 | Hoernecke et al. |
| 2017/0102162 A1 | 4/2017 | Drees et al. |
| 2017/0102433 A1 | 4/2017 | Wenzel et al. |
| 2017/0102434 A1 | 4/2017 | Wenzel et al. |
| 2017/0102675 A1 | 4/2017 | Drees |
| 2017/0103327 A1 | 4/2017 | Penilla et al. |
| 2017/0103403 A1 | 4/2017 | Chu et al. |
| 2017/0103483 A1 | 4/2017 | Drees et al. |
| 2017/0104332 A1 | 4/2017 | Wenzel et al. |
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | Elbsat et al. |
| 2017/0104344 A1 | 4/2017 | Wenzel et al. |
| 2017/0104345 A1 | 4/2017 | Wenzel et al. |
| 2017/0104346 A1 | 4/2017 | Wenzel et al. |
| 2017/0104449 A1 | 4/2017 | Drees |
| 2017/0123389 A1 | 5/2017 | Baez et al. |
| 2017/0134415 A1 | 5/2017 | Muddu et al. |
| 2017/0167742 A1 | 6/2017 | Radovanovic et al. |
| 2017/0169143 A1 | 6/2017 | Farahat et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0205818 A1 | 7/2017 | Adendorff et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0236222 A1 | 8/2017 | Chen et al. |
| 2017/0251182 A1 | 8/2017 | Siminoff et al. |
| 2017/0268795 A1 | 9/2017 | Yamamoto et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0288455 A1 | 10/2017 | Fife |
| 2017/0294132 A1 | 10/2017 | Colmenares |
| 2017/0309094 A1 | 10/2017 | Farahat et al. |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351234 A1 | 12/2017 | Chen et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2017/0366414 A1 | 12/2017 | Hamilton et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0046149 A1 | 2/2018 | Ahmed |

(56) References Cited

U.S. PATENT DOCUMENTS

| | | |
|---|---|---|
| 2018/0048485 A1 | 2/2018 | Pelton et al. |
| 2018/0069932 A1 | 3/2018 | Tiwari et al. |
| 2018/0082373 A1 | 3/2018 | Hong et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0173214 A1 | 6/2018 | Higgins et al. |
| 2018/0176241 A1 | 6/2018 | Manadhata et al. |
| 2018/0180314 A1 | 6/2018 | Brisette et al. |
| 2018/0196456 A1 | 7/2018 | Elbsat |
| 2018/0197253 A1 | 7/2018 | Elbsat et al. |
| 2018/0198627 A1 | 7/2018 | Mullins |
| 2018/0203961 A1 | 7/2018 | Aisu et al. |
| 2018/0224814 A1 | 8/2018 | Elbsat et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0341255 A1 | 11/2018 | Turney et al. |
| 2018/0359111 A1 | 12/2018 | Harvey |
| 2018/0364654 A1 | 12/2018 | Locke et al. |
| 2018/0373234 A1 | 12/2018 | Khalate et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0066236 A1 | 2/2019 | Wenzel |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0129403 A1 | 5/2019 | Turney et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0271978 A1 | 9/2019 | Elbsat et al. |
| 2019/0295034 A1 | 9/2019 | Wenzel et al. |
| 2019/0310979 A1 | 10/2019 | Masuzaki et al. |
| 2019/0311332 A1 | 10/2019 | Turney et al. |
| 2019/0325368 A1 | 10/2019 | Turney et al. |
| 2019/0338973 A1 | 11/2019 | Turney et al. |
| 2019/0338974 A1 | 11/2019 | Turney et al. |
| 2019/0338977 A1 | 11/2019 | Turney et al. |
| 2019/0347622 A1 | 11/2019 | Elbsat et al. |
| 2019/0354071 A1 | 11/2019 | Turney et al. |
| 2020/0090289 A1 | 3/2020 | Elbsat et al. |
| 2020/0096985 A1 | 3/2020 | Wenzel et al. |
| 2020/0166230 A1 | 5/2020 | Ng et al. |
| 2020/0226156 A1 | 7/2020 | Borra et al. |
| 2020/0285203 A1 | 9/2020 | Thakur et al. |
| 2021/0042299 A1 | 2/2021 | Migliori |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0138684 A1 | 5/2022 | Harvey |
| 2022/0215264 A1 | 7/2022 | Harvey et al. |
| 2023/0010757 A1 | 1/2023 | Preciado |

FOREIGN PATENT DOCUMENTS

| | | |
|---|---|---|
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 088 972 A2 | 11/2016 |
| EP | 3 324 306 A1 | 5/2018 |
| EP | 3 447 258 A1 | 2/2019 |
| JP | H10-049552 A | 2/1998 |
| JP | 2001-357112 | 12/2001 |
| JP | 2003-141178 | 5/2003 |
| JP | 2003-162573 A | 6/2003 |
| JP | 2005-148955 A | 6/2005 |
| JP | 2005-182465 | 7/2005 |
| JP | 2007-018322 A | 1/2007 |
| JP | 4073946 B1 | 4/2008 |
| JP | 2008-107930 A | 5/2008 |
| JP | 2010-078447 A | 4/2010 |
| JP | 2012-073866 | 4/2012 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/080547 A1 | 7/2011 |
| WO | WO-2011/100255 A2 | 8/2011 |
| WO | WO-2012/145563 A1 | 10/2012 |
| WO | WO-2013/050333 A1 | 4/2013 |
| WO | WO-2014/143908 A1 | 9/2014 |
| WO | WO-2015/031581 A1 | 3/2015 |
| WO | WO-2015/106702 A1 | 7/2015 |
| WO | WO-2015/145648 A1 | 10/2015 |
| WO | WO-2016/144586 | 9/2016 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/217251 A1 | 11/2018 |

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.

Diederik Kingma and Jimmy Ba. Adam: A Method for Stochastic Optimization. In International Conference on Learning Representations (ICLR), 2015, 15 pages.

Ebbers et al. "Smarter Data Centers—Achieving Great Efficiency—Second Edition", Oct. 21, 2011, 138 pages.

Extended European Search Report on European Patent Application No. 18150740.1 dated May 16, 2018. 7 pages.

Extended European Search Report on European Patent Application No. 18155069.0 dated Jun. 11, 2018. 6 pages.

Extended European Search Report on European Patent Application No. 18190786.6 dated Oct. 10, 2018. 7 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

(56) References Cited

OTHER PUBLICATIONS

Jie Chen and Guoxiang Gu. Control-oriented System Identification: an H1 Approach, vol. 19. Wiley-Interscience, 2000, chapters 3 & 8, 38 pages.
Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.
K. J. Astrom. Optimal Control of Markov Decision Processes with Incomplete State Estimation. J. Math. Anal. Appl., 10:174-205, 1965.31 pages.
Kelman and F. Borrelli. Bilinear Model Predictive Control of a HVAC System Using Sequential Quadratic Programming. In Proceedings of the 2011 IFAC World Congress, 2011, 6 pages.
Lennart Ljung and Torsten Soderstrom. Theory and practice of recursive identification, vol. 5. JSTOR, 1983, chapters 2, 3 & 7, 80 pages.
Lennart Ljung, editor. System Identification: Theory for the User (2nd Edition). Prentice Hall, Upper Saddle River, New Jersey, 1999, chapters 5 and 7, 40 pages.
Moritz Hardt, Tengyu Ma, and Benjamin Recht. Gradient Descent Learns Linear Dynamical Systems. arXiv preprint arXiv:1609.05191, 2016, 44 pages.
Moseley et al. "Electrochemical Energy Storage for Renewable Sources and Grid Balancing" Nov. 7, 2014. 14 pages.
Nevena et al. Data center cooling using model-predictive control, 10 pages. 2018.
Sergio Bittanti, Marco C Campi, et al. Adaptive Control of Linear Time Invariant Systems: The "Bet on the Best" Principle. Communications in Information & Systems, 6(4):299-320, 2006. 21 pages.
Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.
Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.
U.S. Appl. No. 15/968,187, filed May 1, 2018, Johnson Controls Technology Company.
U.S. Appl. No. 16/034,057, filed Jul. 12, 2018, Johnson Controls Technology Company.
U.S. Appl. No. 16/294,433, filed Mar. 6, 2019, Johnson Controls Technology Company.
U.S. Appl. No. 16/418,686, filed May 21, 2019, Johnson Controls Technology Company.
Afram et al., Artificial Neural Network (ANN) Based Model Predictive Control (MPC) and Optimization of HVAC Systems: A State of the Art Review and Case Study of a Residential HVAC System, Apr. 15, 2017.
De Carlo et al., Maintenance Cost Optimization in Condition Based Maintenance: A Case Study for Critical Facilities, Oct.-Nov. 2013, 7 pages.
Japanese Search Report for International Application No. PCT/US2018/018039, dated Apr. 24, 2018, 14 pages.
International Search Report and Written Opinion on PCT/US2020/042916, dated Oct. 8, 2020, 14 pages.
International Search Report and Written Opinion on PCT/US2020/045238, dated Oct. 26, 2020, 14 pages.
U.S. Appl. No. 62/673,479, filed May 18, 2018, Johnson Controls Technology Co.
U.S. Appl. No. 62/673,496, filed May 18, 2018, Johnson Controls Technology Co.
U.S. Appl. No. 62/853,983, filed May 29, 2019, Johnson Controls Technology Co.
Ahou et al., "Reliability-centered predictive maintenance scheduling for a continuously monitored system subject to degradation," Reliability Engineering & System Safety, 2007, 92.4, pp. 530-534.
Aynur, "Variable refrigerant flow systems: A review." Energy and Buildings, 2010, 42.7, pp. 1106-1112.
Chan et al., "Estimation of Degradation-Based Reliability in Outdoor Environments," Statistics Preprints, Jun. 19, 2001, 25, 33 pages.
Chu et al., "Predictive maintenance: The one-unit replacement model," International Journal of Production Economics, 1998, 54.3, pp. 285-295.
Chua et al., "Achieving better energy-efficient air conditioning-a review of technologies and strategies," Applied Energy, 2013, 104, pp. 87-104.
Crowder et al., "The Use of Degradation Measures to Design Reliability Test Plans." World Academy of Science, Engineering and Technology, International Journal of Mathematical, Computational, Physical, Electrical and Computer Engineering, 2014, 8, 18 pages.
Costa et al., "A multi-criteria model for auditing a Predictive Maintenance Programme," European Journal of Operational Research, Sep. 29, 2011, 217.2, pp. 381-393.
Emmerich et al., "State-of-the-Art Review of CO2 Demand Controlled Ventilation Technology and Application," NISTIR, Mar. 2001, 47 pages.
Extended European Search Reported on EP Patent Application No. 18176474 dated Sep. 5, 2018, 8 pages.
Fu et al., "Predictive Maintenance in Intelligent-Control-Maintenance-Management System for Hydroelectric Generating Unit," IEEE Transactions on Energy Conversion, Mar. 2004, 19.1, pp. 179-186.
Fuller, Life-Cycle Cost Analysis (LCCA) I WBDG—Whole Building Design Guide, National Institute of Standards and Technology (NIST), https://www.wbdg.org/resources/life-cycle-cost-analysis-lcca, 2016, pp. 1-13.
Gedam, "Optimizing R&M Performance of a System Using Monte Carlo Simulation", 2012 Proceedings Annual Reliability and Maintainability Symposium, 2012, pp. 1-6.
Grall et al., "Continuous-Time Predictive-Maintenance Scheduling for a Deteriorating System," IEEE Transactions on Reliability, Jun. 2002, 51.2, pp. 141-150.
Hagmark, et al., "Simulation and Calculation of Reliability Performance and Maintenance Costs", 2007 Annual Reliability and Maintainability Symposium, IEEE Xplore, 2007, pp. 34-40, 2007.
Hong et al. "Development and Validation of a New Variable Refrigerant Flow System Model in Energyplus," Energy and Buildings, 2016, 117, pp. 399-411.
Hong et al., "Statistical Methods for Degradation Data With Dynamic Covariates Information and an Application To Outdoor Weathering Data," Technometrics, Nov. 2014, 57.2, pp. 180-193.
JP2003141178 Wipo Translation, Accessed Feb. 18, 2020, 15 pages.
Kharoufeh et al., "Semi-Markov Models for Degradation-Based Reliability," IIE Transactions, May 2010, 42.8, pp. 599-612.
Li et al., "Reliability Modeling and Life Estimation Using an Expectation Maximization Based Wiener Degradation Model for Momentum Wheels" IEEE Transactions on Cybernetics, May 2015, 45.5, pp. 969-977.
Mohsenian-Rad et al., "Smart Grid for Smart city Activities in the California City of Riverside," In: Alberto Leon-Garcia et al.: "Smart City 360°", Aug. 6, 2016, 22 Pages.
Office Action on EP 18150740.1, dated Nov. 5, 2019, 6 pages.
Office Action on EP 18176474.7 dated Sep. 11, 2019. 5 pages.
Office Action on EP 18176474.7, dated Feb. 10, 2020, 6 pages.
Office Action on EP 18190786.6, dated Feb. 5, 2020, 4 pages.
Pan et al., "Reliability modeling of degradation of products with multiple performance characteristics based on gamma processes," Reliability Engineering & System Safety, 2011, 96.8, pp. 949-957.
Peng et al., "Bayesian Degradation Analysis with Inverse Gaussian Process Models Under Time-Varying Degradation Rates," IEEE Transactions on Reliability, Mar. 2017, 66.1, pp. 84-96.
Peng et al., "Bivariate Analysis of Incomplete Degradation Observations Based On Inverse Gaussian Processes And Copulas," IEEE Transactions on Reliability, Jun. 2016, 65.2, pp. 624-639.
Peng et al., "Switching State-Space Degradation Model with Recursive Filter/Smoother for Prognostics Of Remaining Useful Life," IEEE Transactions on Industrial Informatics, Feb. 2019, 15.2, pp. 822-832.
Perez-Lombard et al., "A review on buildings energy consumption information," Energy and Buildings, 2008, 40.3, pp. 394-398.

(56) References Cited

OTHER PUBLICATIONS

PJM Economic Demand Resource in Energy Market, PJM State and Member Training Department, 2014, 119 pages.
PJM Manual 11: Energy & Ancillary Services Market Operations, pp. 122-137, PJM, 2015.
PJM Open Access Transmission Tariff, Section 3.3A, Apr. 4, 2016, 10 pages.
Rahman et al., "Cost Estimation for Maintenance Contracts for Complex Asset/Equipment", 2008 IEEE International Conference on Industrial Engineering and Engineering Management, 2008, pp. 1355-1358.
Ruijters et al., "Fault Maintenance Trees: Reliability Centered Maintenance via Statistical Model Checking", 2016 Annual Reliability and Maintainability Symposium (RAMS), Jan. 25-28, 2016, pp. 1-6.
Wan et al., "Data Analysis and Reliability Estimation of Step-Down Stress Accelerated Degradation Test Based on Wiener Process," Prognostics and System Health Management Conference (PHM-2014 Hunan), Aug. 2014, 5 pages.
Wang et al., "Reliability and Degradation Modeling with Random or Uncertain Failure Threshold," Reliability and Maintainability Symposium, 2007, pp. 392-397.
Xiao et al., "Optimal Design for Destructive Degradation Tests with Random Initial Degradation Values Using the Wiener Process," IEEE Transactions on Reliability, Sep. 2016, 65.3, pp. 1327-1342.
Xu et al., "Real-time Reliability Prediction for a Dynamic System Based on the Hidden Degradation Process Identification," IEEE Transactions on Reliability, Jun. 2008, 57.2, pp. 230-242.
Yang et al., "Thermal comfort and building energy consumption implications-a review," Applied Energy, 2014, 115, pp. 164-173.
Zhang et al., "A Novel Variable Refrigerant Flow (VRF) Heat Recovery System Model: Development and Validation," Energy and Buildings, Jun. 2018, 168, pp. 399-412.
Zhang et al., "An Age- and State-Dependent Nonlinear Prognostic Model for Degrading Systems," IEEE Transactions on Reliability, Dec. 2015, 64.4, pp. 1214-1228.
Zhang et al., "Analysis of Destructive Degradation Tests for a Product with Random Degradation Initiation Time," IEEE Transactions on Reliability, Mar. 2015, 64.1, pp. 516-527.
Zhou et al. "Asset Life Prediction Using Multiple Degradation Indicators and Lifetime Data: a Gamma-Based State Space Model Approach," 2009 8th International Conference on Reliability, Maintainability and Safety, Aug. 2009, 5 pages.
Doring, Matthias, "Prediction vs Forecasting: Predictions do not always concern the future . . . ," Data Science Blog, URL: https://www.datascienceblog.net/post/machine/learning/forecasting_vs_prediction/, 3 pages, Dec. 9, 2018 (3 pages).
Office Action on JP 2020-107153, dated Oct. 5, 2021, 7 pages with English language translation.
Moon, Jin Woo, "Performance of ANN-based predictive and adaptive thermal-control methods for disturbances in and around residential buildings," Building and Environment, 2012, vol. 48, pp. 15-26.
Furuta et al., "Optimal Allocation of Fuzzy Controller and its rule tuning for Structural Vibration," Journal of Japan Society for Fuzzy Theory and Intelligent Informatics, Dec. 2008, vol. 20, No. 6 (pp. 921-934).
JP Office Action on JP Appl. Ser. No. 2020-109855 dated Dec. 7, 2021 (10 pages).
Extended European Search Report on EP 18806317.6, dated Jun. 17, 2021, 10 pages.
Weigel et al., "applying GIS and OR Techniques to Solve Sears Technician-Dispatching and Home Delivery Problems," Interface, Jan.-Feb. 1999, 29:1, pp. 112-130 (20 pages total).
JP Office Action on JP Appl. Ser. No. 2020-109855 dated Jul. 12, 2022, with translation (7 pages).
Balaji et al., "Brick: Metadata schema for portable smart building applications," Applied Energy, 2018 (20 pages).
Balaji et al., "Brick: Metadata schema for portable smart building applications," Applied Energy, Sep. 15, 2018, 3 pages, (Abstract).

Balaji et al., "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings - The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016- 201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. Ser. No. 201780003995.9 dated Apr. 8, 2021 (21 pages).
Chinese Office action on CN Appl. Ser. No. 201780043400.2 dated Apr. 25, 2021 (15 pages).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023, (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
EP Office Action on EP Appl. Ser. No. 18806317.6, dated Feb. 8, 2023 (8 pages).

(56) References Cited

OTHER PUBLICATIONS

Extended European Search Report on EP Appl. Ser. No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017 (11 pages).
International Search Report and Written Opinion on PCT/US2017/052633, dated Oct. 23, 2017 (9 pages).
International Search Report and Written Opinion on PCT/US2017/052829, dated Nov. 27, 201 (24 pages).
International Search Report and Written Opinion on PCT/US2018/024068, dated Jun. 15, 2018, 22 pages.
International Search Report and Written Opinion on PCT/US2018/052971, dated Mar. 1, 2019 (19 pages).
International Search Report and Written Opinion on PCT/US2018/052974, dated Dec. 19, 2018 (13 pages).
International Search Report and Written Opinion on PCT/US2018/052975, dated Jan. 2, 2019 (13 pages).
International Search Report and Written Opinion on PCT/US2018/052994, dated Jan. 7, 2019 (15 pages).
International Search Report and Written Opinion on PCT/US2019/015481, dated May 17, 2019 (15 pages).
International Search Report and Written Opinion on PCT/US2020/058381, dated Jan. 27, 2021 (30 pages).
Jakhrani et al., "Life Cycle Cost Analysis of a Standalone PV system," IEEE, 2012 International Conference in Green and Ubiquitous Technology (pp. 82-85).
Japanese Office Action on JP Appl. Ser. No. 2018-534963 dated May 11, 2021 (16 pages).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
PassiveLogic, "Explorer: Digital Twin Standard for Autonomous Systems. Made interactive." URL: https://passivelogic.com/software/quantum-explorer/, retrieved from internet Jan. 4, 2023 (13 pages).
PassiveLogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019 (3 pages).
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California At Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
Wikipedia Entry: "Correlation," https://en.wikipedia.org/w/index.php?title=Correlation&oldid=1114178034; printed on Oct. 10, 2022 (12 pages).
Zhou, Q. et al., "Knowledge-infused and Consistent Complex Event Processing over Real-time and Persistent Streams," Further Generation Computer Systems, 2017, 76 (pp. 391-406).
International Preliminary Report on Patentability on PCT Appl. Ser. No. PCT/US2020/045238 dated Feb. 17, 2022 (8 pages).
International Preliminary Report on Patentability on PCT Appl. Ser. No. PCT/US2020/042916 dated Feb. 3, 2022 (8 pages).
Japanese Office Action on JP Appl. No. 2019-554919 dated Mar. 29, 2022 (9 pages with English language translation).

\* cited by examiner

MODEL PREDICTIVE MAINTENANCE SYSTEM WITH BUDGETARY CONSTRAINTS

CROSS-REFERENCE TO RELATED PATENT APPLICATIONS

This application is a continuation-in-part of U.S. patent application Ser. No. 15/895,836 filed Feb. 13, 2018, which claims the benefit of and priority to U.S. Provisional Patent Application No. 62/511,113 filed May 25, 2017. The entire contents of both these patent applications are incorporated herein by reference.

BACKGROUND

The present disclosure relates generally to a maintenance system for building equipment and more particularly to a maintenance system that uses a predictive optimization technique to determine an optimal maintenance strategy for the building equipment.

Building equipment is typically maintained according to a maintenance strategy for the building equipment. One type of maintenance strategy is run-to-fail. The run-to-fail strategy allows the building equipment to run until a failure occurs. During this running period, only minor operational maintenance tasks (e.g., oil changes) are performed to maintain the building equipment.

Another type of maintenance strategy is preventative maintenance. The preventative maintenance strategy typically involves performing a set of preventative maintenance tasks recommended by the equipment manufactured. The preventative maintenance tasks are usually performed at regular intervals (e.g., every month, every year, etc.) which may be a function of the elapsed time of operation and/or the run hours of the building equipment.

SUMMARY

One implementation of the present disclosure is a model predictive maintenance (MPM) system for building equipment, according to some embodiments. The MPM system includes an equipment controller configured to operate the building equipment to affect a variable state or condition in a building, according to some embodiments. The MPM system includes an operational cost predictor configured to predict a cost of operating the building equipment over a duration of an optimization period, according to some embodiments. The MPM system includes a budget manager configured to generate one or more budget constraints, according to some embodiments. The MPM system includes an objective function optimizer configured to optimize an objective function subject to the one or more budget constraints to determine a maintenance and replacement schedule for the building equipment, according to some embodiments. The objective function includes maintenance and replacement costs of the building equipment and the predicted cost of operating the building equipment, according to some embodiments.

In some embodiments, the budget manager is configured to generate a penalty cost term. The objective function includes the penalty cost term, according to some embodiments.

In some embodiments, the objective function includes a penalty cost. The one or more budget constraints require the penalty cost to be at least one of greater than or equal to a product of (1) a first penalty rate associated with spending more than a maintenance and replacement budget and (2) a difference between an amount spent on maintaining and replacing the building equipment and the maintenance and replacement budget or greater than or equal to a product of (1) a second penalty rate associated with spending less than the maintenance and replacement budget and (2) the difference between the amount spent on maintaining and replacing the building equipment and the maintenance and replacement budget, according to some embodiments.

In some embodiments, the MPM system includes an objective function generator configured to dynamically update the objective function on a real-time basis based on closed-loop feedback from the building equipment.

In some embodiments, the one or more budget constraints are generated based on one or more budget time periods and a respective one or more maintenance and replacement budgets associated with the one or more budget time periods.

In some embodiments, the one or more budget constraints indicate that the maintenance and replacement costs over each of the one or more budget time periods cannot exceed a maintenance and replacement budget associated with each of the one or more budget time periods.

In some embodiments, the budget manager is configured to determine whether one or more of the one or more budget time periods occur partially outside the optimization period. The budget manager is configured to, in response to a determination that one or more of the one or more budget time periods occur partially outside the optimization period, determine one or more reduced maintenance and replacement budgets for each of the one or more of the one or more budget time periods that occur partially outside the optimization period, according to some embodiments.

Another implementation of the present disclosure is a model predictive maintenance (MPM) system for building equipment, according to some embodiments. The MPM includes one or more processors, according to some embodiments. The MPM system includes one or more non-transitory computer-readable media storing instructions that, when executed by the one or more processors, cause the one or more processors to perform operations, according to some embodiments. The operations include receiving an available budget for an optimization period, according to some embodiments. The operations include predicting a cost of operating the building equipment over a duration of the optimization period, according to some embodiments. The operations include estimating an amount of degradation of the building equipment over the optimization period based on one or more degradation models of the building equipment, according to some embodiments. The operations include allocating a portion of the available budget towards maintenance and replacement of the building equipment based on the predicted cost of operating the building equipment and the amount of degradation of the building equipment, according to some embodiments. The operations include operating the building equipment over the duration of the optimization period in accordance with control decisions based on the portion of the available budget allocated towards maintenance and replacement of the building equipment, according to some embodiments.

In some embodiments, the operations further comprise determining a reliability of the building equipment at each time step of the optimization period using equipment performance information received as feedback from the building equipment. Estimating the amount of degradation of the building equipment is further based on the reliability of the building equipment, according to some embodiments.

In some embodiments, the operations include optimizing an objective function based on the allocated portion of the available budget to determine a maintenance and replacement schedule for the building equipment.

In some embodiments, the operations include determining an operating efficiency of the building equipment at each time step of the optimization period. Estimating the amount of degradation of the building equipment is further based on the operating efficiency of the building equipment, according to some embodiments.

In some embodiments, the operations are performed offline.

In some embodiments, the operations include determining a penalty cost associated with a total expenditure not equaling the allocated portion of the available budget.

In some embodiments, the operations include generating one or more budget constraints that require the penalty cost to be at least one of: greater than or equal to a product of (1) a first penalty rate associated with spending more than the available budget and (2) a difference between an amount spent on maintaining and replacing the building equipment and the available budget or greater than or equal to a product of (1) a second penalty rate associated with spending less than the available budget and (2) the difference between the amount spent on maintaining and replacing the building equipment and the available budget.

Another implementation of the present disclosure is a method for performing model predictive maintenance for building equipment, according to some embodiments. The method includes operating the building equipment to affect a variable state or condition in a building, according to some embodiments. The method includes predicting a cost of operating the building equipment over a duration of an optimization period, according to some embodiments. The method includes generating one or more budget constraints, according to some embodiments. The method includes optimizing an objective function subject to the one or more budget constraints to determine a maintenance and replacement schedule for the building equipment. The objective function includes maintenance and replacement costs of the building equipment and the predicted cost of operating the building equipment, according to some embodiments.

In some embodiments, the method includes generating a penalty cost term. The objective function includes the penalty cost term, according to some embodiments.

In some embodiments, the objective function includes a penalty cost and the one or more budget constraints require the penalty cost to be at least one of: greater than or equal to a product of (1) a first penalty rate associated with spending more than the available budget and (2) a difference between an amount spent on maintaining and replacing the building equipment and the available budget or greater than or equal to a product of (1) a second penalty rate associated with spending less than the available budget and (2) the difference between the amount spent on maintaining and replacing the building equipment and the available budget.

In some embodiments, the method includes dynamically updating the objective function on a real-time basis based on closed-loop feedback from the building equipment.

In some embodiments, the one or more budget constraints are generated based on one or more budget time periods and a respective one or more maintenance and replacement budgets associated with the one or more budget time periods.

In some embodiments, the one or more budget constraints indicate that the maintenance and replacement costs over each of the one or more budget time periods cannot exceed a maintenance and replacement budget associated with each of the one or more budget time periods.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
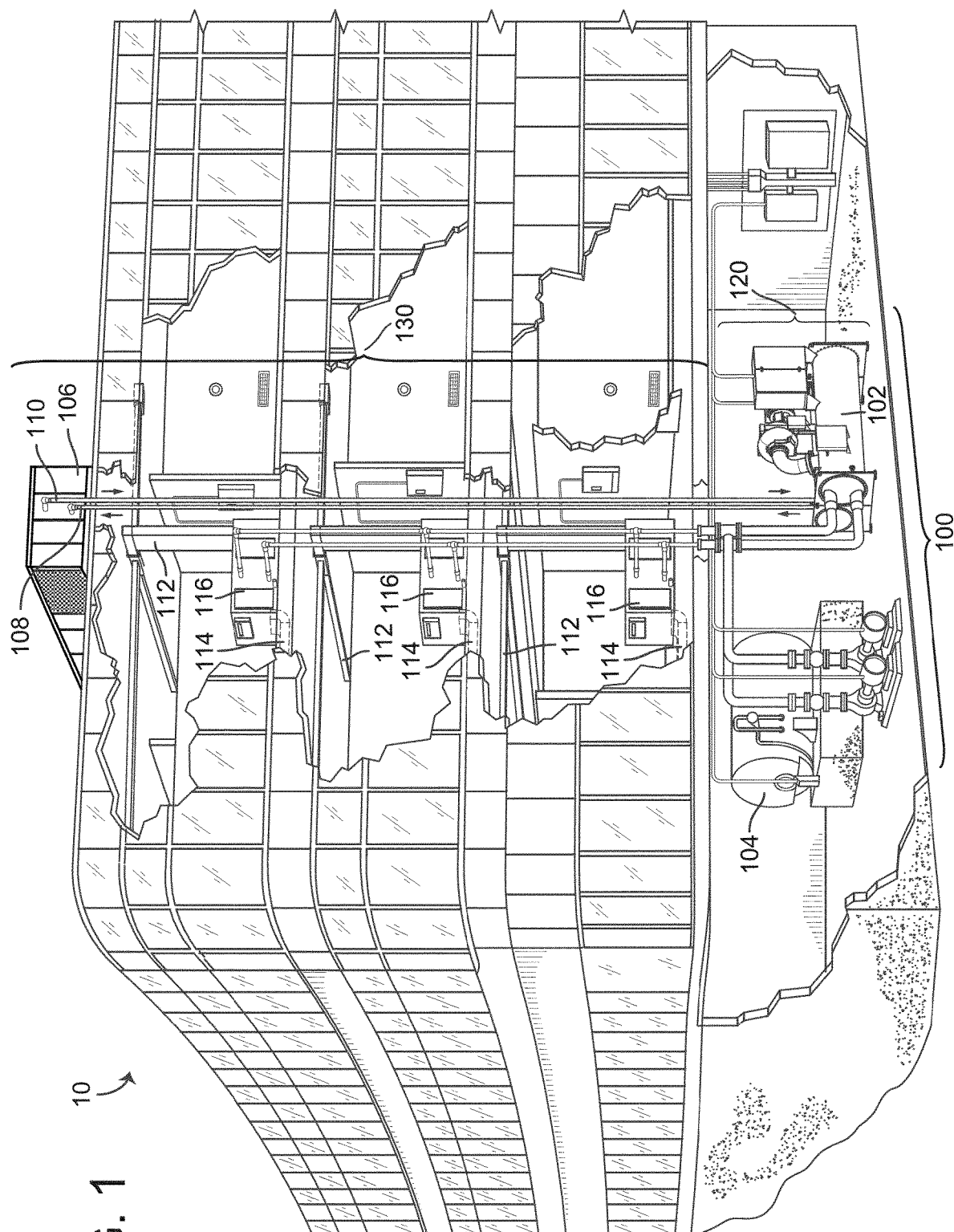
FIG. 1 is a drawing of a building equipped with a HVAC system, according to some embodiments embodiment.

Referring generally to the FIGURES, a model predictive maintenance (MPM) system and components thereof are shown, according to various exemplary embodiments. The MPM system can be configured to determine an optimal maintenance strategy for building equipment. In some embodiments, the optimal maintenance strategy is a set of decisions which optimizes the total cost associated with purchasing, maintaining, and operating the building equipment over the duration of an optimization period (e.g., 30 weeks, 52 weeks, 10 years, 30 years, etc.). The decisions can include, for example, equipment purchase decisions, equipment maintenance decisions, and equipment operating decisions. The MPM system can use a model predictive control technique to formulate an objective function which expresses the total cost as a function of these decisions, which can be included as decision variables in the objective function. The MPM system can optimize (e.g., minimize) the objective function using any of a variety of optimization techniques to identify the optimal values for each of the decision variables.

One example of an objective function which can be optimized by The MPM system is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by the building equipment at time step i of the optimization period, $P_{op,i}$ is the power consumption (e.g., kW) of the building equipment at time step i, $\Delta t$ is the duration of each time step i, is the cost of maintenance performed on the building equipment at time step i, $B_{main,i}$ is a binary variable that indicates whether the maintenance is performed, $C_{cap,i}$ is the capital cost of purchasing a new device of the building equipment at time step i, $B_{cap,i}$ is a binary variable that indicates whether the new device is purchased, and h is the duration of the horizon or optimization period over which the optimization is performed.

The first term in the objective function J represents the operating cost of the building equipment over the duration of the optimization period. In some embodiments, the cost per unit of energy $C_{op,i}$ is received from a utility as energy pricing data. The cost $C_{op,i}$ may be a time-varying cost that depends on the time of day, the day of the week (e.g., weekday vs. weekend), the current season (e.g., summer vs. winter), or other time-based factors. For example, the cost $C_{op,i}$ may be higher during peak energy consumption periods and lower during off-peak or partial-peak energy consumption periods.

In some embodiments, the power consumption $P_{op,i}$ is based on the heating or cooling load of the building. The heating or cooling load can be predicted by the MPM system as a function of building occupancy, the time of day, the day of the week, the current season, or other factors that can affect the heating or cooling load. In some embodiments, the MPM system uses weather forecasts from a weather service to predict the heating or cooling load. The power consumption $P_{op,i}$ may also depend on the efficiency $\eta_i$ of the building equipment. For example, building equipment that operate at a high efficiency may consume less power $P_{op,i}$ to satisfy the same heating or cooling load relative to building equipment that operate at a low efficiency.

Advantageously, the MPM system can model the efficiency $\eta_i$ of the building equipment at each time step i as a function of the maintenance decisions $B_{main,i}$ and the equipment purchase decisions $B_{cap,i}$. For example, the efficiency $\eta_i$ for a particular device may start at an initial value $\eta_0$ when the device is purchased and may degrade over time such that the efficiency decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Performing maintenance or purchasing a new device may result in a relatively lower power consumption $P_{op,i}$ during operation and therefore a lower operating cost at each time step i after the maintenance is performed or the new device is purchased. In other words, performing maintenance or purchasing a new device may decrease the operating cost represented by the first term of the objective function J. However, performing maintenance may increase the second term of the objective function J and purchasing a new device may increase the third term of the objective function J. The objective function J captures each of these costs and can be optimized by the MPM system to determine the optimal set of maintenance and equipment purchase decisions (i.e., optimal values for the binary decision variables $B_{main,i}$ and $B_{cap,i}$) over the duration of the optimization period.

In some embodiments, the MPM system uses equipment performance information received as a feedback from the building equipment to estimate the efficiency and/or the reliability of the building equipment. The efficiency may indicate a relationship between the heating or cooling load on the building equipment and the power consumption of the building equipment. The MPM system can use the efficiency to calculate the corresponding value of $P_{op,i}$. The reliability may be a statistical measure of the likelihood that the building equipment will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since the building equipment last received maintenance and/or an amount of time that has elapsed since the building equipment was purchased or installed.

In some embodiments, the MPM system generates and provides equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of the building equipment may indicate that maintenance should be performed on that device at the $25^{th}$ time step of the optimization period, whereas a value of $B_{main,25}=0$ may indicate that the maintenance should not be performed at that time step. Similarly, a value of $B_{cap,25}=1$ may indicate that a new device of the building equipment should be purchased at the $25^{th}$ time step of the optimization period, whereas a value of $B_{cap,25}=0$ may indicate that the new device should not be purchased at that time step.

Advantageously, the equipment purchase and maintenance recommendations generated by the MPM system are predictive recommendations based on the actual operating conditions and actual performance of the building equipment. The optimization performed by the MPM system weighs the cost of performing maintenance and the cost of purchasing new equipment against the decrease in operating cost resulting from such maintenance or purchase decisions in order to determine the optimal maintenance strategy that minimizes the total combined cost J. In this way, the equipment purchase and maintenance recommendations generated by the MPM system may be specific to each group of building equipment in order to achieve the optimal cost J for that specific group of building equipment. The equipment-specific recommendations may result in a lower overall cost J relative to generic preventative maintenance recommendations provided by an equipment manufacturer (e.g., service equipment every year) which may be suboptimal for some groups of building equipment and/or some operating conditions.

In some embodiments, the MPM system places various budgetary constraints on the optimization of the objective function J. Budgetary constraints can ensure decisions determined during optimization adhere to any economic or other limitations present. Particularly, the MPM system may impose a hard budgetary constraint, a soft budgetary constraint, and/or some combination thereof on the objective function J. A hard budgetary constraint can refer to a constraint that must be adhered to. For example, a hard budgetary constraint may be a maximum allowable budget for maintenance/replacement over an optimization period such that a total cost of all maintenance/replacement cannot exceed the maximum allowable budget. Unlike a hard budgetary constraint, a soft budgetary constraint can be exceeded or otherwise not adhered to, but at an additional penalty. For example, if a soft budgetary constraint indicates an upper bound of a budget, a total cost of maintenance/replacement can exceed the upper bound, but an additional penalty cost will be incurred (e.g., as a percentage of the exceeded amount). The soft budgetary constraint can incentivize optimization to determine decision variables that adhere to the soft budgetary constraint, but allow flexibility if an optimal solution does not adhere to the soft budgetary constraint.

In some embodiments, a penalty cost applies to both exceeding or falling below a budgetary constraint. It may be worthwhile for a total cost of maintenance/replacement over an optimization period to be as close to the budgetary constraint as possible. For example, if maintenance/replacement is allotted a certain amount (e.g., $) in a budget for a building during a fiscal period, any of the allotted amount not spent may move to a different part of the budget, effectively losing the unspent amount from a maintenance/replacement perspective. As such, a penalty cost can be imposed during optimization of the objective function J to determine values of decision variables that result in a total amount spent during the optimization period to be as close to the budgetary constraint as possible. Specifically, as a magnitude of a difference between the budgetary constraint and an estimated total cost increases, a penalty cost added during optimization will also increase.

In some embodiments, the objective function J incorporates a risk cost associated with failure of building equipment. If a building device of the building equipment fails, costs beyond maintenance/replacement costs of the building device may be incurred. Particularly, failure of building equipment incur costs related both to maintenance/replacement of the building equipment along with various opportunity costs such as unmet loads or missed production. To incorporate risk cost into the objective function J, the objective function J can be augmented to include a risk cost term that accounts for how failure of equipment can affect overall costs during an optimization period. The objective function J including the risk cost term is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i} + \sum_{i=1}^{h} C_{fail,i}^{T} P_{fail,i}(\delta_i)$$

where $C_{fail,i}$ is a cost of failure of building equipment at a time step i of an optimization period and $P_{fail,i}(\delta_i)$ is a probability of failure of building devices of building equipment at time step i based on a state of degradation $\delta_i$ of the building devices at time step i. Particularly, the risk cost term $\Sigma_{i=1}^{h} C_{fail,i}^{T} P_{fail,i}(\delta_i)$ affects an overall cost of maintenance/replacement over the optimization period by taking into account the probability of failure of each building device. In general, as the probability of failure of a building device increases, an amount the risk cost term affects the objective function J increases.

Based on the risk cost term, optimization of the objective function J may determine that certain building devices should have maintenance performed and/or be replaced at different times than if the risk cost term were not included in the objective function J. Particularly, the risk cost term can allow the optimization process to identify particular building devices that should have maintenance/replacement performed frequently to keep a probability of failure of the particular building devices low. For example, a specific indoor unit (IDU) of a variable refrigerant flow (VRF) system may have a large opportunity cost associated with failure if a space of the building is required to temporarily shut down for occupant safety if the specific IDU were to fail. Due to the high opportunity cost, the optimization may prioritize maintenance/replacement of the specific IDU over other building devices that have minimal costs associated with failure.

In some embodiments, the objective function J incorporates a miscellaneous cost term to account for miscellaneous costs associated with maintenance/replacement. A miscellaneous cost can refer to various expenses not accounted for in the operational cost term, maintenance cost term, and/or capital cost term. In some embodiments, a miscellaneous cost impacts reliability of building equipment but does not impact efficiency of the building equipment. For example, a miscellaneous cost can include switching screws of an air vent of an HVAC system with new screws. Accounting for said miscellaneous costs may be useful to accurately determine total costs over an optimization period. Adding the miscellaneous cost term to the objective function J can also be beneficial if the risk cost term is incorporated objective function J. If the risk cost term is incorporated, the miscellaneous cost term may provide miscellaneous maintenance activities that can be performed to increase reliability of building equipment, thereby decreasing a probability of failure of said building equipment. Further, if budgetary constraints are placed on the optimization, accounting for miscellaneous costs may be critical to ensure the budgetary constraints are adhered to.

During optimization, the objective function J can account for the miscellaneous costs as an additional factor. For example, the objective function J may have the following form:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i} + \sum_{i=1}^{h} C_{misc,i} B_{misc,i}$$

where $Cost_{misc,i}$ is a cost of a miscellaneous activity for time step i and $B_{misc,i}$ is a binary variable indicating whether the miscellaneous activity occurs at time step i. In some embodiments, the miscellaneous cost is accounted for in other terms of the objective function J (e.g., the maintenance cost term, the capital cost term, a risk cost term, etc.). To determine values of $C_{misc,i}$, miscellaneous costs can be gathered by user input of the miscellaneous costs, tracking billing statements indicating the miscellaneous costs, estimating some average miscellaneous cost anticipated for a time step of the optimization period, etc. These and other features of the MPM system are described in detail below.

Building HVAC Systems and Building Management Systems

Figure 2:
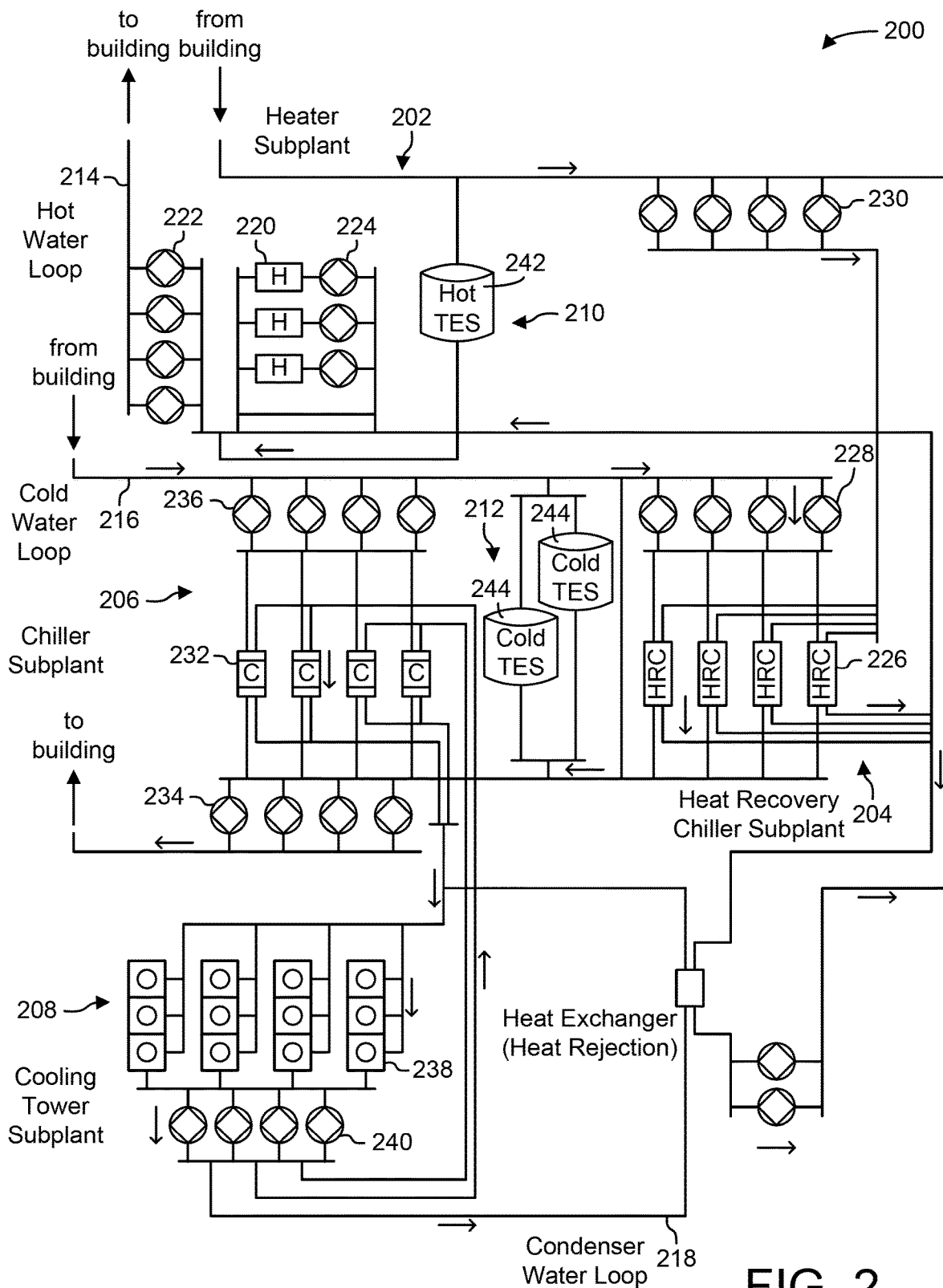
FIG. 2 is a block diagram of a waterside system which can be used to serve the heating or cooling loads of the building of FIG. 1, according to some embodiments.
Figure 3:
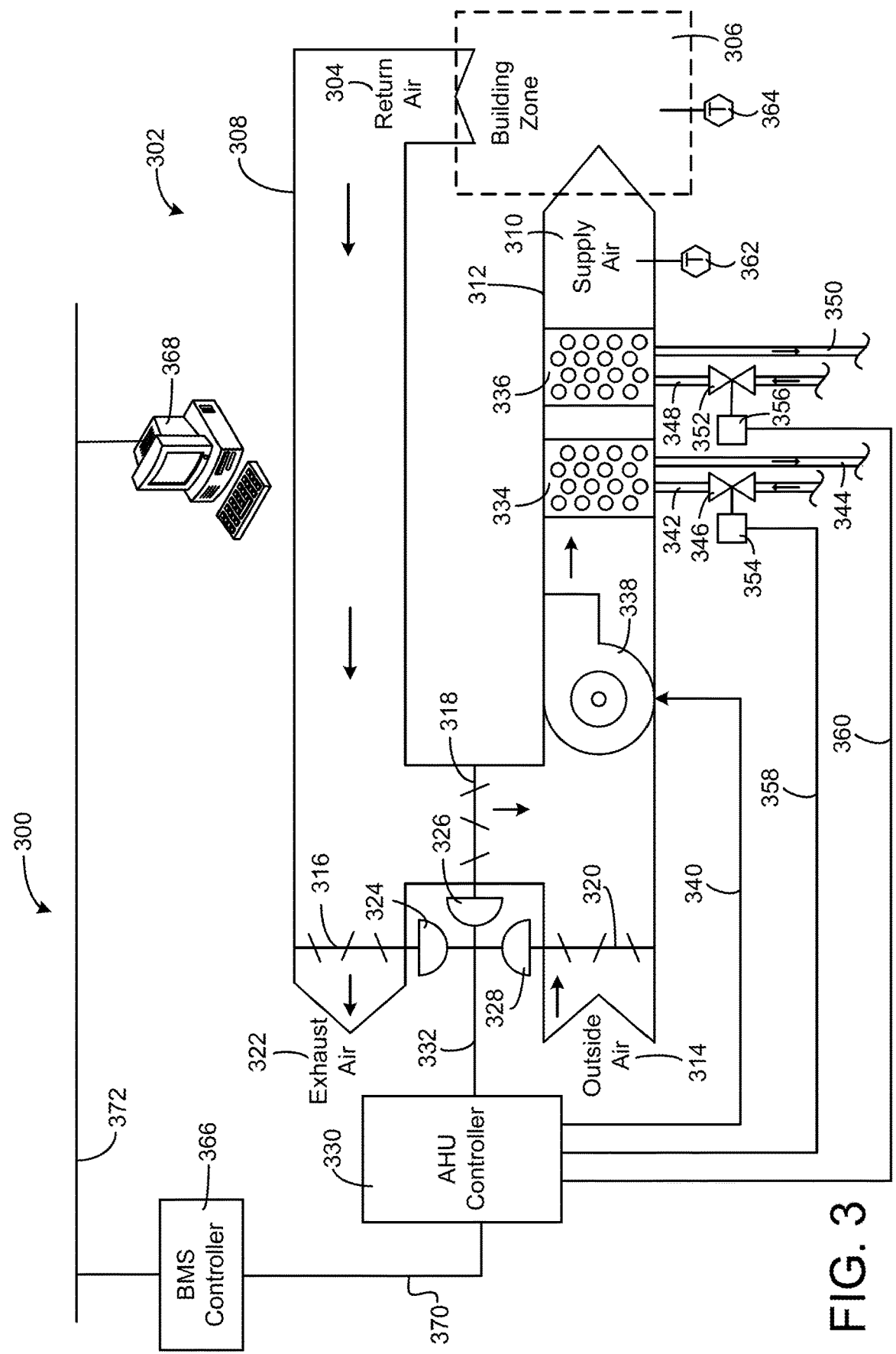
FIG. 3 is a block diagram of an airside system which can be used to serve the heating or cooling loads of the building of FIG. 1, according to some embodiments.
Figure 4:
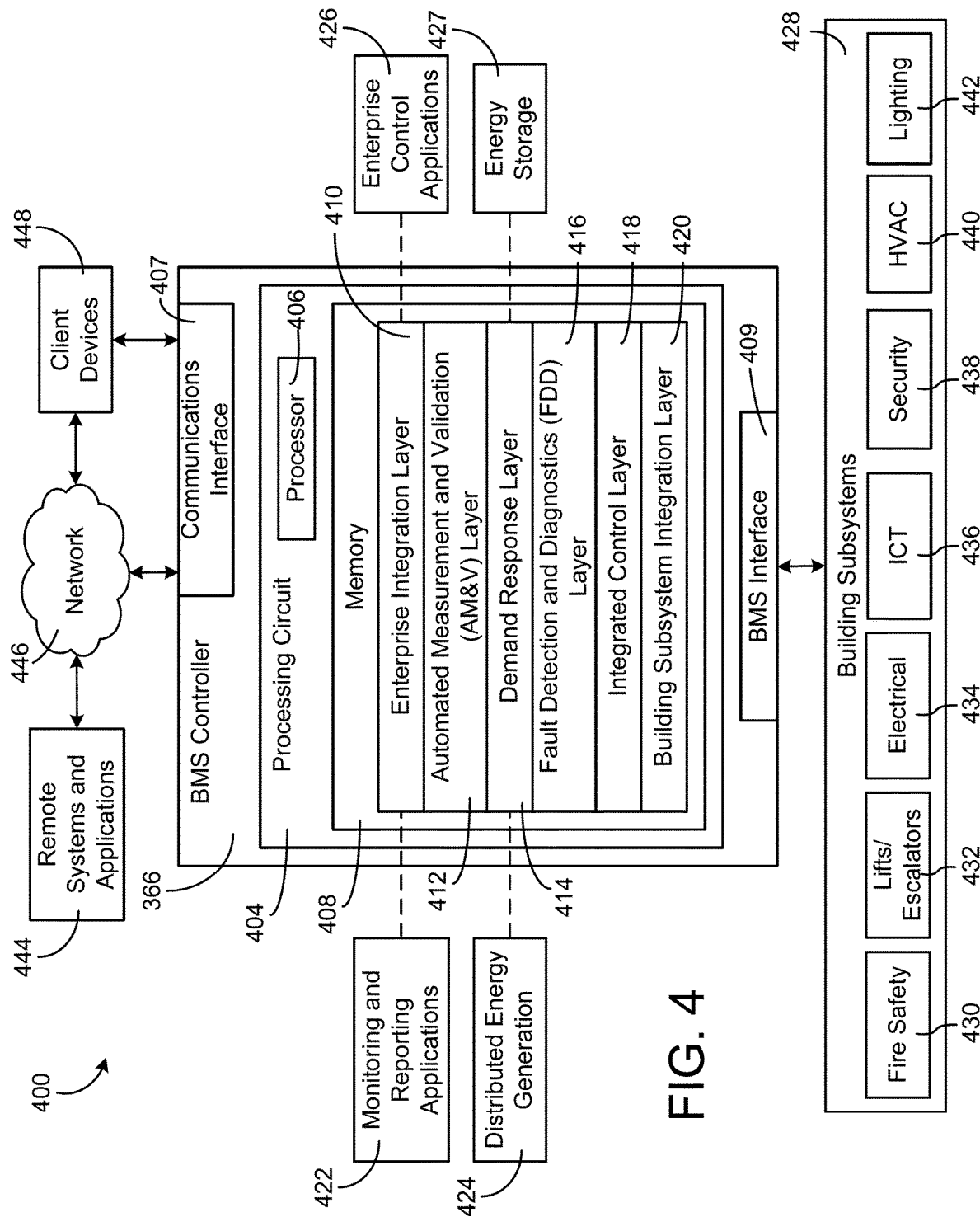
FIG. 4 is a block diagram of a building management system (BMS) which can be used to monitor and control the building of FIG. 1, according to some embodiments.
Figure 5:
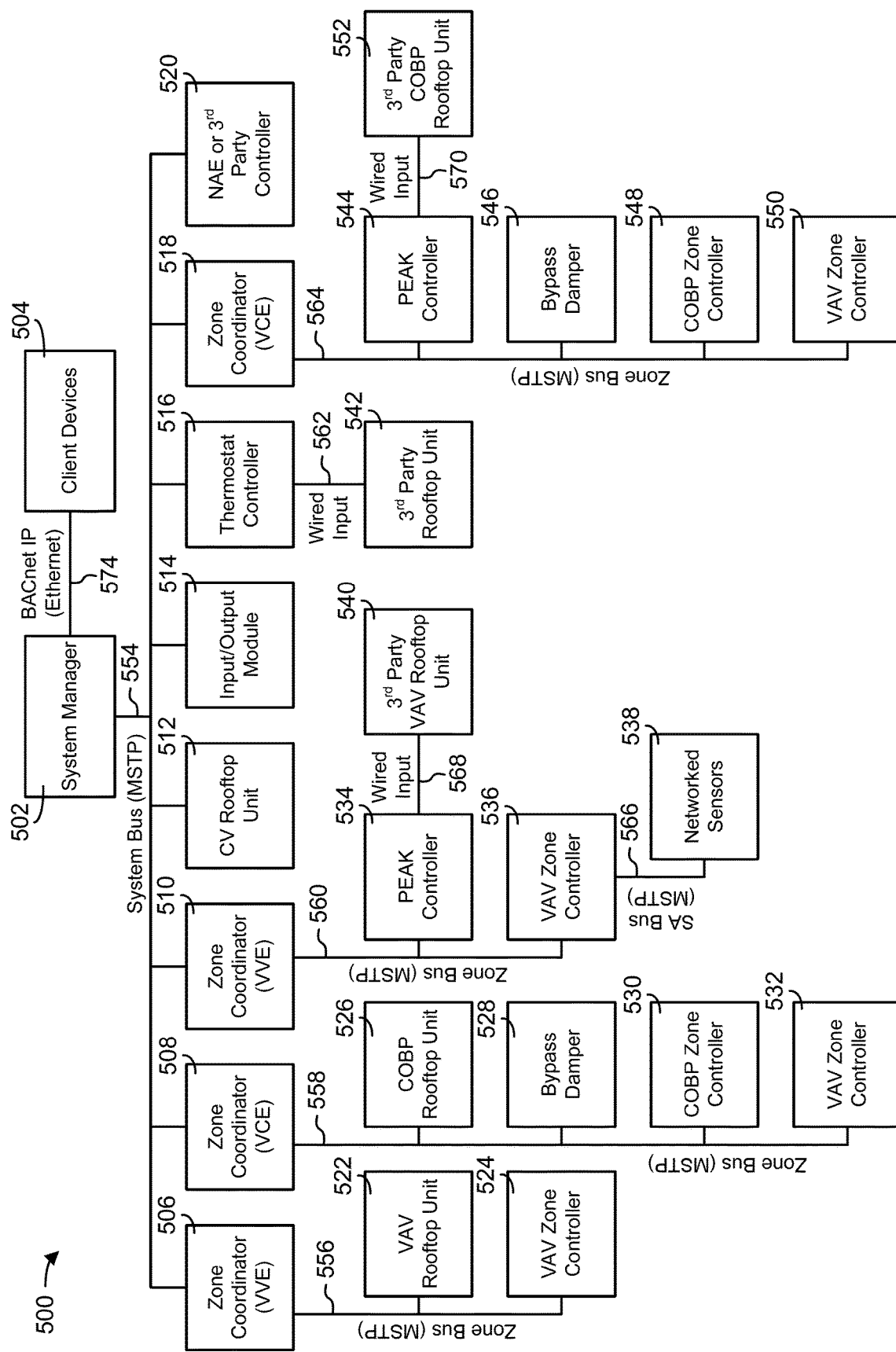
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., sub-plants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Model Predictive Maintenance System

Figure 6:
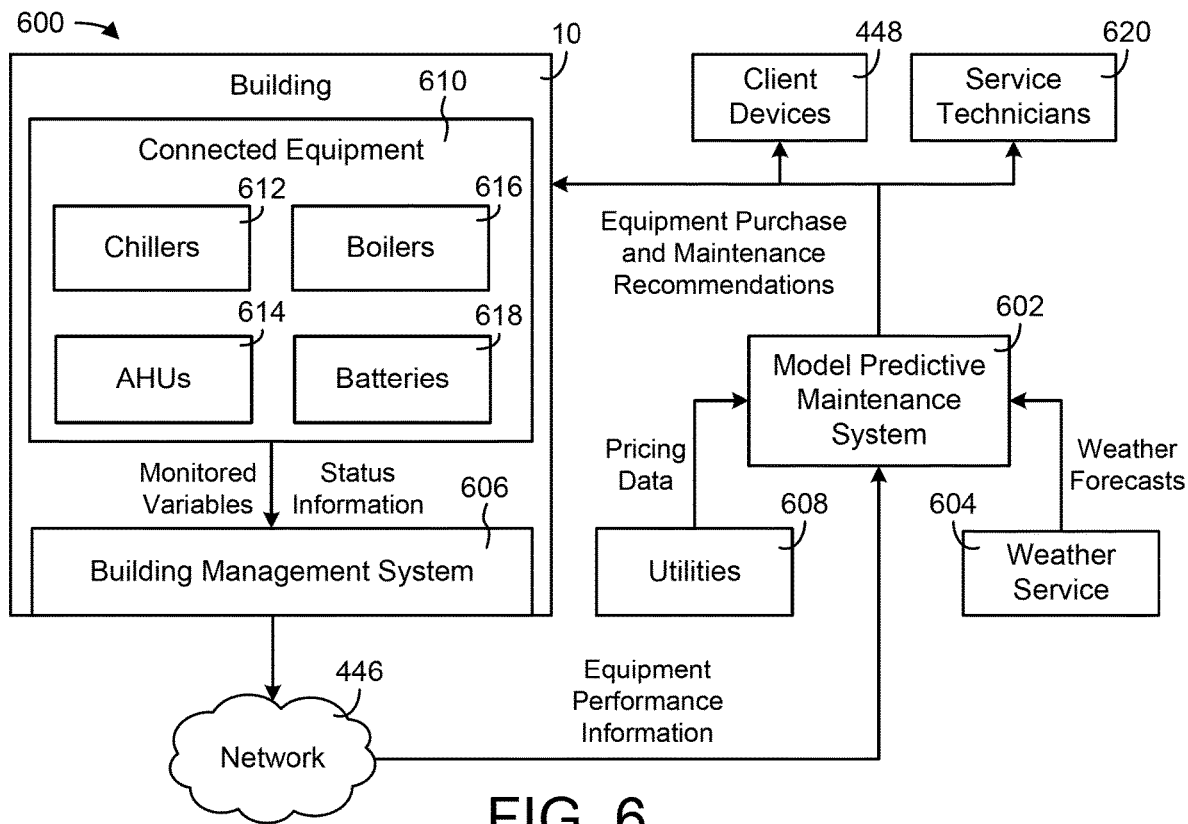
FIG. 6 is a block diagram of a building system including a model predictive maintenance (MPM) system that monitors equipment performance information from connected equipment installed in the building, according to some embodiments.

Referring now to FIG. 6, a block diagram of a building system 600 is shown, according to an exemplary embodiment. System 600 may include many of the same components as BMS 400 and BMS 500 as described with reference to FIGS. 4-5. For example, system 600 is shown to include building 10, network 446, and client devices 448. Building 10 is shown to include connected equipment 610, which can include any type of equipment used to monitor and/or control building 10. Connected equipment 610 can include connected chillers 612, connected AHUs 614, connected boilers 616, connected batteries 618, or any other type of equipment in a building system (e.g., heaters, economizers, valves, actuators, dampers, cooling towers, fans, pumps, etc.) or building management system (e.g., lighting equipment, security equipment, refrigeration equipment, etc.). Connected equipment 610 can include any of the equipment of HVAC system 100, waterside system 200, airside system 300, BMS 400, and/or BMS 500, as described with reference to FIGS. 1-5.

Figure 7:
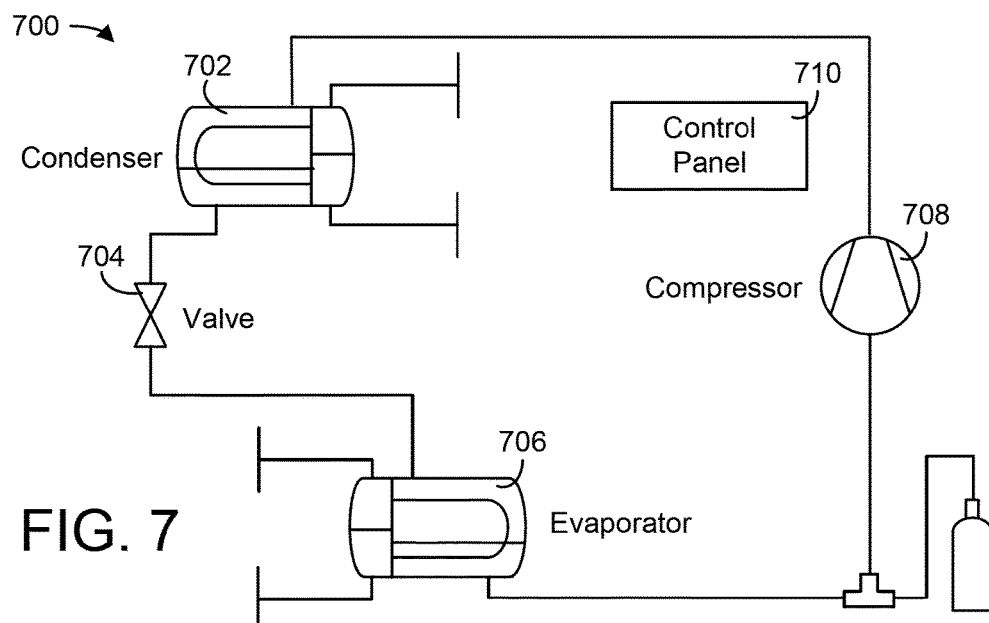
FIG. 7 is a schematic diagram of a chiller which may be a type of connected equipment that provides equipment performance information to the MPM system of FIG. 6, according to some embodiments.

Connected equipment 610 can be outfitted with sensors to monitor various conditions of the connected equipment 610 (e.g., power consumption, on/off states, operating efficiency, etc.). For example, chillers 612 can include sensors configured to monitor chiller variables such as chilled water temperature, condensing water temperature, and refrigerant properties (e.g., refrigerant pressure, refrigerant temperature, etc.) at various locations in the refrigeration circuit. An example of a chiller 700 which can be used as one of chillers 612 is shown in FIG. 7. Chiller 700 is shown to include a refrigeration circuit having a condenser 702, an expansion valve 704, an evaporator 706, a compressor 708, and a control panel 710. In some embodiments, chiller 700 includes sensors that measure a set of monitored variables at various locations along the refrigeration circuit. Similarly, AHUs 614 can be outfitted with sensors to monitor AHU variables such as supply air temperature and humidity, outside air temperature and humidity, return air temperature and humidity, chilled fluid temperature, heated fluid temperature, damper position, etc. In general, connected equipment 610 can monitor and report variables that characterize the performance of the connected equipment 610. Each monitored variable can be forwarded to building management system 606 as a data point including a point ID and a point value.

Monitored variables can include any measured or calculated values indicating the performance of connected equipment 610 and/or the components thereof. For example, monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing. Monitored variables can be received from connected equipment 610 and/or from various components thereof. For example, monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices.

Connected equipment 610 can also report equipment status information. Equipment status information can include, for example, the operational status of the equipment, an operating mode (e.g., low load, medium load, high load, etc.), an indication of whether the equipment is running under normal or abnormal conditions, the hours during which the equipment is running, a safety fault code, or any other information that indicates the current status of connected equipment 610. In some embodiments, each device of connected equipment 610 includes a control panel (e.g., control panel 710 shown in FIG. 7). Control panel 710 can be configured to collect monitored variables and equipment status information from connected equipment 610 and provide the collected data to BMS 606. For example, control panel 710 can compare the sensor data (or a value derived from the sensor data) to predetermined thresholds. If the sensor data or calculated value crosses a safety threshold, control panel 710 can shut down the device. Control panel 710 can generate a data point when a safety shut down occurs. The data point can include a safety fault code which indicates the reason or condition that triggered the shutdown.

Connected equipment 610 can provide monitored variables and equipment status information to BMS 606. BMS 606 can include a building controller (e.g., BMS controller 366), a system manager (e.g., system manager 503), a network automation engine (e.g., NAE 520), or any other system or device of building 10 configured to communicate with connected equipment 610. BMS 606 may include some or all of the components of BMS 400 or BMS 500, as described with reference to FIGS. 4-5. In some embodiments, the monitored variables and the equipment status information are provided to BMS 606 as data points. Each data point can include a point ID and a point value. The point ID can identify the type of data point or a variable measured by the data point (e.g., condenser pressure, refrigerant temperature, power consumption, etc.). Monitored variables can be identified by name or by an alphanumeric code (e.g., Chilled_Water_Temp, 7694, etc.). The point value can include an alphanumeric value indicating the current value of the data point.

BMS 606 can broadcast the monitored variables and the equipment status information to a model predictive maintenance system 602. In some embodiments, model predictive maintenance system 602 is a component of BMS 606. For example, model predictive maintenance system 602 can be implemented as part of a METASYS® brand building automation system, as sold by Johnson Controls Inc. In other embodiments, model predictive maintenance system 602 can be a component of a remote computing system or cloud-based computing system configured to receive and process data from one or more building management systems via network 446. For example, model predictive maintenance system 602 can be implemented as part of a PAN-OPTIX® brand building efficiency platform, as sold by Johnson Controls Inc. In other embodiments, model predictive maintenance system 602 can be a component of a subsystem level controller (e.g., a HVAC controller), a subplant controller, a device controller (e.g., AHU controller 330, a chiller controller, etc.), a field controller, a computer workstation, a client device, or any other system or device that receives and processes monitored variables from connected equipment 610.

Model predictive maintenance (MPM) system 602 may use the monitored variables and/or the equipment status information to identify a current operating state of connected equipment 610. The current operating state can be examined by MPM system 602 to expose when connected equipment 610 begins to degrade in performance and/or to predict when faults will occur. In some embodiments, MPM system 602 uses the information collected from connected equipment 610 to estimate the reliability of connected equipment 610. For example, MPM system 602 can estimate a likelihood of various types of failures that could potentially occur based on the current operating conditions of connected equipment 610 and an amount of time that has elapsed since connected equipment 610 has been installed and/or since maintenance was last performed. In some embodiments, MPM system 602 estimates an amount of time until each failure is predicted to occur and identifies a financial cost associated with each failure (e.g., maintenance cost, increased operating cost, replacement cost, etc.). MPM system 602 can use the reliability information and the likelihood of potential failures to predict when maintenance will be needed and to estimate the cost of performing such maintenance over a predetermined time period.

MPM system 602 can be configured to determine an optimal maintenance strategy for connected equipment 610. In some embodiments, the optimal maintenance strategy is a set of decisions which optimizes the total cost associated with purchasing, maintaining, and operating connected equipment 610 over the duration of an optimization period (e.g., 30 weeks, 52 weeks, 10 years, 30 years, etc.). The decisions can include, for example, equipment purchase decisions, equipment maintenance decisions, and equipment operating decisions. MPM system 602 can use a model predictive control technique to formulate an objective function which expresses the total cost as a function of these decisions, which can be included as decision variables in the objective function. MPM system 602 can optimize (i.e., minimize) the objective function using any of a variety of optimization techniques to identify the optimal values for each of the decision variables.

One example of an objective function which can be optimized by MPM system 602 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

The first term in the objective function J represents the operating cost of connected equipment 610 over the duration of the optimization period. In some embodiments, the cost per unit of energy $C_{op,i}$ is received from a utility 608 as energy pricing data. The cost $C_{op,i}$ may be a time-varying cost that depends on the time of day, the day of the week (e.g., weekday vs. weekend), the current season (e.g., summer vs. winter), or other time-based factors. For example, the cost $C_{op,i}$ may be higher during peak energy consumption periods and lower during off-peak or partial-peak energy consumption periods.

In some embodiments, the power consumption $P_{op,i}$ is based on the heating or cooling load of building 10. The heating or cooling load can be predicted by MPM system 602 as a function of building occupancy, the time of day, the day of the week, the current season, or other factors that can affect the heating or cooling load. In some embodiments, MPM system 602 uses weather forecasts from a weather service 604 to predict the heating or cooling load. The power consumption $P_{op,i}$ may also depend on the efficiency $\eta_i$ of connected equipment 610. For example, connected equipment 610 that operate at a high efficiency may consume less power $P_{op,i}$ to satisfy the same heating or cooling load relative to connected equipment 610 that operate at a low efficiency. In general, the power consumption $P_{op,i}$ of a particular device of connected equipment 610 can be modeled using the following equations:

$$P_{op,i} = \frac{P_{ideal,i}}{\eta_i}$$

$$P_{ideal,i} = f(\text{Load}_i)$$

where $\text{Load}_i$ is the heating or cooling load on the device at time step i (e.g., tons cooling, kW heating, etc.), $P_{ideal,i}$ is the value of the equipment performance curve (e.g., tons cooling, kW heating, etc.) for the device at the corresponding load point $\text{Load}_i$, and $\eta_i$ is the operating efficiency of the device at time step i (e.g., $0 \leq \eta_i \leq 1$). The function $f(\text{Load}_i)$ may be defined by the equipment performance curve for the device or set of devices represented by the performance curve.

In some embodiments, the equipment performance curve is based on manufacturer specifications for the device under ideal operating conditions. For example, the equipment performance curve may define the relationship between power consumption and heating/cooling load for each device of connected equipment 610. However, the actual performance of the device may vary as a function of the actual operating conditions. MPM system 602 can analyze the equipment performance information provided by connected equipment 610 to determine the operating efficiency $\eta_i$ for each device of connected equipment 610. In some embodiments, MPM system 602 uses the equipment performance information from connected equipment 610 to determine the actual operating efficiency $\eta_i$ for each device of connected equipment 610. MPM system 602 can use the operating efficiency $\eta_i$ as an input to the objective function J and/or to calculate the corresponding value of $P_{op,i}$.

Advantageously, MPM system 602 can model the efficiency $\eta_i$ of connected equipment 610 at each time step i as a function of the maintenance decisions and the equipment purchase decisions $B_{cap,i}$. For example, the efficiency $\eta_i$ for a particular device may start at an initial value $\eta_0$ when the device is purchased and may degrade over time such that the efficiency $\eta_i$ decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Performing maintenance or purchasing a new device may result in a relatively lower power consumption $P_{op,i}$ during operation and therefore a lower operating cost at each time step i after the maintenance is performed or the new device is purchased. In other words, performing maintenance or purchasing a new device may decrease the operating cost represented by the first term of the objective function J. However, performing maintenance may increase the second term of the objective function J and purchasing a new device may increase the third term of the objective function J. The objective function J captures each of these costs and can be optimized by MPM system 602 to determine the optimal set of maintenance and equipment purchase decisions (i.e., optimal values for the binary decision variables $B_{main,i}$ and $B_{cap,i}$) over the duration of the optimization period.

In some embodiments, MPM system 602 uses the equipment performance information from connected equipment 610 to estimate the reliability of connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance.

MPM system 602 may receive operating data from a plurality of devices of connected equipment 610 distributed across multiple buildings and can use the set of operating data (e.g., operating conditions, fault indications, failure times, etc.) to develop a reliability model for each type of equipment. The reliability models can be used by MPM system 602 to estimate the reliability of any given device of connected equipment 610 as a function of its current operating conditions and/or other extraneous factors (e.g., time since maintenance was last performed, geographic location, water quality, etc.). In some embodiments, MPM system 602 uses the estimated reliability of each device of connected equipment 610 to determine the probability that the device will require maintenance and/or replacement at each time step of the optimization period. MPM system 602 can use these probabilities to determine the optimal set of maintenance and equipment purchase decisions (i.e., optimal values for the binary decision variables $B_{main,i}$ and $B_{cap,i}$) over the duration of the optimization period.

In some embodiments, MPM system 602 generates and provides equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of connected equipment 610 may indicate that maintenance should be performed on that device at the $25^{th}$ time step of the optimization period, whereas a value of $B_{main,25}=0$ may indicate that the maintenance should not be performed at that time step. Similarly, a value of $B_{cap,25}=1$ may indicate that a new device of connected equipment 610 should be purchased at the $25^{th}$ time step of the optimization period, whereas a value of $B_{cap,25}=0$ may indicate that the new device should not be purchased at that time step.

Advantageously, the equipment purchase and maintenance recommendations generated by MPM system 602 are predictive recommendations based on the actual operating conditions and actual performance of connected equipment 610. The optimization performed by MPM system 602 weighs the cost of performing maintenance and the cost of purchasing new equipment against the decrease in operating cost resulting from such maintenance or purchase decisions in order to determine the optimal maintenance strategy that minimizes the total combined cost J. In this way, the equipment purchase and maintenance recommendations generated by MPM system 602 may be specific to each group of connected equipment 610 in order to achieve the optimal cost J for that specific group of connected equipment 610. The equipment-specific recommendations may result in a lower overall cost J relative to generic preventative maintenance recommendations provided by an equipment manufacturer (e.g., service equipment every year) which may be sub-optimal for some groups of connected equipment 610 and/or some operating conditions.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

In some embodiments, MPM system 602 includes a data analytics and visualization platform. MPM system 602 may provide a web interface which can be accessed by service technicians 620, client devices 448, and other systems or devices. The web interface can be used to access the equipment performance information, view the results of the optimization, identify which equipment is in need of maintenance, and otherwise interact with MPM system 602. Service technicians 620 can access the web interface to view a list of equipment for which maintenance is recommended by MPM system 602. Service technicians 620 can use the equipment purchase and maintenance recommendations to proactively repair or replace connected equipment 610 in order to achieve the optimal cost predicted by the objective function J. These and other features of MPM system 602 are described in greater detail below.

Figure 8:
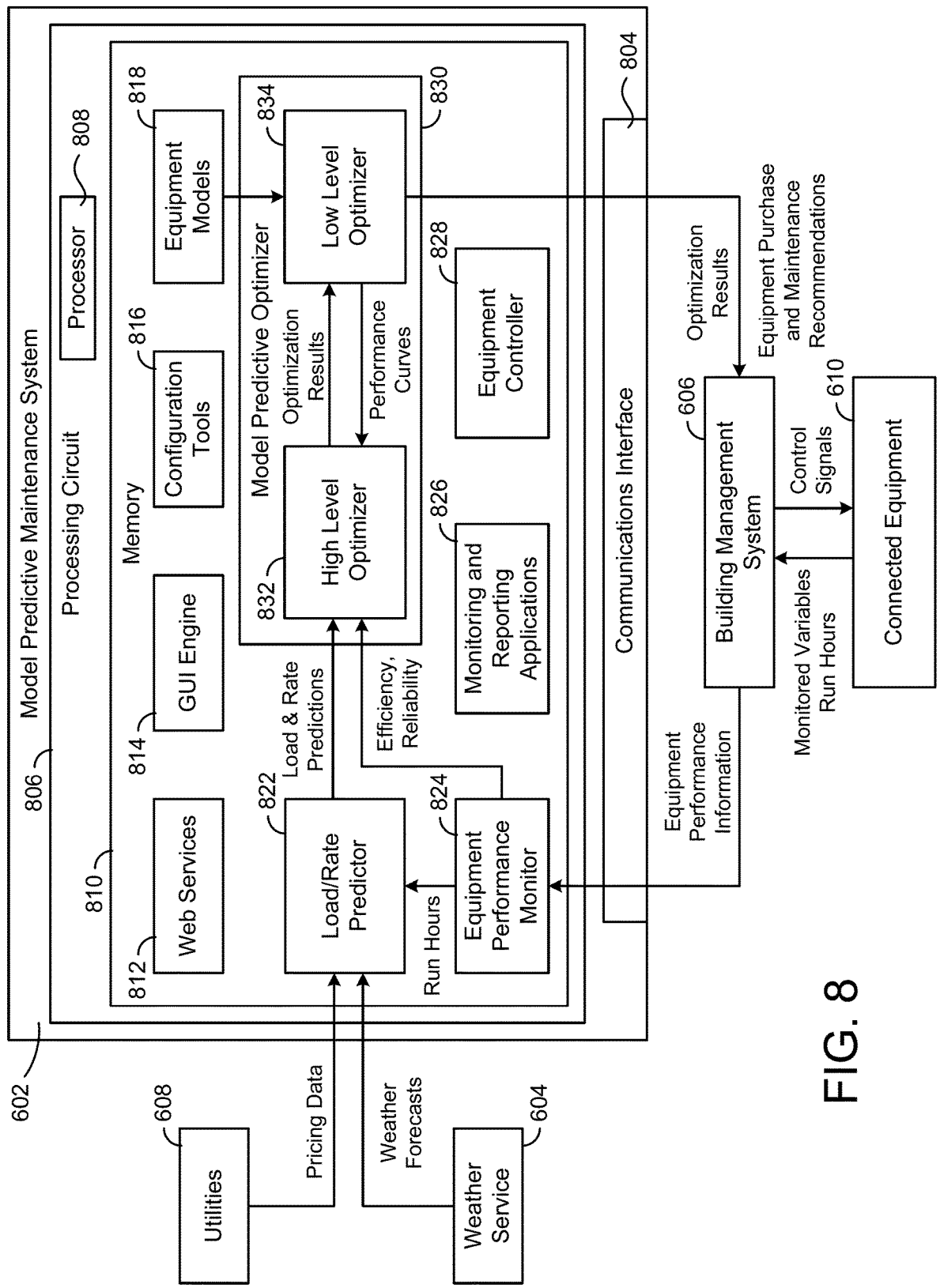
FIG. 8 is a block diagram illustrating the MPM system of FIG. 6 in greater detail, according to some embodiments.

Referring now to FIG. 8, a block diagram illustrating MPM system 602 in greater detail is shown, according to an exemplary embodiment. MPM system 602 is shown providing optimization results to a building management system (BMS) 606. BMS 606 can include some or all of the features of BMS 400 and/or BMS 500, as described with reference to FIGS. 4-5. The optimization results provided to BMS 606 may include the optimal values of the decision variables in the objective function J for each time step i in the optimization period. In some embodiments, the optimization results include equipment purchase and maintenance recommendations for each device of connected equipment 610.

BMS 606 may be configured to monitor the operation and performance of connected equipment 610. BMS 606 may receive monitored variables from connected equipment 610. Monitored variables can include any measured or calculated values indicating the performance of connected equipment 610 and/or the components thereof. For example, monitored variables can include one or more measured or calculated temperatures, pressures, flow rates, valve positions, resource consumptions (e.g., power consumption, water consumption, electricity consumption, etc.), control setpoints, model parameters (e.g., equipment model coefficients), or any other variables that provide information about how the corresponding system, device, or process is performing.

In some embodiments, the monitored variables indicate the operating efficiency $\eta_i$ of each device of connected equipment 610 or can be used to calculate the operating efficiency $\eta_i$. For example, the temperature and flow rate of chilled water output by a chiller can be used to calculate the cooling load (e.g., tons cooling) served by the chiller. The cooling load can be used in combination with the power consumption of the chiller to calculate the operating efficiency $\eta_i$ (e.g., tons cooling per kW of electricity consumed). BMS 606 may report the monitored variables to MPM system 602 for use in calculating the operating efficiency $\eta_i$ of each device of connected equipment 610.

In some embodiments, BMS 606 monitors the run hours of connected equipment 610. The run hours may indicate the number of hours within a given time period during which each device of connected equipment 610 is active. For example, the run hours for a chiller may indicate that the chiller is active for approximately eight hours per day. The run hours can be used in combination with the average power consumption of the chiller when active to estimate the total power consumption $P_{op,i}$ of connected equipment 610 at each time step i.

In some embodiments, BMS 606 monitors the equipment failures and fault indications reported by connected equipment 610. BMS 606 can record the times at which each failure or fault occurs and the operating conditions of connected equipment 610 under which the fault or failure occurred. The operating data collected from connected equipment 610 can be used by BMS 606 and/or MPM system 602 to develop a reliability model for each device of connected equipment 610. BMS 606 may provide the monitored variables, the equipment run hours, the operating conditions, and the equipment failures and fault indications to MPM system 602 as equipment performance information.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to MPM system 602. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate connected equipment 610 to affect the monitored conditions within the building and to serve the thermal energy loads of the building.

BMS 606 may provide control signals to connected equipment 610 specifying on/off states, charge/discharge rates, and/or setpoints for connected equipment 610. BMS 606 may control the equipment (e.g., via actuators, power relays, etc.) in accordance with the control signals to achieve setpoints for various building zones and/or devices of connected equipment 610. In various embodiments, BMS 606 may be combined with MPM system 602 or may be part of a separate building management system. According to an exemplary embodiment, BMS 606 is a METASYS® brand building management system, as sold by Johnson Controls, Inc.

MPM system 602 may monitor the performance of connected equipment 610 using information received from BMS 606. MPM system 602 may be configured to predict the thermal energy loads (e.g., heating loads, cooling loads, etc.) of the building for plurality of time steps in the optimization period (e.g., using weather forecasts from a weather service 604). MPM system 602 may also predict the cost of electricity or other resources (e.g., water, natural gas, etc.) using pricing data received from utilities 608. MPM system 602 may generate optimization results that optimize the economic value of operating, maintaining, and purchasing connected equipment 610 over the duration of the optimization period subject to constraints on the optimization process (e.g., load constraints, decision variable constraints, etc.). The optimization process performed by MPM system 602 is described in greater detail below.

According to an exemplary embodiment, MPM system 602 can be integrated within a single computer (e.g., one server, one housing, etc.). In various other exemplary embodiments, MPM system 602 can be distributed across multiple servers or computers (e.g., that can exist in distributed locations). In another exemplary embodiment, MPM system 602 may integrated with a smart building manager that manages multiple building systems and/or combined with BMS 606.

MPM system 602 is shown to include a communications interface 804 and a processing circuit 806. Communications interface 804 may include wired or wireless interfaces (e.g., jacks, antennas, transmitters, receivers, transceivers, wire terminals, etc.) for conducting data communications with various systems, devices, or networks. For example, communications interface 804 may include an Ethernet card and port for sending and receiving data via an Ethernet-based communications network and/or a WiFi transceiver for communicating via a wireless communications network. Communications interface 804 may be configured to communicate via local area networks or wide area networks (e.g., the Internet, a building WAN, etc.) and may use a variety of communications protocols (e.g., BACnet, IP, LON, etc.).

Communications interface 804 may be a network interface configured to facilitate electronic data communications between MPM system 602 and various external systems or devices (e.g., BMS 606, connected equipment 610, utilities 510, etc.). For example, MPM system 602 may receive information from BMS 606 indicating one or more measured states of the controlled building (e.g., temperature, humidity, electric loads, etc.) and equipment performance information for connected equipment 610 (e.g., run hours, power consumption, operating efficiency, etc.). Communications interface 804 may receive inputs from BMS 606 and/or connected equipment 610 and may provide optimization results to BMS 606 and/or other external systems or devices. The optimization results may cause BMS 606 to activate, deactivate, or adjust a setpoint for connected equipment 610 in order to achieve the optimal values of the decision variables specified in the optimization results.

Still referring to FIG. 8, processing circuit 806 is shown to include a processor 808 and memory 810. Processor 808 may be a general purpose or specific purpose processor, an application specific integrated circuit (ASIC), one or more field programmable gate arrays (FPGAs), a group of processing components, or other suitable processing components. Processor 808 may be configured to execute computer code or instructions stored in memory 810 or received from other computer readable media (e.g., CDROM, network storage, a remote server, etc.).

Memory 810 may include one or more devices (e.g., memory units, memory devices, storage devices, etc.) for storing data and/or computer code for completing and/or facilitating the various processes described in the present disclosure. Memory 810 may include random access memory (RAM), read-only memory (ROM), hard drive storage, temporary storage, non-volatile memory, flash memory, optical memory, or any other suitable memory for storing software objects and/or computer instructions. Memory 810 may include database components, object code components, script components, or any other type of information structure for supporting the various activities and information structures described in the present disclosure. Memory 810 may be communicably connected to processor 808 via processing circuit 806 and may include computer code for executing (e.g., by processor 808) one or more processes described herein.

MPM system 602 is shown to include an equipment performance monitor 824. Equipment performance monitor 824 can receive equipment performance information from BMS 606 and/or connected equipment 610. The equipment performance information can include samples of monitored variables (e.g., measured temperature, measured pressure, measured flow rate, power consumption, etc.), current operating conditions (e.g., heating or cooling load, current operating state, etc.), fault indications, or other types of information that characterize the performance of connected equipment 610. In some embodiments, equipment performance monitor 824 uses the equipment performance information to calculate the current efficiency $\eta_i$ and reliability of each device of connected equipment 610. Equipment performance monitor 824 can provide the efficiency $\eta_i$ and reliability values to model predictive optimizer 830 for use in optimizing the objective function J.

Still referring to FIG. 8, MPM system 602 is shown to include a load/rate predictor 822. Load/rate predictor 822 may be configured to predict the energy loads ($Load_i$) (e.g., heating load, cooling load, electric load, etc.) of the building or campus for each time step i of the optimization period. Load/rate predictor 822 is shown receiving weather forecasts from a weather service 604. In some embodiments, load/rate predictor 822 predicts the energy loads $Load_i$ as a function of the weather forecasts. In some embodiments, load/rate predictor 822 uses feedback from BMS 606 to predict loads $Load_i$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 822 receives a measured electric load and/or previous measured load data from BMS 606 (e.g., via equipment performance monitor 824). Load/rate predictor 822 may predict loads Load$_i$ as a function of a given weather forecast ($\hat{\phi}_w$), a day type (day), the time of day (t), and previous measured load data ($Y_{i-1}$). Such a relationship is expressed in the following equation:

$$\text{Load}_i = f(\hat{\phi}_w, \text{day}, t | Y_{i-1})$$

In some embodiments, load/rate predictor 822 uses a deterministic plus stochastic model trained from historical load data to predict loads Load$_i$. Load/rate predictor 822 may use any of a variety of prediction methods to predict loads Load$_i$ (e.g., linear regression for the deterministic portion and an AR model for the stochastic portion). Load/rate predictor 822 may predict one or more different types of loads for the building or campus. For example, load/rate predictor 822 may predict a hot water load Load$_{Hot,i}$, a cold water load Load$_{Cold,i}$, and an electric load Load$_{Elec,i}$ for each time step i within the optimization period. The predicted load values Load$_i$ can include some or all of these types of loads. In some embodiments, load/rate predictor 822 makes load/rate predictions using the techniques described in U.S. patent application Ser. No. 14/717,593.

Load/rate predictor 822 is shown receiving utility rates from utilities 608. Utility rates may indicate a cost or price per unit of a resource (e.g., electricity, natural gas, water, etc.) provided by utilities 608 at each time step i in the optimization period. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 608 or predicted utility rates estimated by load/rate predictor 822.

In some embodiments, the utility rates include demand charges for one or more resources provided by utilities 608. A demand charge may define a separate cost imposed by utilities 608 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Model predictive optimizer 830 may be configured to account for demand charges in the high level optimization process performed by high level optimizer 832. Utilities 608 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 822 may store the predicted loads Load$_i$ and the utility rates in memory 810 and/or provide the predicted loads Load$_i$ and the utility rates to model predictive optimizer 830.

Still referring to FIG. 8, MPM system 602 is shown to include a model predictive optimizer 830. Model predictive optimizer 830 can be configured to perform a multi-level optimization process to optimize the total cost associated with purchasing, maintaining, and operating connected equipment 610. In some embodiments, model predictive optimizer 830 includes a high level optimizer 832 and a low level optimizer 834. High level optimizer 832 may optimize the objective function J for an entire set of connected equipment 610 (e.g., all of the devices within a building) or for a subset of connected equipment 610 (e.g., a single device, all of the devices of a subplant or building subsystem, etc.) to determine the optimal values for each of the decision variables (e.g., $P_{op,i}$, $B_{main,i}$, and $B_{cap,i}$) in the objective function J. The optimization performed by high level optimizer 832 is described in greater detail with reference to FIG. 9.

In some embodiments, low level optimizer 834 receives the optimization results from high level optimizer 832. The optimization results may include optimal power consumption values $P_{op,i}$ and/or load values Load$_i$ for each device or set of devices of connected equipment at each time step i in the optimization period. Low level optimizer 834 may determine how to best run each device or set of devices at the load values determined by high level optimizer 832. For example, low level optimizer 834 may determine on/off states and/or operating setpoints for various devices of connected equipment 610 in order to optimize (e.g., minimize) the power consumption of connected equipment 610 meeting the corresponding load value Load$_i$.

Low level optimizer 834 may be configured to generate equipment performance curves for each device or set of devices of connected equipment 610. Each performance curve may indicate an amount of resource consumption (e.g., electricity use measured in kW, water use measured in L/s, etc.) by a particular device or set of devices of connected equipment 610 as a function of the load on the device or set of devices. In some embodiments, low level optimizer 834 generates the performance curves by performing a low level optimization process at various combinations of load points (e.g., various values of Load$_i$) and weather conditions to generate multiple data points. The low level optimization may be used to determine the minimum amount of resource consumption required to satisfy the corresponding heating or cooling load. An example of a low level optimization process which can be performed by low level optimizer 834 is described in detail in U.S. patent application Ser. No. 14/634,615 titled "Low Level Central Plant Optimization" and filed Feb. 27, 2015, the entire disclosure of which is incorporated by reference herein. Low level optimizer 834 may fit a curve to the data points to generate the performance curves.

In some embodiments, low level optimizer 834 generates equipment performance curves for a set of connected equipment 610 (e.g., a chiller subplant, a heater subplant, etc.) by combining efficiency curves for individual devices of connected equipment 610. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 818. For some devices, the device efficiency curves may indicate that resource consumption is a U-shaped function of load. Accordingly, when multiple device efficiency curves are combined into a performance curve for multiple devices, the resultant performance curve may be a wavy curve. The waves are caused by a single device loading up before it is more efficient to turn on another device to satisfy the subplant load. Low level optimizer 834 may provide the equipment performance curves to high level optimizer 832 for use in the high level optimization process.

Still referring to FIG. 8, MPM system 602 is shown to include an equipment controller 828. Equipment controller 828 can be configured to control connected equipment 610 to affect a variable state or condition in building 10 (e.g., temperature, humidity, etc.). In some embodiments, equipment controller 828 controls connected equipment 610 based on the results of the optimization performed by model predictive optimizer 830. In some embodiments, equipment controller 828 generates control signals which can be provided to connected equipment 610 via communications interface 804 and/or BMS 606. The control signals may be based on the optimal values of the decision variables in the objective function J. For example, equipment controller 828 may generate control signals which cause connected equipment 610 to achieve the optimal power consumption values $P_{op,i}$ for each time step i in the optimization period.

Data and processing results from model predictive optimizer 830, equipment controller 828, or other modules of MPM system 602 may be accessed by (or pushed to) monitoring and reporting applications 826. Monitoring and reporting applications 826 may be configured to generate real time "system health" dashboards that can be viewed and navigated by a user (e.g., a system engineer). For example, monitoring and reporting applications 826 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across building management systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the building system.

Still referring to FIG. 8, MPM system 602 may include one or more GUI servers, web services 812, or GUI engines 814 to support monitoring and reporting applications 826. In various embodiments, applications 826, web services 812, and GUI engine 814 may be provided as separate components outside of MPM system 602 (e.g., as part of a smart building manager). MPM system 602 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. MPM system 602 may be configured to provide the results of any such processing to other databases, tables, XML files, or other data structures for further querying, calculation, or access by, for example, external monitoring and reporting applications.

MPM system 602 is shown to include configuration tools 816. Configuration tools 816 can allow a user to define (e.g., via graphical user interfaces, via prompt-driven "wizards," etc.) how MPM system 602 should react to changing conditions in BMS 606 and/or connected equipment 610. In an exemplary embodiment, configuration tools 816 allow a user to build and store condition-response scenarios that can cross multiple devices of connected equipment 610, multiple building systems, and multiple enterprise control applications (e.g., work order management system applications, entity resource planning applications, etc.). For example, configuration tools 816 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 816 can present user interfaces for building such conditional logic. The user interfaces may allow users to define policies and responses graphically. In some embodiments, the user interfaces may allow a user to select a pre-stored or pre-constructed policy and adapt it or enable it for use with their system.

High Level Optimizer

Figure 9:
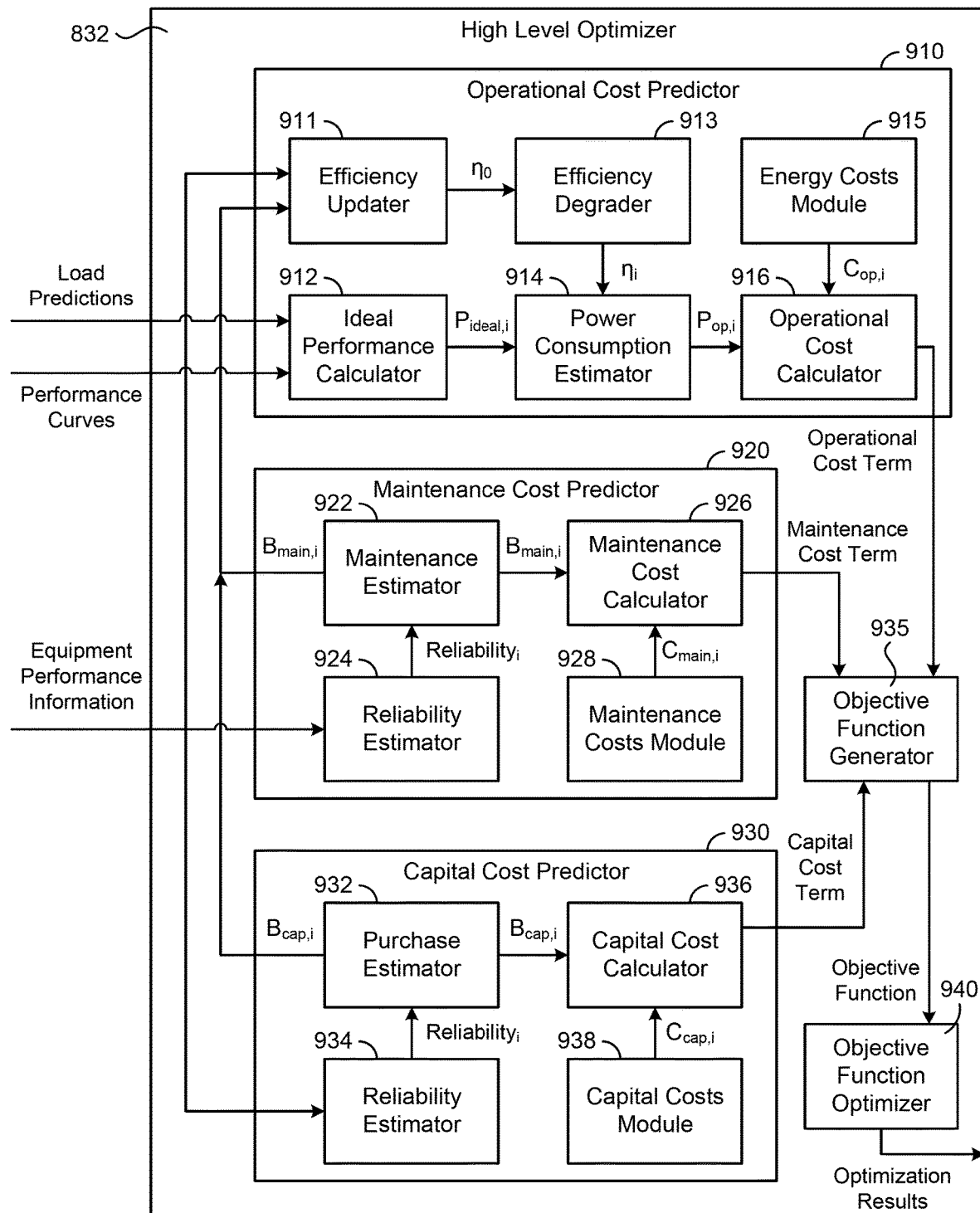
FIG. 9 is a block diagram illustrating a high level optimizer of the MPM system of FIG. 6 in greater detail, according to some embodiments.

Referring now to FIG. 9, a block diagram illustrating high level optimizer 832 in greater detail is shown, according to an exemplary embodiment. High level optimizer 832 can be configured to determine an optimal maintenance strategy for connected equipment 610. In some embodiments, the optimal maintenance strategy is a set of decisions which optimizes the total cost associated with purchasing, maintaining, and operating connected equipment 610 over the duration of an optimization period (e.g., 30 weeks, 52 weeks, 10 years, 30 years, etc.). The decisions can include, for example, equipment purchase decisions, equipment maintenance decisions, and equipment operating decisions.

High level optimizer 832 is shown to include an operational cost predictor 910, a maintenance cost predictor 920, a capital cost predictor 930, an objective function generator 935, and an objective function optimizer 940. Cost predictors 910, 920, and 930 can use a model predictive control technique to formulate an objective function which expresses the total cost as a function of several decision variables (e.g., maintenance decisions, equipment purchase decisions, etc.) and input parameters (e.g., energy cost, device efficiency, device reliability). Operational cost predictor 910 can be configured to formulate an operational cost term in the objective function. Similarly, maintenance cost predictor 920 can be configured to formulate a maintenance cost term in the objective function and capital cost predictor 930 can be configured to formulate a capital cost term in the objective function. Objective function optimizer 940 can optimize (i.e., minimize) the objective function using any of a variety of optimization techniques to identify the optimal values for each of the decision variables.

One example of an objective function which can be generated by high level optimizer 832 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Operational Cost Predictor

Operational cost predictor 910 can be configured to formulate the first term in the objective function J. The first term in the objective function J represents the operating cost of connected equipment 610 over the duration of the optimization period and is shown to include three variables or parameters (i.e., $C_{op,i}$, $P_{op,i}$, and $\Delta t$). In some embodiments, the cost per unit of energy $C_{op,i}$ is determined by energy costs module 915. Energy costs module 915 can receive a set of energy prices from utility 608 as energy pricing data. In some embodiments, the energy prices are time-varying cost that depend on the time of day, the day of the week (e.g., weekday vs. weekend), the current season (e.g., summer vs. winter), or other time-based factors. For example, the cost of electricity may be higher during peak energy consumption periods and lower during off-peak or partial-peak energy consumption periods.

Energy costs module 915 can use the energy costs to define the value of $C_{op,i}$ for each time step i of the optimization period. In some embodiments, energy costs module 915 stores the energy costs as an array $C_{op}$ including a cost element for each of the h time steps in the optimization period. For example, energy costs module 915 can generate the following array:

$$C_{op} = [C_{op,1} C_{op,2} \ldots C_{op,h}]$$

where the array $C_{op}$ has a size of 1×h and each element of the array $C_{op}$ includes an energy cost value $C_{op,i}$ for a particular time step i=1 ... h of the optimization period.

Still referring to FIG. 9, operational cost predictor 910 is shown to include an ideal performance calculator 912. Ideal performance calculator 912 may receive load predictions $Load_i$ from load/rate predictor 822 and may receive performance curves from low level optimizer 834. As discussed above, the performance curves may define the ideal power consumption $P_{ideal}$ of a device or set of devices of connected equipment 610 as a function of the heating or cooling load on the device or set of devices. For example, the performance curve one or more devices of connected equipment 610 can be defined by the following equation:

$$P_{ideal,i} = f(Load_i)$$

where $P_{ideal,i}$ is the ideal power consumption (e.g., kW) of connected equipment 610 at time step i and $Load_i$ is the load (e.g., tons cooling, kW heating, etc.) on connected equipment 610 at time step i. The ideal power consumption $P_{ideal,i}$ may represent the power consumption of the one or more devices of connected equipment 610 assuming they operate at perfect efficiency.

Ideal performance calculator 912 can use the performance curve for a device or set of devices of connected equipment 610 to identify the value of $P_{ideal,i}$ that corresponds to the load point $Load_i$ for the device or set of devices at each time step of the optimization period. In some embodiments, ideal performance calculator 912 stores the ideal load values as an array $P_{ideal}$ including an element for each of the h time steps in the optimization period. For example, ideal performance calculator 912 can generate the following array:

$$P_{ideal} = [P_{ideal,1} P_{ideal,2} \ldots P_{ideal,h}]^T$$

where the array $P_{ideal}$ has a size of h×1 and each element of the array $P_{ideal}$ includes an ideal power consumption value $P_{ideal,i}$ for a particular time step i=1 ... h of the optimization period.

Still referring to FIG. 9, operational cost predictor 910 is shown to include an efficiency updater 911 and an efficiency degrader 913. Efficiency updater 911 can be configured to determine the efficiency η of connected equipment 610 under actual operating conditions. In some embodiments, the efficiency $\eta_i$ represents the ratio of the ideal power consumption $P_{ideal}$ of connected equipment to the actual power consumption $P_{actual}$ of connected equipment 610, as shown in the following equation:

$$\eta = \frac{P_{ideal}}{P_{actual}}$$

where $P_{ideal}$ is the ideal power consumption of connected equipment 610 as defined by the performance curve for connected equipment 610 and $P_{actual}$ is the actual power consumption of connected equipment 610. In some embodiments, efficiency updater 911 uses the equipment performance information collected from connected equipment 610 to identify the actual power consumption value $P_{actual}$. Efficiency updater 911 can use the actual power consumption $P_{actual}$ in combination with the ideal power consumption $P_{ideal}$ to calculate the efficiency η.

Efficiency updater 911 can be configured to periodically update the efficiency η to reflect the current operating efficiency of connected equipment 610. For example, efficiency updater 911 can calculate the efficiency η of connected equipment 610 once per day, once per week, once per year, or at any other interval as may be suitable to capture changes in the efficiency η over time. Each value of the efficiency η may be based on corresponding values of $P_{ideal}$ and $P_{actual}$ at the time the efficiency η is calculated. In some embodiments, efficiency updater 911 updates the efficiency η each time the high level optimization process is performed (i.e., each time the objective function J is optimized). The efficiency value calculated by efficiency updater 911 may be stored in memory 810 as an initial efficiency value $\eta_0$, where the subscript 0 denotes the value of the efficiency η at or before the beginning of the optimization period (e.g., at time step 0).

In some embodiments, efficiency updater 911 updates the efficiency $\eta_i$ for one or more time steps during the optimization period to account for increases in the efficiency η of connected equipment 610 that will result from performing maintenance on connected equipment 610 or purchasing new equipment to replace or supplement one or more devices of connected equipment 610. The time steps i at which the efficiency $\eta_i$ is updated may correspond to the predicted time steps at which the maintenance will be performed or the equipment will replaced. The predicted time steps at which maintenance will be performed on connected equipment 610 may be defined by the values of the binary decision variables $B_{main,i}$ in the objective function J. Similarly, the predicted time steps at which the equipment will be replaced may be defined by the values of the binary decision variables $B_{cap,i}$ in the objective function J.

Efficiency updater 911 can be configured to reset the efficiency $\eta_i$ for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, efficiency updater 911 can be configured to reset the value of to $\eta_i$ to $\eta_{main}$, where $\eta_{main}$ is the efficiency value that is expected to result from the maintenance performed at time step i. Similarly, if $B_{cap,i}=1$, efficiency updater 911 can be configured to reset the value of $\eta_i$ to $\eta_{cap}$, where $\eta_{cap}$ is the efficiency value that is expected to result from purchasing a new device to supplement or replace one or more devices of connected equipment 610 performed at time step i. Efficiency updater 911 can dynamically reset the efficiency $\eta_i$ for one or more time steps while the optimization is being performed (e.g., with each iteration of the optimization) based on the values of binary decision variables $B_{main,i}$ and $B_{cap,i}$.

Efficiency degrader 913 can be configured to predict the efficiency $\eta_i$ of connected equipment 610 at each time step i of the optimization period. The initial efficiency $\eta_0$ at the beginning of the optimization period may degrade over time as connected equipment 610 degrade in performance. For example, the efficiency of a chiller may degrade over time as a result of the chilled water tubes becoming dirty and reducing the heat transfer coefficient of the chiller. Similarly, the efficiency of a battery may decrease over time as a result of degradation in the physical or chemical components of the battery. Efficiency degrader 913 can be configured to account for such degradation by incrementally reducing the efficiency $\eta_i$ over the duration of the optimization period.

In some embodiments, the initial efficiency value $\eta_0$ is updated at the beginning of each optimization period. However, the efficiency $\eta$ may degrade during the optimization period such that the initial efficiency value $\eta_0$ becomes increasingly inaccurate over the duration of the optimization period. To account for efficiency degradation during the optimization period, efficiency degrader 913 can decrease the efficiency $\eta$ by a predetermined amount with each successive time step. For example, efficiency degrader 913 can define the efficiency at each time step i=1 . . . h as follows:

$$\eta_i = \eta_{i-1} - \Delta\eta$$

where $\eta_i$ is the efficiency at time step i, $\eta_{i-1}$ is the efficiency at time step i−1, and $\Delta_\eta$ is the degradation in efficiency between consecutive time steps. In some embodiments, this definition of $\eta_i$ is applied to each time step for which $B_{main,i}=0$ and $B_{cap,i}=0$. However, if either $B_{main,i}=1$ or $B_{cap,i}=1$, the value of $\eta_i$ may be reset to either $\eta_{main}$ or $\eta_{cap}$ as previously described.

In some embodiments, the value of $\Delta\eta$ is based on a time series of efficiency values calculated by efficiency updater 911. For example, efficiency degrader 913 may record a time series of the initial efficiency values $\eta_0$ calculated by efficiency updater 911, where each of the initial efficiency values $\eta_0$ represents the empirically-calculated efficiency of connected equipment 610 at a particular time. Efficiency degrader 913 can examine the time series of initial efficiency values $\eta_0$ to determine the rate at which the efficiency degrades. For example, if the initial efficiency $\eta_0$ at time $t_1$ is $\eta_{0,1}$ and the initial efficiency at time $t_2$ is $\eta_{0,2}$, efficiency degrader 913 can calculate the rate of efficiency degradation as follows:

$$\frac{\Delta\eta}{\Delta t} = \frac{\eta_{0,2} - \eta_{0,1}}{t_2 - t_1}$$

where $$\frac{\Delta\eta}{\Delta t}$$

is the rate of efficiency degradation. Efficiency degrader 913 can multiply $$\frac{\Delta\eta}{\Delta t}$$

by the duration of each time step $\Delta t$ to calculate the value of $\Delta\eta$ $$\left(\text{i.e., } \Delta\eta = \frac{\Delta\eta}{\Delta t} * \Delta t\right).$$

In some embodiments, efficiency degrader 913 stores the efficiency values over the duration of the optimization period in an array $\eta$ including an element for each of the h time steps in the optimization period. For example, efficiency degrader 913 can generate the following array:

$$\eta = [\eta_1 \eta_2 \ldots \eta_h]$$

where the array has a size of 1×h and each element of the array includes an efficiency value $\eta_i$ for a particular time step i=1 . . . h of the optimization period. Each element i of the array $\eta$ may be calculated based on the value of the previous element and the value of $\Delta_\eta$ (e.g., if $B_{main,i}=0$ and $B_{cap,i}=0$) or may be dynamically reset to either $\eta_{main}$ or $\eta_{cap}$ (e.g., if $B_{main,i}=1$ or $B_{cap,i}=1$.

The logic characterizing the efficiency updating and resetting operations performed by efficiency updater 911 and efficiency degrader 913 can be summarized in the following equations:

if $B_{main,i}=1 \rightarrow \eta_i = \eta_{main}$ if $B_{cap,i}=1 \rightarrow \eta_i = \eta_{cap}$ if $B_{main,i}=0$ and $B_{cap,i}=0 \rightarrow \eta_i = \eta_{i-1} - \Delta\eta$ which can be applied as constraints on the high level optimization performed by objective function optimizer 940.

Advantageously, efficiency updater 911 and efficiency degrader 913 can model the efficiency $\eta_i$ of connected equipment 610 at each time step i as a function of the maintenance decisions $B_{main,i}$ and the equipment purchase decisions $B_{cap,i}$. For example, the efficiency $\eta_i$ for a particular device may start at an initial value $\eta_0$ at the beginning of the optimization period and may degrade over time such that the efficiency $\eta_i$ decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Still referring to FIG. 9, operational cost predictor 910 is shown to include a power consumption estimator 914 and an operational cost calculator 916. Power consumption estimator 914 can be configured to estimate the power consumption $P_{op,i}$ of connected equipment 610 at each time step i of the optimization period. In some embodiments, power consumption estimator 914 estimates the power consumption $P_{op,i}$ as a function of the ideal power consumption $P_{ideal,i}$ calculated by ideal performance calculator 912 and the efficiency $\eta_i$ determined by efficiency degrader 913 and/or efficiency updater 911. For example, power consumption estimator 914 can calculate the power consumption $P_{op,i}$ using the following equation:

$$P_{op,i} = \frac{P_{ideal,i}}{\eta_i}$$

where $P_{ideal,i}$ is the power consumption calculated by ideal performance calculator 912 based on the equipment performance curve for the device at the corresponding load point $Load_i$, and $\eta_i$ is the operating efficiency of the device at time step i.

In some embodiments, power consumption estimator 914 stores the power consumption values as an array $P_{op}$ including an element for each of the h time steps in the optimization period. For example, power consumption estimator 914 can generate the following array:

$$P_{op} = [P_{op,1} P_{op,2} \ldots P_{op,h}]^T$$

where the array $P_{op}$ has a size of h×1 and each element of the array $P_{op}$ includes a power consumption value $P_{op,i}$ for a particular time step i=1 ... h of the optimization period.

Operational cost calculator 916 can be configured to estimate the operational cost of connected equipment 610 over the duration of the optimization period. In some embodiments, operational cost calculator 916 calculates the operational cost during each time step i using the following equation:

$$\text{Cost}_{op,i} = C_{op,i} P_{op,i} \Delta t$$

where $P_{op,i}$ is the predicted power consumption at time step i determined by power consumption estimator 914, $C_{op,i}$ is the cost per unit of energy at time step i determined by energy costs module 915, and $\Delta t$ is the duration of each time step. Operational cost calculator 916 can sum the operational costs over the duration of the optimization period as follows:

$$\text{Cost}_{op} = \sum_{i=1}^{h} \text{Cost}_{op,i}$$

where $\text{Cost}_{op}$ is the operational cost term of the objective function J.

In other embodiments, operational cost calculator 916 estimates the operational cost $\text{Cost}_{op}$ by multiplying the cost array $C_{op}$ by the power consumption array $P_{op}$ and the duration of each time step $\Delta t$ as shown in the following equations:

$$\text{Cost}_{op} = C_{op} P_{op} \Delta t$$

$$\text{Cost}_{op} = [C_{op,1} C_{op,2} \ldots C_{op,h}][P_{op,1} P_{op,2} \ldots P_{op,h}]^T \Delta t$$

Maintenance Cost Predictor

Maintenance cost predictor 920 can be configured to formulate the second term in the objective function J. The second term in the objective function J represents the cost of performing maintenance on connected equipment 610 over the duration of the optimization period and is shown to include two variables or parameters (i.e., $C_{main,i}$ and $B_{main,i}$). Maintenance cost predictor 920 is shown to include a maintenance estimator 922, a reliability estimator 924, a maintenance cost calculator 926, and a maintenance costs module 928.

Reliability estimator 924 can be configured to estimate the reliability of connected equipment 610 based on the equipment performance information received from connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance and/or an amount of time that has elapsed since connected equipment 610 was purchased or installed.

In some embodiments, reliability estimator 924 uses the equipment performance information to identify a current operating state of connected equipment 610. The current operating state can be examined by reliability estimator 924 to expose when connected equipment 610 begins to degrade in performance and/or to predict when faults will occur. In some embodiments, reliability estimator 924 estimates a likelihood of various types of failures that could potentially occur in connected equipment 610. The likelihood of each failure may be based on the current operating conditions of connected equipment 610, an amount of time that has elapsed since connected equipment 610 has been installed, and/or an amount of time that has elapsed since maintenance was last performed. In some embodiments, reliability estimator 924 identifies operating states and predicts the likelihood of various failures using the systems and methods described in U.S. patent application Ser. No. 15/188,824 titled "Building Management System With Predictive Diagnostics" and filed Jun. 21, 2016, the entire disclosure of which is incorporated by reference herein.

In some embodiments, reliability estimator 924 receives operating data from a plurality of devices of connected equipment 610 distributed across multiple buildings. The operating data can include, for example, current operating conditions, fault indications, failure times, or other data that characterize the operation and performance of connected equipment 610. Reliability estimator 924 can use the set of operating data to develop a reliability model for each type of equipment. The reliability models can be used by reliability estimator 924 to estimate the reliability of any given device of connected equipment 610 as a function of its current operating conditions and/or other extraneous factors (e.g., time since maintenance was last performed, time since installation or purchase, geographic location, water quality, etc.).

One example of a reliability model which can be used by reliability estimator 924 is shown in the following equation:

$$\text{Reliability}_i = f(\text{OpCond}_i, \Delta t_{main,i}, \Delta t_{cap,i})$$

where $\text{Reliability}_i$ is the reliability of connected equipment 610 at time step i, $\text{OpCond}_i$ are the operating conditions at time step i, $\Delta t_{main,i}$ is the amount of time that has elapsed between the time at which maintenance was last performed and time step i, and $\Delta t_{cap,i}$ is the amount of time that has elapsed between the time at which connected equipment 610 was purchased or installed and time step i. Reliability estimator 924 can be configured to identify the current operating conditions $\text{OpCond}_i$ based on the equipment performance information received as a feedback from connected equipment 610. Operating under more strenuous conditions (e.g., high load, extreme temperatures, etc.) may result in a lower reliability, whereas operating under less strenuous conditions (e.g., low load, moderate temperatures, etc.) may result in a higher reliability.

Reliability estimator 924 may determine the amount of time $\Delta t_{main,i}$ that has elapsed since maintenance was last performed on connected equipment 610 based on the values of the binary decision variables $B_{main,i}$. For each time step i, reliability estimator 924 can examine the corresponding values of $B_{main}$ at time step i and each previous time step (e.g., time steps i−1, i−2, . . . , 1). Reliability estimator 924 can calculate the value of $\Delta t_{main,i}$ by subtracting the time at which maintenance was last performed (i.e., the most recent time at which $B_{main,i}=1$) from the time associated with time step i. A long amount of time $\Delta t_{main,i}$ since maintenance was last performed may result in a lower reliability, whereas a short amount of time since maintenance was last performed may result in a higher reliability.

Similarly, reliability estimator 924 may determine the amount of time $\Delta t_{cap,i}$ that has elapsed since connected equipment 610 was purchased or installed based on the values of the binary decision variables $B_{cap,i}$. For each time step i, reliability estimator 924 can examine the corresponding values of $B_{cap}$ at time step i and each previous time step (e.g., time steps i−1, i−2, . . . , 1. Reliability estimator 924 can calculate the value of $\Delta t_{cap,i}$ by subtracting the time at which connected equipment 610 was purchased or installed (i.e., the most recent time at which $B_{cap,i}=1$) from the time associated with time step i. A long amount of time $\Delta t_{cap,i}$ since connected equipment 610 was purchased or installed may result in a lower reliability, whereas a short amount of time since connected equipment 610 was purchased or installed may result in a higher reliability.

Reliability estimator 924 can be configured to reset the reliability for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main}=1$, reliability estimator 924 can be configured to reset the value of Reliability to $Reliability_{main}$, where $Reliability_{main}$ is the reliability value that is expected to result from the maintenance performed at time step i. Similarly, if $B_{cap,i}=1$, reliability estimator 924 can be configured to reset the value of Reliability to $Reliability_{cap}$, where $Reliability_{cap}$ is the reliability value that is expected to result from purchasing a new device to supplement or replace one or more devices of connected equipment 610 performed at time step i. Reliability estimator 924 can dynamically reset the reliability for one or more time steps while the optimization is being performed (e.g., with each iteration of the optimization) based on the values of binary decision variables $B_{main,i}$ and $B_{cap,i}$.

Maintenance estimator 922 can be configured to use the estimated reliability of connected equipment 610 over the duration of the optimization period to determine the probability that connected equipment 610 will require maintenance and/or replacement at each time step of the optimization period. In some embodiments, maintenance estimator 922 is configured to compare the probability that connected equipment 610 will require maintenance at a given time step to a critical value. Maintenance estimator 922 can be configured to set the value of $B_{main,i}=1$ in response to a determination that the probability that connected equipment 610 will require maintenance at time step i exceeds the critical value. Similarly, maintenance estimator 922 can be configured to compare the probability that connected equipment 610 will require replacement at a given time step to a critical value. Maintenance estimator 922 can be configured to set the value of $B_{cap,i}=1$ in response to a determination that the probability that connected equipment 610 will require replacement at time step i exceeds the critical value.

In some embodiments, a reciprocal relationship exists between the reliability of connected equipment 610 and the values of the binary decision variables $B_{main,i}$ and $B_{cap,i}$. In other words, the reliability of connected equipment 610 can affect the values of the binary decision variables $B_{main,i}$ and $B_{cap,i}$ selected in the optimization, and the values of the binary decision variables $B_{main,i}$ and $B_{cap,i}$ can affect the reliability of connected equipment 610. Advantageously, the optimization performed by objective function optimizer 940 can identify the optimal values of the binary decision variables $B_{main,i}$ and $B_{cap,i}$ while accounting for the reciprocal relationship between the binary decision variables $B_{main,i}$ and $B_{cap,i}$ and the reliability of connected equipment 610.

In some embodiments, maintenance estimator 922 generates a matrix $B_{main}$ of the binary maintenance decision variables. The matrix $B_{main}$ may include a binary decision variable for each of the different maintenance activities that can be performed at each time step of the optimization period. For example, maintenance estimator 922 can generate the following matrix:

$$B_{main} = \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

where the matrix $B_{main}$ has a size of m×h and each element of the matrix $B_{main}$ includes a binary decision variable for a particular maintenance activity at a particular time step of the optimization period. For example, the value of the binary decision variable $B_{main,j,i}$ indicates whether the jth maintenance activity will be performed during the ith time step of the optimization period.

Still referring to FIG. 9, maintenance cost predictor 920 is shown to include a maintenance costs module 928 and a maintenance costs calculator 926. Maintenance costs module 928 can be configured to determine costs $C_{main,i}$ associated with performing various types of maintenance on connected equipment 610. Maintenance costs module 928 can receive a set of maintenance costs from an external system or device (e.g., a database, a user device, etc.). In some embodiments, the maintenance costs define the economic cost (e.g., $) of performing various types of maintenance. Each type of maintenance activity may have a different economic cost associated therewith. For example, the maintenance activity of changing the oil in a chiller compressor may incur a relatively small economic cost, whereas the maintenance activity of completely disassembling the chiller and cleaning all of the chilled water tubes may incur a significantly larger economic cost.

Maintenance costs module 928 can use the maintenance costs to define the values of $C_{main,i}$ in objective function J. In some embodiments, maintenance costs module 928 stores the maintenance costs as an array $C_{main}$ including a cost element for each of the maintenance activities that can be performed. For example, maintenance costs module 928 can generate the following array:

$$C_{main} = [C_{main,1} C_{main,2} \cdots C_{main,m}]$$

where the array $C_{main}$ has a size of 1×m and each element of the array $C_{main}$ includes a maintenance cost value $C_{main,j}$ for a particular maintenance activity j=1 . . . m.

Some maintenance activities may be more expensive than other. However, different types of maintenance activities may result in different levels of improvement to the efficiency η and/or the reliability of connected equipment 610. For example, merely changing the oil in a chiller may result in a minor improvement in efficiency η and/or a minor improvement in reliability, whereas completely disassembling the chiller and cleaning all of the chilled water tubes may result in a significantly greater improvement to the efficiency η and/or the reliability of connected equipment 610. Accordingly, multiple different levels of post-maintenance efficiency (i.e., $\eta_{main}$) and post-maintenance reliability (i.e., $Reliability_{main}$) may exist. Each level of $\eta_{main}$ and $Reliability_{main}$ may correspond to a different type of maintenance activity.

In some embodiments, maintenance estimator 922 stores each of the different levels of $\eta_{main}$ and $Reliability_{main}$ in a corresponding array. For example, the parameter $\eta_{main}$ can be defined as an array $\eta_{main}$ with an element for each of the m different types of maintenance activities. Similarly, the parameter $Reliability_{main}$ can be defined as an array $Reliability_{main}$ with an element for each of the m different types of maintenance activities. Examples of these arrays are shown in the following equations:

$$\eta_{main} = [\eta_{main,1} \eta_{main,2} \cdots \eta_{main,m}]$$

$$Reliability_{main} = [Reliability_{main,1} Reliability_{main,2} \cdots Reliability_{main,m}]$$

where the array $\eta_{main}$ has a size of 1×m and each element of the array $\eta_{main}$ includes a post-maintenance efficiency value $\eta_{main,j}$ for a particular maintenance activity. Similarly, the array $Reliability_{main}$ has a size of 1×m and each element of the array $Reliability_{main}$ includes a post-maintenance reliability value $Reliability_{main,j}$ for a particular maintenance activity.

In some embodiments, efficiency updater 911 identifies the maintenance activity associated with each binary decision variable $B_{main,j,i}$ and resets the efficiency η to the corresponding post-maintenance efficiency level $\eta_{main,j}$ if $B_{main,j,i}=1$. Similarly, reliability estimator 924 can identify the maintenance activity associated with each binary decision variable $B_{main,j,i}$ and can reset the reliability to the corresponding post-maintenance reliability level $Reliability_{main,i}$ if $B_{main,j,i}=1$.

Maintenance cost calculator 926 can be configured to estimate the maintenance cost of connected equipment 610 over the duration of the optimization period. In some embodiments, maintenance cost calculator 926 calculates the maintenance cost during each time step i using the following equation:

$$Cost_{main,i} = C_{main,i} B_{main,i}$$

where $C_{main,i}$ is an array of maintenance costs including an element for each of the m different types of maintenance activities that can be performed at time step i and $B_{main,i}$ is an array of binary decision variables indicating whether each of the m maintenance activities will be performed at time step i. Maintenance cost calculator 926 can sum the maintenance costs over the duration of the optimization period as follows:

$$Cost_{main} = \sum_{i=1}^{h} Cost_{main,i}$$

where $Cost_{main}$ is the maintenance cost term of the objective function J.

In other embodiments, maintenance cost calculator 926 estimates the maintenance cost $Cost_{main}$ by multiplying the maintenance cost array $C_{main}$ by the matrix of binary decision variables $B_{main}$ as shown in the following equations:

$$Cost_{main} = C_{main} B_{main}$$

$$Cost_{main} = [C_{main,1} \; C_{main,2} \; \cdots \; C_{main,m}] \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

Capital Cost Predictor

Capital cost predictor 930 can be configured to formulate the third term in the objective function J. The third term in the objective function J represents the cost of purchasing new devices of connected equipment 610 over the duration of the optimization period and is shown to include two variables or parameters (i.e., $C_{cap,i}$ and $B_{cap,i}$). Capital cost predictor 930 is shown to include a purchase estimator 932, a reliability estimator 934, a capital cost calculator 936, and a capital costs module 938.

Reliability estimator 934 can include some or all of the features of reliability estimator 924, as described with reference to maintenance cost predictor 920. For example, reliability estimator 934 can be configured to estimate the reliability of connected equipment 610 based on the equipment performance information received from connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance and/or an amount of time that has elapsed since connected equipment 610 was purchased or installed. Reliability estimator 934 can include some or all of the features and/or functionality of reliability estimator 924, as previously described.

Purchase estimator 932 can be configured to use the estimated reliability of connected equipment 610 over the duration of the optimization period to determine the probability that new devices of connected equipment 610 will be purchased at each time step of the optimization period. In some embodiments, purchase estimator 932 is configured to compare the probability that new devices of connected equipment 610 will be purchased at a given time step to a critical value. Purchase estimator 932 can be configured to set the value of $B_{cap,i}=1$ in response to a determination that the probability that connected equipment 610 will be purchased at time step i exceeds the critical value.

In some embodiments, purchase estimator 932 generates a matrix $B_{cap}$ of the binary capital decision variables. The matrix $B_{cap}$ may include a binary decision variable for each of the different capital purchases that can be made at each time step of the optimization period. For example, purchase estimator 932 can generate the following matrix:

$$B_{cap} = \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

where the matrix $B_{cap}$ has a size of p×h and each element of the matrix $B_{cap}$ includes a binary decision variable for a particular capital purchase at a particular time step of the optimization period. For example, the value of the binary decision variable $B_{cap,k,i}$ indicates whether the kth capital purchase will be made during the ith time step of the optimization period.

Still referring to FIG. 9, capital cost predictor 930 is shown to include a capital costs module 938 and a capital cost calculator 936. Capital costs module 938 can be configured to determine costs $C_{cap,i}$ associated with various capital purchases (i.e., purchasing one or more new devices of connected equipment 610). Capital costs module 938 can receive a set of capital costs from an external system or device (e.g., a database, a user device, etc.). In some embodiments, the capital costs define the economic cost (e.g., $) of making various capital purchases. Each type of capital purchase may have a different economic cost associated therewith. For example, purchasing a new temperature sensor may incur a relatively small economic cost, whereas purchasing a new chiller may incur a significantly larger economic cost.

Capital costs module 938 can use the purchase costs to define the values of $C_{cap,i}$ in objective function J. In some embodiments, capital costs module 938 stores the capital costs as an array $C_{cap}$ including a cost element for each of the capital purchases that can be made. For example, capital costs module 938 can generate the following array:

$$C_{cap} = [C_{cap,1} C_{cap,2} \cdots C_{cap,p}]$$

where the array $C_{cap}$ has a size of 1×p and each element of the array $C_{cap}$ includes a cost value $C_{cap,k}$ for a particular capital purchase k=1 ... p.

Some capital purchases may be more expensive than other. However, different types of capital purchases may result in different levels of improvement to the efficiency η and/or the reliability of connected equipment 610. For example, purchasing a new sensor to replace an existing sensor may result in a minor improvement in efficiency η and/or a minor improvement in reliability, whereas purchasing a new chiller and control system may result in a significantly greater improvement to the efficiency η and/or the reliability of connected equipment 610. Accordingly, multiple different levels of post-purchase efficiency (i.e., $\eta_{cap}$) and post-purchase reliability (i.e., Reliability$_{cap}$) may exist. Each level of $\eta_{cap}$ and Reliability$_{cap}$ may correspond to a different type of capital purchase.

In some embodiments, purchase estimator 932 stores each of the different levels of $\eta_{cap}$ and Reliability$_{cap}$ in a corresponding array. For example, the parameter $\eta_{cap}$ can be defined as an array $\eta_{cap}$ with an element for each of the p different types of capital purchases which can be made. Similarly, the parameter Reliability$_{cap}$ can be defined as an array Reliability$_{cap}$ with an element for each of the p different types of capital purchases that can be made. Examples of these arrays are shown in the following equations:

$$\eta_{cap} = [\eta_{cap,1} \eta_{cap,2} \cdots \eta_{cap,p}]$$

$$\text{Reliability}_{cap} = [\text{Reliability}_{cap,1} \text{Reliability}_{cap,2} \cdots \text{Reliability}_{cap,p}]$$

where the array $\eta_{cap}$ has a size of 1×p and each element of the array $\eta_{cap}$ includes a post-purchase efficiency value $\eta_{cap,k}$ for a particular capital purchase k. Similarly, the array Reliability$_{cap}$ has a size of 1×p and each element of the array Reliability$_{cap}$ includes a post-purchase reliability value Reliability$_{cap,k}$ for a particular capital purchase k.

In some embodiments, efficiency updater 911 identifies the capital purchase associated with each binary decision variable $B_{main,k,i}$ and resets the efficiency η to the corresponding post-purchase efficiency level $\eta_{cap,k}$ if $B_{cap,k,i}=1$. Similarly, reliability estimator 924 can identify the capital purchase associated with each binary decision variable $B_{cap,k,i}$ and can reset the reliability to the corresponding post-purchase reliability level Reliability$_{cap,k}$ if $B_{main,k,i}=1$.

Capital cost calculator 936 can be configured to estimate the capital cost of connected equipment 610 over the duration of the optimization period. In some embodiments, capital cost calculator 936 calculates the capital cost during each time step i using the following equation:

$$\text{Cost}_{cap,i} = C_{cap,i} B_{cap,i}$$

where $C_{cap,i}$ is an array of capital purchase costs including an element for each of the p different capital purchases that can be made at time step i and $B_{cap,i}$ is an array of binary decision variables indicating whether each of the p capital purchases will be made at time step i. Capital cost calculator 936 can sum the capital costs over the duration of the optimization period as follows:

$$\text{Cost}_{cap} = \sum_{i=1}^{h} \text{Cost}_{cap,i}$$

where Cost$_{cap}$ is the capital cost term of the objective function J.

In other embodiments, capital cost calculator 936 estimates the capital cost Cost$_{cap}$ by multiplying the capital cost array $C_{cap}$ by the matrix of binary decision variables $B_{cap}$ as shown in the following equations:

$$\text{Cost}_{cap} = C_{cap} B_{cap}$$

$$\text{Cost}_{cap} = [C_{cap,1} \ C_{cap,2} \ \ldots \ C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

Objective Function Optimizer

Still referring to FIG. 9, high level optimizer 832 is shown to include an objective function generator 935 and an objective function optimizer 940. Objective function generator 935 can be configured to generate the objective function J by summing the operational cost term, the maintenance cost term, and the capital cost term formulated by cost predictors 910, 920, and 930. One example of an objective function which can be generated by objective function generator 935 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, Δt is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Another example of an objective function which can be generated by objective function generator 935 is shown in the following equation:

$$J = C_{op}P_{op}\Delta t + C_{main}B_{main} + C_{cap}B_{cap}$$

$$J = [C_{op,1} \ C_{op,2} \ \ldots \ C_{op,h}][P_{op,1} \ P_{op,2} \ \ldots \ P_{op,h}]^T \Delta t +$$

$$[C_{main,1} \ C_{main,2} \ \ldots \ C_{main,m}] \begin{bmatrix} B_{main,1,1} & B_{main,1,2} & \ldots & B_{main,1,h} \\ B_{main,2,1} & B_{main,2,2} & \ldots & B_{main,2,h} \\ \vdots & \vdots & \ddots & \vdots \\ B_{main,m,1} & B_{main,m,2} & \ldots & B_{main,m,h} \end{bmatrix} +$$

$$[C_{cap,1} \ C_{cap,2} \ \ldots \ C_{cap,p}] \begin{bmatrix} B_{cap,1,1} & B_{cap,1,2} & \ldots & B_{cap,1,h} \\ B_{cap,2,1} & B_{cap,2,2} & \ldots & B_{cap,2,h} \\ \vdots & \vdots & \ddots & \vdots \\ B_{cap,p,1} & B_{cap,p,2} & \ldots & B_{cap,p,h} \end{bmatrix}$$

where the array $C_{op}$ includes an energy cost value $C_{op,i}$ for a particular time step i=1 . . . h of the optimization period, the array $P_{op}$ includes a power consumption value $P_{op,i}$ for a particular time step i=1 . . . h of the optimization period, each element of the array $C_{main}$ includes a maintenance cost value $C_{main,j}$ for a particular maintenance activity j=1 . . . m, each element of the matrix $B_{main}$ includes a binary decision variable for a particular maintenance activity j=1 . . . m at a particular time step i=1 . . . h of the optimization period, each element of the array $C_{rap}$ includes a capital cost value $C_{cap,k}$ for a particular capital purchase k=1 . . . p, and each element of the matrix $B_{cap}$ includes a binary decision variable for a particular capital purchase k=1 . . . p at a particular time step i=1 . . . h of the optimization period.

Objective function generator 935 can be configured to impose constraints on one or more variables or parameters in the objective function J. The constraints can include any of the equations or relationships described with reference to operational cost predictor 910, maintenance cost predictor 920, and capital cost predictor 930. For example, objective function generator 935 can impose a constraint which defines the power consumption values $P_{op,i}$ for one or more devices of connected equipment 610 as a function of the ideal power consumption $P_{ideal,i}$ and the efficiency $\eta_i$ (e.g., $P_{op,i}=P_{idea,i}/\eta_i$). Objective function generator 935 can impose a constraint which defines the efficiency $\eta_i$ as a function of the binary decision variables $B_{main,i}$ and $B_{cap,i}$, as described with reference to efficiency updater 911 and efficiency degrader 913. Objective function generator 935 can impose a constraint which constrains the binary decision variables $B_{main,i}$ and $B_{cap,i}$ to a value of either zero or one and defines the binary decision variables $B_{main,i}$ and $B_{cap,i}$ as a function of the reliability Reliability$_i$ of connected equipment 610, as described with reference to maintenance estimator 922 and purchase estimator 932. Objective function generator 935 can impose a constraint which defines the reliability Reliability$_i$ of connected equipment 610 as a function of the equipment performance information (e.g., operating conditions, run hours, etc.) as described with reference to reliability estimators 924 and 934.

Objective function optimizer 940 can optimize the objective function J to determine the optimal values of the binary decision variables $B_{main,i}$ and $B_{cap,i}$ over the duration of the optimization period. Objective function optimizer 940 can use any of a variety of optimization techniques to formulate and optimize the objective function J. For example, objective function optimizer 940 can use integer programming, mixed integer linear programming, stochastic optimization, convex programming, dynamic programming, or any other optimization technique to formulate the objective function J, define the constraints, and perform the optimization. These and other optimization techniques are known in the art and will not be described in detail here.

In some embodiments, objective function optimizer 940 uses mixed integer stochastic optimization to optimize the objective function J. In mixed integer stochastic optimization, some of the variables in the objective function J can be defined as functions of random variables or probabilistic variables. For example, the decision variables $B_{main,i}$ and $B_{cap,i}$ can be defined as binary variables that have probabilistic values based on the reliability of connected equipment 610. Low reliability values may increase the probability that the binary decision variables $B_{main,i}$ and $B_{cap,i}$ will have a value of one (e.g., $B_{main,i}=1$ and $B_{cap,i}=1$), whereas high reliability values may increase the probability that the binary decision variables $B_{main,i}$ and $B_{cap,i}$ will have a value of zero (e.g., $B_{main,i}=0$ and $B_{cap,i}=0$). In some embodiments, maintenance estimator 922 and purchase estimator 932 use a mixed integer stochastic technique to define the values of the binary decision variables $B_{main,i}$ and $B_{cap,i}$ as a probabilistic function of the reliability of connected equipment 610.

As discussed above, the objective function J may represent the predicted cost of operating, maintaining, and purchasing one or more devices of connected equipment 610 over the duration of the optimization period. In some embodiments, objective function optimizer 940 is configured to project these costs back to a particular point in time (e.g., the current time) to determine the net present value (NPV) of the one or more devices of connected equipment 610 at a particular point in time. For example, objective function optimizer 940 can project each of the costs in objective function J back to the current time using the following equation:

$$NPV_{cost} = \sum_{i=1}^{h} \frac{Cost_i}{(1+r)^i}$$

where r is the interest rate, $Cost_i$ is the cost incurred during time step i of the optimization period, and $NPV_{cost}$ is the net present value (i.e., the present cost) of the total costs incurred over the duration of the optimization period. In some embodiments, objective function optimizer 940 optimizes the net present value $NPV_{cost}$ to determine the NPV of one or more devices of connected equipment 610 at a particular point in time.

As discussed above, one or more variables or parameters in the objective function J can be updated dynamically based on closed-loop feedback from connected equipment 610. For example, the equipment performance information received from connected equipment 610 can be used to update the reliability and/or the efficiency of connected equipment 610. Objective function optimizer 940 can be configured to optimize the objective function J periodically (e.g., once per day, once per week, once per month, etc.) to dynamically update the predicted cost and/or the net present value $NPV_{cost}$ based on the closed-loop feedback from connected equipment 610.

In some embodiments, objective function optimizer 940 generates optimization results. The optimization results may include the optimal values of the decision variables in the objective function J for each time step i in the optimization period. The optimization results include operating decisions, equipment maintenance decisions, and/or equipment purchase decisions for each device of connected equipment 610. In some embodiments, the optimization results optimize the economic value of operating, maintaining, and purchasing connected equipment 610 over the duration of the optimization period. In some embodiments, the optimization results optimize the net present value of one or more devices of connected equipment 610 at a particular point in time. The optimization results may cause BMS 606 to activate, deactivate, or adjust a setpoint for connected equipment 610 in order to achieve the optimal values of the decision variables specified in the optimization results.

In some embodiments, MPM system 602 uses the optimization results to generate equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of connected equipment 610 may indicate that maintenance should be performed on that device at the $25^{th}$ time step of the optimization period, whereas a value of $B_{main,25}=0$ may indicate that the maintenance should not be performed at that time step. Similarly, a value of $B_{cap,25}=1$ may indicate that a new device of connected equipment 610 should be purchased at the $25^{th}$ time step of the optimization period, whereas a value of $B_{cap,25}=0$ may indicate that the new device should not be purchased at that time step.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

Model Predictive Maintenance Process

Figure 10:
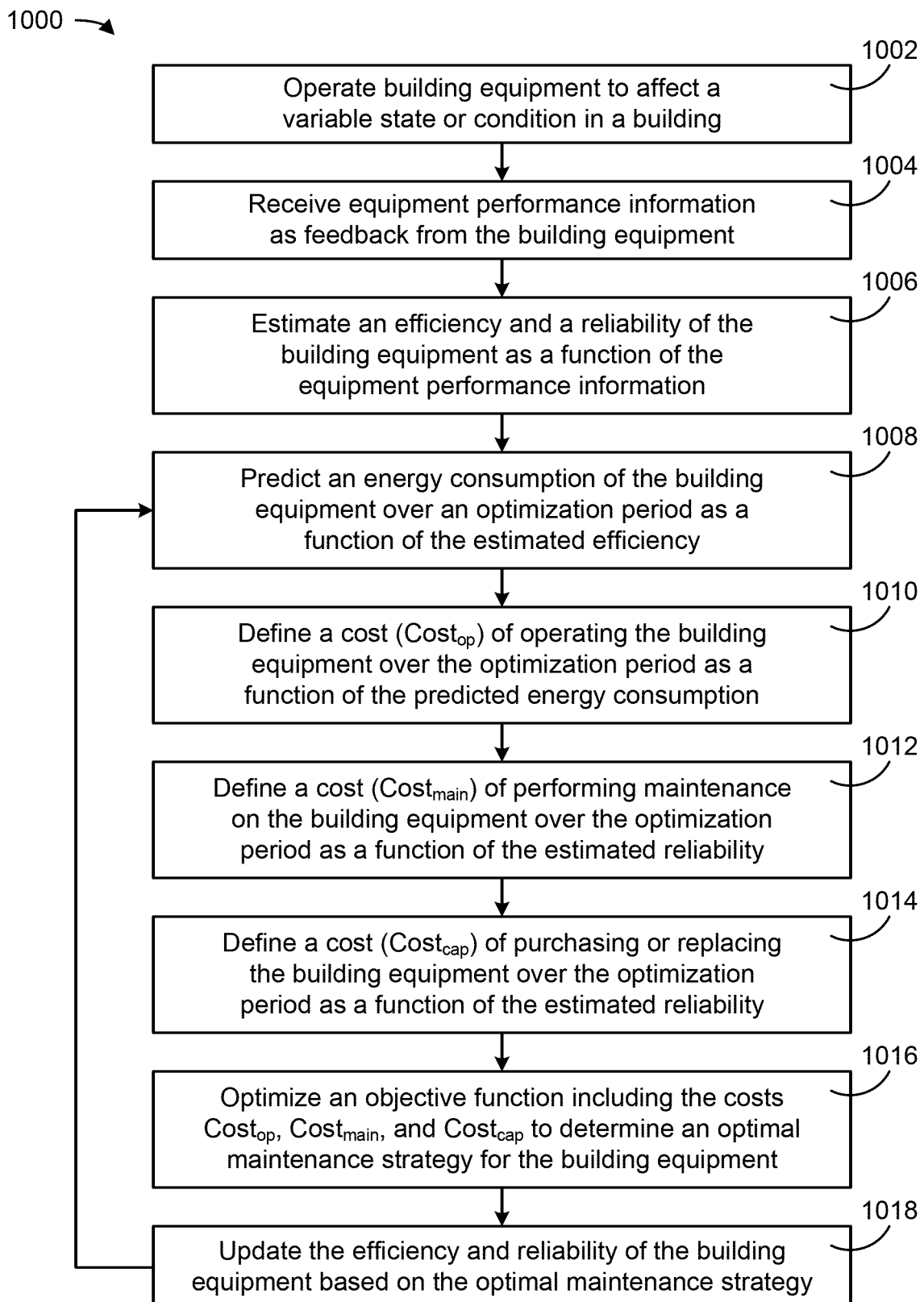
FIG. 10 is a flowchart of a process for operating the MPM system of FIG. 6, according to some embodiments.

Referring now to FIG. 10, a flowchart of a model predictive maintenance process 1000 is shown, according to an exemplary embodiment. Process 1000 can be performed by one or more components of building system 600. In some embodiments, process 1000 is performed by MPM system 602, as described with reference to FIGS. 6-9.

Process 1000 is shown to include operating building equipment to affect a variable state or condition of a building (step 1002) and receiving equipment performance information as feedback from the building equipment (step 1004). The building equipment can include type of equipment which can be used to monitor and/or control a building (e.g., connected equipment 610). For example, the building equipment can include chillers, AHUs, boilers, batteries, heaters, economizers, valves, actuators, dampers, cooling towers, fans, pumps, lighting equipment, security equipment, refrigeration equipment, or any other type of equipment in a building system or building management system. The building equipment can include any of the equipment of HVAC system 100, waterside system 200, airside system 300, BMS 400, and/or BMS 500, as described with reference to FIGS. 1-5. The equipment performance information can include samples of monitored variables (e.g., measured temperature, measured pressure, measured flow rate, power consumption, etc.), current operating conditions (e.g., heating or cooling load, current operating state, etc.), fault indications, or other types of information that characterize the performance of the building equipment.

Process 1000 is shown to include estimating an efficiency and reliability of the building equipment as a function of the equipment performance information (step 1006). In some embodiments, step 1006 is performed by efficiency updater 911 and reliability estimators 924, 926 as described with reference to FIG. 9. Step 1006 can include using the equipment performance information to determine the efficiency η of the building equipment under actual operating conditions. In some embodiments, the efficiency $\eta_i$ represents the ratio of the ideal power consumption $P_{ideal}$ of the building equipment to the actual power consumption $P_{actual}$ of the building equipment, as shown in the following equation:

$$\eta = \frac{P_{ideal}}{P_{actual}}$$

where $P_{ideal}$ is the ideal power consumption of the building equipment as defined by the performance curve for the building equipment and $P_{actual}$ is the actual power consumption of the building equipment. In some embodiments, step 1006 includes using the equipment performance information collected in step 1002 to identify the actual power consumption value $P_{actual}$. Step 1006 can include using the actual power consumption $P_{actual}$ in combination with the ideal power consumption $P_{ideal}$ to calculate the efficiency η.

Step 1006 can include periodically updating the efficiency η to reflect the current operating efficiency of the building equipment. For example, step 1006 can include calculating the efficiency η of the building equipment once per day, once per week, once per year, or at any other interval as may be suitable to capture changes in the efficiency η over time. Each value of the efficiency η may be based on corresponding values of $P_{ideal}$ and $P_{actual}$ at the time the efficiency η is calculated. In some embodiments, step 1006 includes updating the efficiency i each time the high level optimization process is performed (i.e., each time the objective function J is optimized). The efficiency value calculated in step 1006 may be stored in memory 810 as an initial efficiency value $\eta_0$, where the subscript 0 denotes the value of the efficiency η at or before the beginning of the optimization period (e.g., at time step 0).

Step 1006 can include predicting the efficiency $\eta_i$ of the building equipment at each time step i of the optimization period. The initial efficiency $\eta_0$ at the beginning of the optimization period may degrade over time as the building equipment degrade in performance. For example, the efficiency of a chiller may degrade over time as a result of the chilled water tubes becoming dirty and reducing the heat transfer coefficient of the chiller. Similarly, the efficiency of a battery may decrease over time as a result of degradation in the physical or chemical components of the battery. Step 1006 can account for such degradation by incrementally reducing the efficiency $\eta_i$ over the duration of the optimization period.

In some embodiments, the initial efficiency value $\eta_0$ is updated at the beginning of each optimization period. However, the efficiency $\eta$ may degrade during the optimization period such that the initial efficiency value $\eta_0$ becomes increasingly inaccurate over the duration of the optimization period. To account for efficiency degradation during the optimization period, step 1006 can include decreasing the efficiency $\eta$ by a predetermined amount with each successive time step. For example, step 1006 can include defining the efficiency at each time step i=1 . . . h as follows:

$$\eta_i = \eta_{i-1} - \Delta\eta$$

where $\eta_i$ is the efficiency at time step i, $\eta_{i-1}$ is the efficiency at time step i−1, and $\Delta\eta$ is the degradation in efficiency between consecutive time steps. In some embodiments, this definition of $\eta_i$ is applied to each time step for which $B_{main,i}=0$ and $B_{cap,i}=0$. However, if either $B_{main,i}=1$ or $B_{cap,i}=1$, the value of $\eta_i$ may be reset to either $\eta_{main}$ or $\eta_{cap}$ in step 1018.

In some embodiments, the value of $\Delta\eta$ is based on a time series of efficiency values. For example, step 1006 may include recording a time series of the initial efficiency values $\eta_0$, where each of the initial efficiency values $\eta_0$ represents the empirically-calculated efficiency of the building equipment at a particular time. Step 1006 can include examining the time series of initial efficiency values $\eta_0$ to determine the rate at which the efficiency degrades. For example, if the initial efficiency $\eta_0$ at time $t_1$ is $\eta_{0,1}$ and the initial efficiency at time $t_2$ is $\eta_{0,2}$, the rate of efficiency degradation can be calculated as follows:

$$\frac{\Delta\eta}{\Delta t} = \frac{\eta_{0,2} - \eta_{0,1}}{t_2 - t_1}$$

where $$\frac{\Delta\eta}{\Delta t}$$

is the rate of efficiency degradation. Step 1006 can include multiplying $$\frac{\Delta\eta}{\Delta t}$$

by the duration of each time step $\Delta t$ to calculate the value of $\Delta\eta$ $$\left(\text{i.e., } \Delta\eta = \frac{\Delta\eta}{\Delta t} * \Delta t\right).$$

Step 1006 can include estimating the reliability of the building equipment based on the equipment performance information received in step 1004. The reliability may be a statistical measure of the likelihood that the building equipment will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since the building equipment last received maintenance and/or an amount of time that has elapsed since the building equipment were purchased or installed.

In some embodiments, step 1006 includes using the equipment performance information to identify a current operating state of the building equipment. The current operating state can be examined to expose when the building equipment begin to degrade in performance and/or to predict when faults will occur. In some embodiments, step 1006 includes estimating a likelihood of various types of failures that could potentially occur the building equipment. The likelihood of each failure may be based on the current operating conditions of the building equipment, an amount of time that has elapsed since the building equipment have been installed, and/or an amount of time that has elapsed since maintenance was last performed. In some embodiments, step 1006 includes identifying operating states and predicts the likelihood of various failures using the systems and methods described in U.S. patent application Ser. No. 15/188,824 titled "Building Management System With Predictive Diagnostics" and filed Jun. 21, 2016, the entire disclosure of which is incorporated by reference herein.

In some embodiments, step 1006 includes receiving operating data from building equipment distributed across multiple buildings. The operating data can include, for example, current operating conditions, fault indications, failure times, or other data that characterize the operation and performance of the building equipment. Step 1006 can include using the set of operating data to develop a reliability model for each type of equipment. The reliability models can be used in step 1006 to estimate the reliability of any given device of the building equipment as a function of its current operating conditions and/or other extraneous factors (e.g., time since maintenance was last performed, time since installation or purchase, geographic location, water quality, etc.).

One example of a reliability model which can be used in step 1006 is shown in the following equation:

$$\text{Reliability}_i = f(\text{OpCond}_i, \Delta t_{main,i}, \Delta t_{cap,i})$$

where Reliability$_i$ is the reliability of the building equipment at time step i, OpCond$_i$ are the operating conditions at time step i, $\Delta t_{main,i}$ is the amount of time that has elapsed between the time at which maintenance was last performed and time step i, and $\Delta t_{cap,i}$ is the amount of time that has elapsed between the time at which the building equipment were purchased or installed and time step i. Step 1006 can include identifying the current operating conditions OpCond$_i$ based on the equipment performance information received as a feedback from the building equipment. Operating under more strenuous conditions (e.g., high load, extreme temperatures, etc.) may result in a lower reliability, whereas operating under less strenuous conditions (e.g., low load, moderate temperatures, etc.) may result in a higher reliability.

Still referring to FIG. 10, process 1000 is shown to include predicting an energy consumption of the building equipment over an optimization period as a function of the estimated efficiency (step 1008). In some embodiments, step 1008 is performed by ideal performance calculator 912 and/or power consumption estimator, as described with reference to FIG. 9. Step 1008 can include receiving load predictions Load$_i$ from load/rate predictor 822 and performance curves from low level optimizer 834. As discussed above, the performance curves may define the ideal power consumption $P_{ideal}$ of the building equipment a function of the heating or cooling load on the device or set of devices.

For example, the performance curve for the building equipment can be defined by the following equation:

$$P_{ideal,i} = f(\text{Load}_i)$$

where $P_{ideal,i}$ is the ideal power consumption (e.g., kW) of the building equipment at time step i and $\text{Load}_i$ is the load (e.g., tons cooling, kW heating, etc.) on the building equipment at time step i. The ideal power consumption $P_{ideal,i}$ may represent the power consumption of the building equipment assuming they operate at perfect efficiency. Step 1008 can include using the performance curve for the building equipment to identify the value of $P_{ideal,i}$ that corresponds to the load point $\text{Load}_i$ for the building equipment at each time step of the optimization period.

In some embodiments, step 1008 includes estimating the power consumption $P_{op,i}$ as a function of the ideal power consumption $P_{ideal,i}$ and the efficiency $\eta_i$ of the building equipment. For example, step 1008 can include calculating the power consumption $P_{op,i}$ using the following equation:

$$P_{op,i} = \frac{P_{ideal,i}}{\eta_i}$$

where $P_{ideal,i}$ is the power consumption based on the equipment performance curve for the building equipment at the corresponding load point $\text{Load}_i$, and $\eta_i$ is the operating efficiency of the building equipment at time step i.

Still referring to FIG. 10, process 1000 is shown to include defining a cost $\text{Cost}_{op}$ of operating the building equipment over the optimization period as a function of the predicted energy consumption (step 1010). In some embodiments, step 1010 is performed by operational cost calculator 916, as described with reference to FIG. 9. Step 1010 can include calculating the operational cost during each time step i using the following equation:

$$\text{Cost}_{op,i} = C_{op,i} P_{op,i} \Delta t$$

where $P_{op,i}$ is the predicted power consumption at time step i determined in step 1008, $C_{op,i}$ is the cost per unit of energy at time step i, and $\Delta t$ is the duration of each time step. Step 1010 can include summing the operational costs over the duration of the optimization period as follows:

$$\text{Cost}_{op} = \sum_{i=1}^{h} \text{Cost}_{op,i}$$

where $\text{Cost}_{op}$ is the operational cost term of the objective function J.

In other embodiments, step 1010 can include calculating the operational cost $\text{Cost}_{op}$ by multiplying the cost array $C_{op}$ by the power consumption array $P_{op}$ and the duration of each time step $\Delta t$ as shown in the following equations:

$$\text{Cost}_{op} = C_{op} P_{op} \Delta t$$

$$\text{Cost}_{op} = [C_{op,1} C_{op,2} \ldots C_{op,h}][P_{op,1} P_{op,2} \ldots P_{op,h}]^T \Delta t$$

where the array $C_{op}$ includes an energy cost value $C_{op,i}$ for a particular time step i=1 h of the optimization period, the array $P_{op}$ includes a power consumption value $P_{op,i}$ for a particular time step i=1 . . . h of the optimization period.

Still referring to FIG. 10, process 1000 is shown to include defining a cost of performing maintenance on the building equipment over the optimization period as a function of the estimated reliability (step 1012). Step 1012 can be performed by maintenance cost predictor 920, as described with reference to FIG. 9. Step 1012 can include using the estimated reliability of the building equipment over the duration of the optimization period to determine the probability that the building equipment will require maintenance and/or replacement at each time step of the optimization period. In some embodiments, step 1012 includes comparing the probability that the building equipment will require maintenance at a given time step to a critical value. Step 1012 can include setting the value of $B_{main,i}=1$ in response to a determination that the probability that the building equipment will require maintenance at time step i exceeds the critical value. Similarly, step 1012 can include comparing the probability that the building equipment will require replacement at a given time step to a critical value. Step 1012 can include setting the value of $B_{cap,i}=1$ in response to a determination that the probability that the building equipment will require replacement at time step i exceeds the critical value.

Step 1012 can include determining the costs $C_{main,i}$ associated with performing various types of maintenance on the building equipment. Step 1012 can include receiving a set of maintenance costs from an external system or device (e.g., a database, a user device, etc.). In some embodiments, the maintenance costs define the economic cost (e.g., $) of performing various types of maintenance. Each type of maintenance activity may have a different economic cost associated therewith. For example, the maintenance activity of changing the oil in a chiller compressor may incur a relatively small economic cost, whereas the maintenance activity of completely disassembling the chiller and cleaning all of the chilled water tubes may incur a significantly larger economic cost. Step 1012 can include using the maintenance costs to define the values of $C_{main,i}$ in objective function J.

Step 1012 can include estimating the maintenance cost of the building equipment over the duration of the optimization period. In some embodiments, step 1012 includes calculating the maintenance cost during each time step i using the following equation:

$$\text{Cost}_{main,i} = C_{main,i} B_{main,i}$$

where $C_{main,i}$ is an array of maintenance costs including an element for each of the m different types of maintenance activities that can be performed at time step i and $B_{main,i}$ is an array of binary decision variables indicating whether each of the m maintenance activities will be performed at time step i. Step 1012 can include summing the maintenance costs over the duration of the optimization period as follows:

$$\text{Cost}_{main} = \sum_{i=1}^{h} \text{Cost}_{main,i}$$

where $\text{Cost}_{main}$ is the maintenance cost term of the objective function J.

In other embodiments, step 1012 includes estimating the maintenance cost $\text{Cost}_{main}$ by multiplying the maintenance cost array $C_{main}$ by the matrix of binary decision variables $B_{main}$ as shown in the following equations:

$$\text{Cost}_{main} = C_{main} B_{main}$$

$$\text{Cost}_{main} = [\ C_{main,1}\ \ C_{main,2}\ \ \ldots\ \ C_{main,m}\ ]$$

-continued $$\begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

where each element of the array $C_{main}$ includes a maintenance cost value $C_{main,j}$ for a particular maintenance activity j=1 . . . m and each element of the matrix $B_{main}$ includes a binary decision variable for a particular maintenance activity j=1 . . . m at a particular time step i=1 . . . h of the optimization period.

Still referring to FIG. 10, process 1000 is shown to include defining a cost $Cost_{cap}$ of purchasing or replacing the building equipment over the optimization period as a function of the estimated reliability (step 1014). Step 1014 can be performed by capital cost predictor 930, as described with reference to FIG. 9. In some embodiments, step 1014 includes using the estimated reliability of the building equipment over the duration of the optimization period to determine the probability that new devices of the building equipment will be purchased at each time step of the optimization period. In some embodiments, step 1014 includes comparing the probability that new devices of the building equipment will be purchased at a given time step to a critical value. Step 1014 can include setting the value of $B_{cap,i}=1$ in response to a determination that the probability that the building equipment will be purchased at time step i exceeds the critical value.

Step 1014 can include determining the costs $C_{cap,i}$ associated with various capital purchases (i.e., purchasing one or more new devices of the building equipment). Step 1014 can include receiving a set of capital costs from an external system or device (e.g., a database, a user device, etc.). In some embodiments, the capital costs define the economic cost (e.g., $) of making various capital purchases. Each type of capital purchase may have a different economic cost associated therewith. For example, purchasing a new temperature sensor may incur a relatively small economic cost, whereas purchasing a new chiller may incur a significantly larger economic cost. Step 1014 can include using the purchase costs to define the values of $C_{cap,i}$ in objective function J.

Some capital purchases may be more expensive than other. However, different types of capital purchases may result in different levels of improvement to the efficiency $\eta$ and/or the reliability of the building equipment. For example, purchasing a new sensor to replace an existing sensor may result in a minor improvement in efficiency $\eta$ and/or a minor improvement in reliability, whereas purchasing a new chiller and control system may result in a significantly greater improvement to the efficiency $\eta$ and/or the reliability of the building equipment. Accordingly, multiple different levels of post-purchase efficiency (i.e., $\eta_{cap}$) and post-purchase reliability (i.e., $Reliability_{cap}$) may exist. Each level of $\eta_{cap}$ and $Reliability_{cap}$ may correspond to a different type of capital purchase.

Step 1014 can include estimating the capital cost of the building equipment over the duration of the optimization period. In some embodiments, step 1014 includes calculating the capital cost during each time step i using the following equation:

$$Cost_{cap,i} = C_{cap,i} B_{cap,i}$$

where $C_{cap,i}$ is an array of capital purchase costs including an element for each of the p different capital purchases that can be made at time step i and $B_{cap,i}$ is an array of binary decision variables indicating whether each of the p capital purchases will be made at time step i. Step 1014 can include summing the capital costs over the duration of the optimization period as follows:

$$Cost_{cap} = \sum_{i=1}^{h} Cost_{cap,i}$$

where $Cost_{cap}$ is the capital cost term of the objective function J.

In other embodiments, step 1014 includes estimating the capital cost $Cost_{cap}$ by multiplying the capital cost array $C_{cap}$ by the matrix of binary decision variables $B_{cap}$ as shown in the following equations:

$$Cost_{cap} = C_{cap} B_{cap}$$

$$Cost_{cap} = [C_{cap,1} \quad C_{cap,2} \quad \cdots \quad C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

where each element of the array $C_{cap}$ includes a capital cost value $C_{cap,k}$ for a particular capital purchase k=1 . . . p and each element of the matrix $B_{cap}$ includes a binary decision variable for a particular capital purchase k=1 . . . p at a particular time step i=1 . . . h of the optimization period.

Still referring to FIG. 10, process 1000 is shown to include optimizing an objective function including the costs $Cost_{op}$, $Cost_{main}$, and $Cost_{cap}$ to determine an optimal maintenance strategy for the building equipment (step 1016). Step 1016 can include generating the objective function J by summing the operational cost term, the maintenance cost term, and the capital cost term formulated in steps 1010-1014. One example of an objective function which can be generated in step 1016 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Another example of an objective function which can be generated in step 1016 is shown in the following equation:

$$J = C_{op} P_{op} \Delta t + C_{main} B_{main} + C_{cap} B_{cap}$$

$$J = [C_{op,1} \quad C_{op,2} \quad \cdots \quad C_{op,h}][P_{op,1} \quad P_{op,2} \quad \cdots \quad P_{op,h}]^T \Delta t +$$

$$[C_{main,1} \quad C_{main,2} \quad \cdots \quad C_{main,m}] \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix} +$$

$$[C_{cap,1} \quad C_{cap,2} \quad \cdots \quad C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

where the array $C_{op}$ includes an energy cost value $C_{op,i}$ for a particular time step i=1 . . . h of the optimization period, the array $P_{op}$ includes a power consumption value $P_{op,i}$ for a particular time step i=1 . . . h of the optimization period, each element of the array $C_{main}$ includes a maintenance cost value $C_{main,j}$ for a particular maintenance activity j=1 . . . m, each element of the matrix $B_{main}$ includes a binary decision variable for a particular maintenance activity j=1 . . . m at a particular time step i=1 . . . h of the optimization period, each element of the array $C_{cap}$ includes a capital cost value $C_{cap,k}$ for a particular capital purchase k=1 . . . p, and each element of the matrix $B_{cap}$ includes a binary decision variable for a particular capital purchase k=1 . . . p at a particular time step i=1 . . . h of the optimization period.

Step 1016 can include imposing constraints on one or more variables or parameters in the objective function J. The constraints can include any of the equations or relationships described with reference to operational cost predictor 910, maintenance cost predictor 920, and capital cost predictor 930. For example, step 1016 can include imposing a constraint which defines the power consumption values $P_{op,i}$ for one or more devices of the building equipment as a function of the ideal power consumption $P_{ideal,i}$ and the efficiency $\eta_i$ (e.g., $P_{op,i}=P_{ideal,i}/\eta_i$). Step 1016 can include imposing a constraint which defines the efficiency $\eta_i$ as a function of the binary decision variables $B_{main,i}$ and $B_{cap,i}$, as described with reference to efficiency updater 911 and efficiency degrader 913. Step 1016 can include imposing a constraint which constrains the binary decision variables $B_{main,i}$ and $B_{cap,i}$ to a value of either zero or one and defines the binary decision variables $B_{main,i}$ and $B_{cap,i}$ as a function of the reliability Reliability$_i$ of connected equipment 610, as described with reference to maintenance estimator 922 and purchase estimator 932. Step 1016 can include imposing a constraint which defines the reliability Reliability$_i$ of connected equipment 610 as a function of the equipment performance information (e.g., operating conditions, run hours, etc.) as described with reference to reliability estimators 924 and 934.

Step 1016 can include optimizing the objective function J to determine the optimal values of the binary decision variables $B_{main,i}$ and $B_{cap,i}$ over the duration of the optimization period. Step 1016 can include using any of a variety of optimization techniques to formulate and optimize the objective function J. For example, step 1016 can include using integer programming, mixed integer linear programming, stochastic optimization, convex programming, dynamic programming, or any other optimization technique to formulate the objective function J, define the constraints, and perform the optimization. These and other optimization techniques are known in the art and will not be described in detail here.

In some embodiments, step 1016 includes using mixed integer stochastic optimization to optimize the objective function J. In mixed integer stochastic optimization, some of the variables in the objective function J can be defined as functions of random variables or probabilistic variables. For example, the decision variables $B_{main,i}$ and $B_{cap,i}$ can be defined as binary variables that have probabilistic values based on the reliability of the building equipment. Low reliability values may increase the probability that the binary decision variables $B_{main,i}$ and $B_{cap,i}$ will have a value of one (e.g., $B_{main,i}=1$ and $B_{cap,i}=1$), whereas high reliability values may increase the probability that the binary decision variables $B_{main,i}$ and $B_{cap,i}$ will have a value of zero (e.g., $B_{main,i}=0$ and $B_{cap,i}=0$). In some embodiments, step 1016 includes using a mixed integer stochastic technique to define the values of the binary decision variables $B_{main,i}$ and $B_{cap,i}$ as a probabilistic function of the reliability of the building equipment.

As discussed above, the objective function J may represent the predicted cost of operating, maintaining, and purchasing one or more devices of the building equipment over the duration of the optimization period. In some embodiments, step 1016 includes projecting these costs back to a particular point in time (e.g., the current time) to determine the net present value (NPV) of the one or more devices of the building equipment at a particular point in time. For example, step 1016 can include projecting each of the costs in objective function J back to the current time using the following equation:

$$NPV_{cost} = \sum_{i=1}^{h} \frac{\text{Cost}_i}{(1+r)^i}$$

where r is the interest rate, Cost$_i$ is the cost incurred during time step i of the optimization period, and NPV$_{cost}$ is the net present value (i.e., the present cost) of the total costs incurred over the duration of the optimization period. In some embodiments, step 1016 includes optimizing the net present value NPV$_{cost}$ to determine the NPV of the building equipment at a particular point in time.

As discussed above, one or more variables or parameters in the objective function J can be updated dynamically based on closed-loop feedback from the building equipment. For example, the equipment performance information received from the building equipment can be used to update the reliability and/or the efficiency of the building equipment. Step 1016 can include optimizing the objective function J periodically (e.g., once per day, once per week, once per month, etc.) to dynamically update the predicted cost and/or the net present value NPV$_{cost}$ based on the closed-loop feedback from the building equipment.

In some embodiments, step 1016 include generating optimization results. The optimization results may include the optimal values of the decision variables in the objective function J for each time step i in the optimization period. The optimization results include operating decisions, equipment maintenance decisions, and/or equipment purchase decisions for each device of the building equipment. In some embodiments, the optimization results optimize the economic value of operating, maintaining, and purchasing the building equipment over the duration of the optimization period. In some embodiments, the optimization results optimize the net present value of one or more devices of the building equipment at a particular point in time. The optimization results may cause BMS 606 to activate, deactivate, or adjust a setpoint for the building equipment in order to achieve the optimal values of the decision variables specified in the optimization results.

In some embodiments, process 1000 includes using the optimization results to generate equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of the building equipment may indicate that maintenance should be performed on that device at the 25$^{th}$ time step of the optimization period, whereas a value of $B_{main,25}=0$ may indicate that the maintenance should not be performed at that time step. Similarly, a value of $B_{cap,25}=1$ may indicate that a new device of the building equipment should be purchased at the 25$^{th}$ time step of the optimization period, whereas a value of $B_{cap,25}=0$ may indicate that the new device should not be purchased at that time step.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

Still referring to FIG. 10, process 1000 is shown to include updating the efficiency and the reliability of the building equipment based on the optimal maintenance strategy (step 1018). In some embodiments, step 1018 includes updating the efficiency $\eta_i$ for one or more time steps during the optimization period to account for increases in the efficiency $\eta$ of the building equipment that will result from performing maintenance on the building equipment or purchasing new equipment to replace or supplement one or more devices of the building equipment. The time steps i at which the efficiency $\eta_i$ is updated may correspond to the predicted time steps at which the maintenance will be performed or the equipment will replaced. The predicted time steps at which maintenance will be performed on the building equipment may be defined by the values of the binary decision variables $B_{main,i}$ in the objective function J. Similarly, the predicted time steps at which the building equipment will be replaced may be defined by the values of the binary decision variables $B_{cap,i}$ in the objective function J.

Step 1018 can include resetting the efficiency $\eta_i$ for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, step 1018 can include resetting the value of $\eta_i$ to $\eta_{main}$, where $\eta_{main}$ is the efficiency value that is expected to result from the maintenance performed at time step i. Similarly, if $B_{cap,i}=1$, step 1018 can include resetting the value of $\eta_i$ to $\eta_{cap}$, where $\eta_{cap}$ is the efficiency value that is expected to result from purchasing a new device to supplement or replace one or more devices of the building equipment performed at time step i. Step 1018 can include resetting the efficiency $\eta_i$ for one or more time steps while the optimization is being performed (e.g., with each iteration of the optimization) based on the values of binary decision variables $B_{main,i}$ and $B_{cap,i}$.

Step 1018 may include determining the amount of time $\Delta t_{main,i}$ that has elapsed since maintenance was last performed on the building equipment based on the values of the binary decision variables $B_{main,i}$. For each time step i, step 1018 can examine the corresponding values of $B_{main}$ at time step i and each previous time step (e.g., time steps i−1, i−2, . . . , 1. Step 1018 can include calculating the value of $\Delta t_{main,i}$ by subtracting the time at which maintenance was last performed (i.e., the most recent time at which $B_{main,i}=1$) from the time associated with time step i. A long amount of time $\Delta t_{main,i}$ since maintenance was last performed may result in a lower reliability, whereas a short amount of time since maintenance was last performed may result in a higher reliability.

Similarly, step 1018 may include determining the amount of time $\Delta t_{cap,i}$ that has elapsed since the building equipment were purchased or installed based on the values of the binary decision variables $B_{cap,i}$. For each time step i, step 1018 can examine the corresponding values of $B_{cap}$ at time step i and each previous time step (e.g., time steps i−1, i−2, . . . , 1. Step 1018 can include calculating the value of $\Delta t_{cap,i}$ by subtracting the time at which the building equipment were purchased or installed (i.e., the most recent time at which $B_{cap,i}=1$) from the time associated with time step i. A long amount of time $\Delta t_{cap,i}$ since the building equipment were purchased or installed may result in a lower reliability, whereas a short amount of time since the building equipment were purchased or installed may result in a higher reliability Some maintenance activities may be more expensive than other. However, different types of maintenance activities may result in different levels of improvement to the efficiency $\eta$ and/or the reliability of the building equipment. For example, merely changing the oil in a chiller may result in a minor improvement in efficiency $\eta$ and/or a minor improvement in reliability, whereas completely disassembling the chiller and cleaning all of the chilled water tubes may result in a significantly greater improvement to the efficiency $\eta$ and/or the reliability of the building equipment. Accordingly, multiple different levels of post-maintenance efficiency (i.e., $\eta_{main}$) and post-maintenance reliability (i.e., Reliability$_{main}$) may exist. Each level of $\eta_{main}$ and Reliability$_{main}$ may correspond to a different type of maintenance activity.

In some embodiments, step 1018 includes identifying the maintenance activity associated with each binary decision variable $B_{main,j,i}$ and resets the efficiency $\eta$ to the corresponding post-maintenance efficiency level $\eta_{main,j}$ if $B_{main,j,i}=1$. Similarly, step 1018 may include identifying the maintenance activity associated with each binary decision variable $B_{main,j,i}$ and can reset the reliability to the corresponding post-maintenance reliability level Reliability$_{main,i}$ if $B_{main,j,i}=1$.

Some capital purchases may be more expensive than other. However, different types of capital purchases may result in different levels of improvement to the efficiency $\eta$ and/or the reliability of the building equipment. For example, purchasing a new sensor to replace an existing sensor may result in a minor improvement in efficiency $\eta$ and/or a minor improvement in reliability, whereas purchasing a new chiller and control system may result in a significantly greater improvement to the efficiency $\eta$ and/or the reliability of the building equipment. Accordingly, multiple different levels of post-purchase efficiency (i.e., $\eta_{cap}$) and post-purchase reliability (i.e., Reliability$_{cap}$) may exist. Each level of $\eta_{cap}$ and Reliability$_{cap}$ may correspond to a different type of capital purchase.

In some embodiments, step 1018 includes identifying the capital purchase associated with each binary decision variable $B_{main,k,i}$ and resetting the efficiency $\eta$ to the corresponding post-purchase efficiency level $\eta_{cap,k}$ if $B_{cap,k,i}=1$. Similarly, step 1018 may include identifying the capital purchase associated with each binary decision variable $B_{cap,k,i}$ and can resetting the reliability to the corresponding post-purchase reliability level Reliability$_{cap,k}$ if $B_{main,k,i}=1$.

Model Predictive Maintenance with Budgetary Constraints and Failure Risk

Overview

Referring generally to FIGS. 11-22, systems and methods for a model predictive maintenance (MPM) system that accounts for budgetary constraints, risk costs, and/or miscellaneous costs are shown, according to some embodiments. In some embodiments, any of the systems and methods described in greater detail below with reference to FIGS. 11-22 are incorporated in MPM system 602 described in greater detail above with reference to FIGS. 6-10. For example, high level optimizer 832 of model predictive maintenance system 602 described in greater detail above with reference to FIGS. 8-9 may include any of the systems and methods (e.g., a hard budgetary constraint) described herein below.

In some embodiments, MPM system 602 is configured to generate one or more budgetary constraints and optimize the objective function J subject to the one or more budgetary constraints to determine optimal values of decision variables that minimize costs while adhering to one or more optimization constraints. In some embodiments, any description related to maintenance activities described with reference to FIGS. 11-23B can be applied similarly to and/or the same as capital purchase activities. In some embodiments, MPM system 602 may account for capital purchase activities under budgetary constraints similar to and/or the same as how MPM 602 is described to account for maintenance activities described below with reference to FIGS. 11-23B. Capital purchases, as described in greater detail above with reference to FIG. 10, can include the replacement of one or more components in a building management system (BMS) (e.g., replacement of an outdoor condensing unit of a variable refrigerant flow (VRF) system, replacement of a ventilation unit with the BMS).

In some embodiments, MPM system 602 incorporates a risk cost related to building equipment. The risk cost can define a cost related to failure of building equipment. Failure of building equipment can be determined based on a degradation state of the building equipment passing some threshold value, an inability of the building equipment to activate, etc. If building equipment fails, multiple costs may be incurred. In some embodiments, failure of building equipment incurs various repair (e.g., maintenance and/or replacement) costs to fix the building equipment. The repair costs may be higher after the building equipment fails in comparison to if repairs are performed prior to failure as additional complications may arise from the failure. For example, failure of wiring in an electrical device may result in other components of the electrical device receiving electrical damage due to the failure of the wiring. In some embodiments, failure of building equipment results in various opportunity costs being incurred. Opportunity costs can be include various costs that result due to failure of building equipment beyond general repair costs. For example, if a heater fails in a space of a building during winter, the space may become too cold to be usable by occupants. As such, costs related to relocating the occupants, missed business opportunities due to closing the space, etc. may result in the form of opportunity costs. In some embodiments, a user define opportunity costs related to failure of building equipment. In some embodiments, opportunity costs are estimated by MPM system 602 based on knowledge regarding how the building equipment impacts an associated building.

In some embodiments, MPM system 602 incorporates miscellaneous costs. Miscellaneous costs can result from miscellaneous activities (e.g., maintenance and/or replacement activities) that affect reliability of building equipment but may not affect efficiency of the building equipment. In some embodiments, miscellaneous costs are incorporated with maintenance costs in a cost function (e.g., the objective function J) solved by MPM system 602. In some embodiments, miscellaneous costs are separate from maintenance costs in the cost function. As an example of a miscellaneous cost, a miscellaneous activity may include replacing piping of a ventilation system to reduce a chance of cracking in the piping due to rust. Replacing the piping may not affect efficiency of the ventilation system, but may increase reliability of the ventilation system as the new piping may be less likely to crack. In some embodiments, incorporating miscellaneous activities is beneficial if the risk cost term is being incorporated as the miscellaneous activities can reduce a chance of failure of the building equipment, thereby reducing the risk cost term.

Optimal Combined Costs Curves

Figure 11:
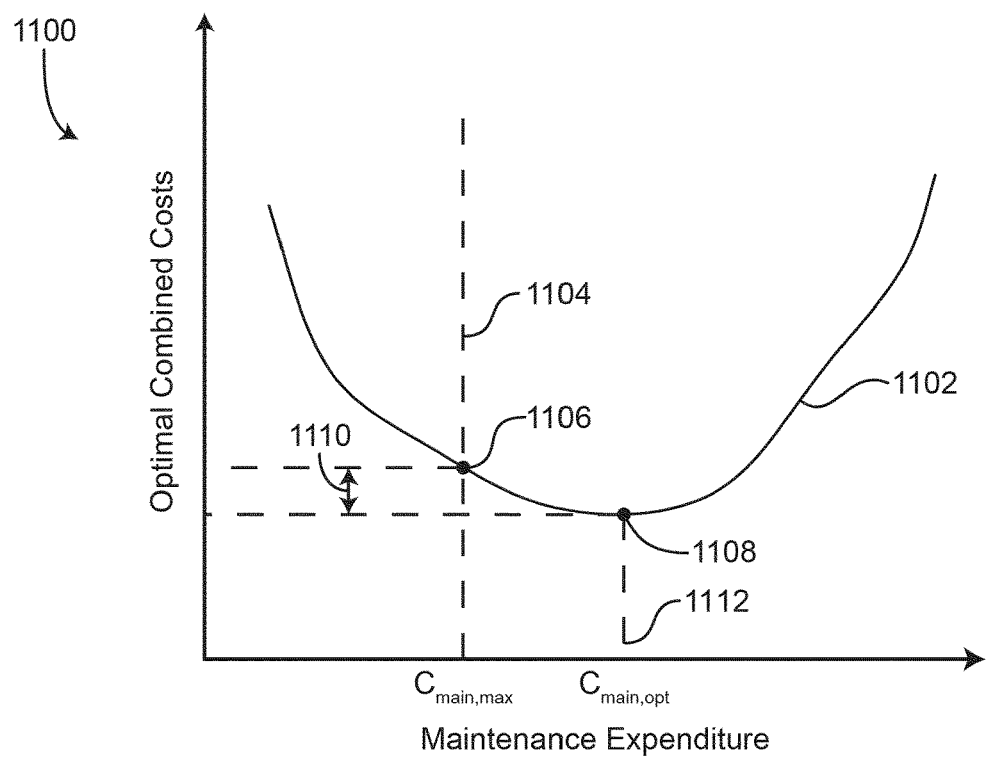
FIG. 11 is a graph illustrating optimizing combined costs through increased activity expenditure while constrained by a hard budgetary constraint of a maximum budget, according to some embodiments.

Referring now to FIG. 11, a graph 1100 illustrating combined cost as a function of maintenance expenditure is shown, according to some embodiments. In some embodiments, combined costs can include the three costs associated with the objective function J, namely maintenance, capital, and operational costs described above with reference to FIG. 10. In some embodiments, increased maintenance expenditure can allow combined costs to be reduced. For example, an outdoor condensing unit of a VRF system may be using large amounts of power for normal operation. By performing maintenance on the outdoor condensing unit, a maintenance cost may be incurred, but the amount saved on operational costs (e.g., costs related to power consumption) may be reduced by a larger amount. In some embodiments, the hard budgetary constraint is a maximum maintenance budget 1104 that indicates maximum allowable maintenance expenditures over a maintenance budget time period. A hard budgetary constraint is distinguished from a soft budgetary constraint, which can be implemented as a penalty cost in the objective function J (described in greater detail with reference to FIG. 12).

Graph 1100 is shown to include curve 1102 which illustrates optimal combined costs (the Y-axis) with respect to maintenance expenditure (the X-axis), according to some embodiments. Curve 1102 illustrates how optimal combined costs can fluctuate given varying maintenance expenditures. In a building management system (BMS), maintenance may need to be performed on equipment to keep the equipment operating at some level of efficiency. Maintenance of the equipment may incur additional costs such as, for example, contractor fees, costs for replacement parts, or costs incurred by the equipment being temporarily offline for maintenance. However, maintenance of the equipment may increase the operating efficiency of the equipment, reducing operating costs such as, for example, electrical consumption or fuel consumption.

An optimal point 1108 is shown on curve 1102. Optimal point 1108 indicates an amount of maintenance expenditures that minimize the total combined costs. The section of curve 1102 to the left of optimal point 1108 represents cases when not enough is being spent on maintenance such that combined expenses are higher than optimal. The section of curve

1102 to the right of optimal point 1108 represents cases when more than an optimal amount is being spent on maintenance.

Graph 1100 is also shown to include a maximum maintenance budget point on curve 1102, shown as budgetary limit point 1106, according to some embodiments. Budgetary limit point 1106 is defined by the intersection of maximum maintenance budget 1104 and curve 1102, according to some embodiments. In some embodiments, maximum maintenance budget 1104 is a maximum amount that can be spent on maintenance over a maintenance budget time period. For example, a building may have a maintenance budget of $10,000. The maintenance budget of $10,000 indicates that no more than $10,000 should be spent on maintenance over the maintenance budget time period, even if the total combined costs could be lowered by spending more on maintenance over the maintenance budget time period. In some embodiments, budgetary limit point 1106 may be at a lower maintenance expenditure than optimal point 1108 due to maximum maintenance budget 1104. This may indicate not enough is being spent on maintenance to achieve optimal combined costs. In other embodiments, if maximum maintenance budget 1104 is greater than or equal optimal maintenance expenditure 1112, optimal point 1108 can be achieved. Maximum maintenance budget 1104 being to the right of optimal maintenance expenditure 1112 may indicate that a maintenance budget allows for a building to fully optimize (i.e., minimize) how much is spent on combined costs.

Graph 1100 is also shown to include a cost difference 1110. In some embodiments, cost difference 1110 represents additional costs incurred (above the optimal combined costs value) when maximum maintenance budget 1104 is less than optimal maintenance expenditure 1112. For example, if an X-value (i.e. a maintenance expenditure value) of budgetary limit point 1106 is equal to or greater than an X-value of optimal point 1108, cost difference 1110 can be 0, indicating that enough can be spent on maintenance expenditures to fully optimize combined costs. As another example, if maximum maintenance budget 1104 is less than optimal maintenance expenditure 1112, cost difference 1110 may be greater than 0, indicating that not enough can be spent on maintenance to fully optimize combined costs. In some embodiments, cost difference 1110 acts as an indicator to a user that the user can save money by increasing their maintenance budget to incur a lower combined cost.

In some embodiments, capital expenditures may have a similar and/or a same result on combined costs as maintenance expenditures. In some embodiments, budgetary constraints can be applied to capital expenditures along with maintenance expenditures. When budgetary constraints are applied to capital expenditures, the objective function J can be optimized as to minimize total costs while adhering to the budgetary constraints.

Figure 12:
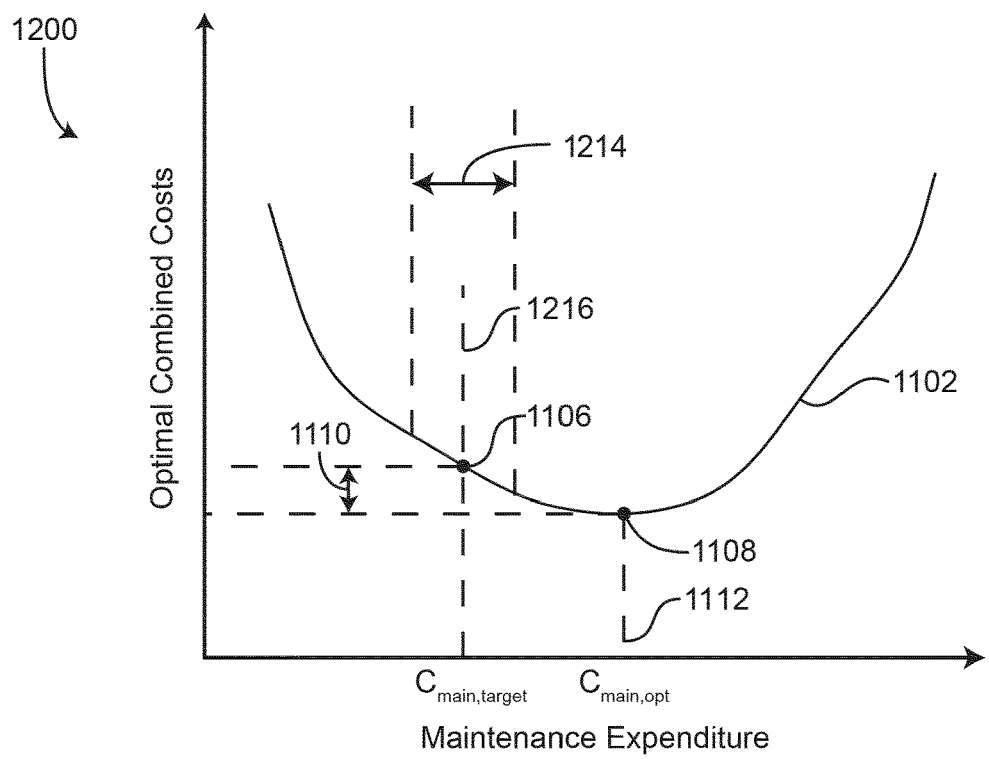
FIG. 12 is a graph illustrating optimizing combined costs through increased activity expenditure while constrained by a soft budgetary constraint of a penalty cost, according to some embodiments.

Referring now to FIG. 12, a graph 1200 illustrating optimization combined costs through increased maintenance expenditure resulting from an optimization of objective function J while subject to a soft budgetary constraint is shown, according to some embodiments. In some embodiments, combined costs can include the three costs associated with the objective function J, namely maintenance, capital, and operational costs described above with reference to FIG. 10. In FIG. 12, the soft budgetary constraint is not included in the combined costs. If the soft budgetary constraint were included in the combined costs, graph 1200 may be very different than graph 1100, according to some embodiments. In some embodiments, the soft budgetary constraint may be a penalty cost as described in greater detail below with reference to FIG. 19A. In some embodiments, the penalty cost is an additional cost incurred for allowing a total amount spent on maintenance to deviate from a target maintenance cost 1216. In some embodiments, the penalty cost is based on a difference between the target maintenance cost 1216 and the total amount spent on maintenance. In some embodiments, the penalty cost incentivizes spending an amount on maintenance close to target maintenance cost 1216 in order to minimize wasted budget. In some embodiments, a business can implement a framework for allocating maintenance budgets from year to year. In some embodiments, a business may implement a "use it or lose it" policy that reduces a maintenance budget for the next year by an unspent amount from the previous year. For example, a target maintenance cost 1216 may be determined for a maintenance budget time period. Any amount of target maintenance cost 1216 that is not spent during the maintenance budget time period can afterwards be allocated to another budget other than for maintenance, losing the unspent portion of target maintenance cost 1216 from the perspective of maintenance. Thus, a penalty cost may incentivize optimization of objective function J in such a way as to minimize the unspent portion of target maintenance cost 1216.

Graph 1200 is shown to include many of the same items shown in graph 1100. Some or all of the items shown in FIG. 12 may be similar to and/or the same as items with the same reference numbers in FIG. 11. FIG. 12 is also shown to include a deadband 1214. In some embodiments, deadband 1214 may be a range above and/or below target maintenance cost 1216 that can be spent on maintenance without incurring a penalty cost. In some embodiments, deadband 1214 may be implemented as to allow some flexibility when determining an amount to spend on maintenance as it may be extremely difficult to spend an amount exactly equal to target maintenance cost 1216. For example, slightly exceeding target maintenance cost 1216 may normally incur a very high penalty cost such that objective function optimizer 940 does not determine a solution to the objective function J where a total cost of all maintenance expenditures exceeds target maintenance cost 1216. However, a right boundary of deadband 1214 may allow objective function optimizer 940 to slightly exceed target maintenance cost 1216 without incurring a penalty cost. Likewise, falling slightly below target maintenance cost 1216 may normally incur a lower penalty cost, but a left boundary of deadband 1214 may eliminate the lower penalty cost if objective function optimizer 940 can determine a solution to the objective function J that is greater than the left boundary of deadband 1214. Penalty costs are described in greater detail below with reference to FIG. 19A, according to some embodiments.

Model Predictive Maintenance with Budgetary Constraints

Figure 13:
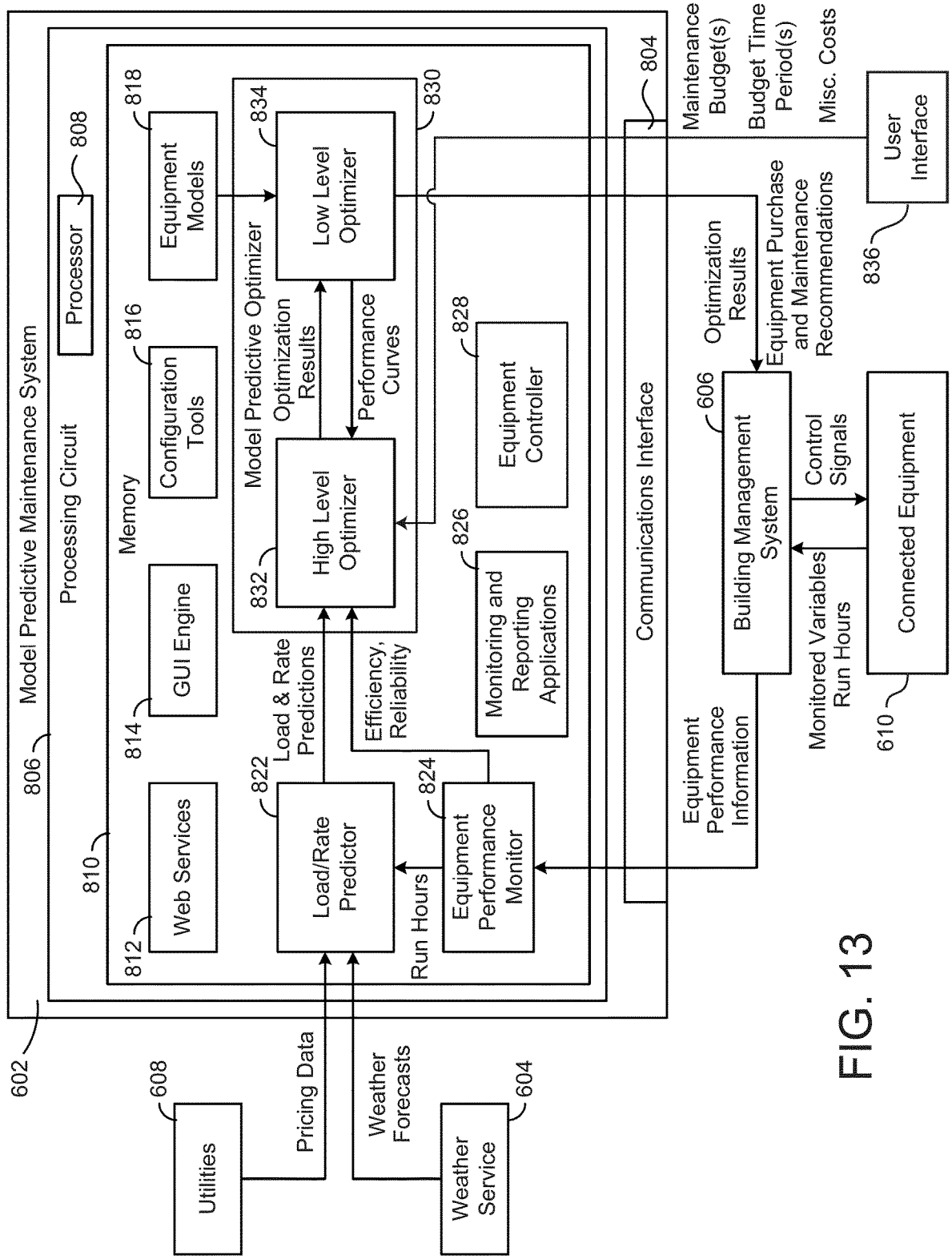
FIG. 13 is a block diagram illustrating the MPM system of FIG. 8 connected to a user interface, according to some embodiments.

Referring now to FIG. 13, a block diagram illustrating model predictive maintenance (MPM) system 602 (described in greater detail above with reference to FIGS. 6-9) connected to a user interface 836 is shown, according to some embodiments. In some embodiments, user interface 836 can communicate maintenance budgets and/or maintenance budget time periods associated with the maintenance budgets to high level optimizer 832. In some embodiments, high level optimizer 832 can use the maintenance budgets and/or the maintenance budget time periods to determine maintenance budget constraints and/or penalty costs.

User interface 836 can be any interface configured to receive maintenance budgets and/or maintenance budget time periods from a user and communicate with MPM system 602, according to some embodiments. In some embodiments, user interface 836 can be configured to receive capital budgets and/or capital purchase time periods from the user and communicate the same to MPM system 602. For example, user interface 836 can be implemented as a mobile device application, a command-line terminal in a building, a website application, a display device, a touch-screen, a thermostat, etc. In some embodiments, user interface 836 is be configured to communicate with high level optimizer 832 either through a direct connection (e.g., local wired or wireless communications) via communications interface 804 or via a communications network 446 (e.g., a WAN, the Internet, a cellular network, etc.).

In some embodiments, user interface 836 is configured to communicate the one or maintenance budgets and/or the maintenance budget time periods to high level optimizer 832. In some embodiments, user interface 836 is configured to communicate the capital budgets and/or the capital purchase time periods to high level optimizer 832. A maintenance budget may indicate a maximum amount that can be spent on maintenance over a maintenance budget time period and/or the optimization period, according to some embodiments. Similarly, a capital budget may indicate a maximum amount that can be spent on capital purchases over a capital purchase time period and/or the optimization period, according to some embodiments. In some embodiments, in response to receiving the budgets (i.e., maintenance budgets and/or capital budgets) and/or the time periods (i.e., maintenance budget time periods and/or capital purchase time periods), high level optimizer 832 can determine constraints that can be included in the objective function J.

For example, the objective function J may include a soft budgetary constraint implemented as either a symmetrical constraint or an asymmetrical constraint. In some embodiments, for a symmetrical soft constraint, an auxiliary variable δ is constrained as being greater than or equal to a magnitude of a difference between an amount spent on a repair (e.g., maintenance, replacement, etc.) activity and a target amount to spend on the repair activity (e.g., a budget). In a cost function (e.g., the objective function J), δ can be multiplied by a penalty rate and added to the cost function. For example, in a mixed integer linear programming (MILP) implementation, a symmetrical soft constraint can have the following form:

$$|C_{act} - Bud_{act}| \leq \delta$$

where $C_{act}$ is a total amount spent on a repair activity (e.g., maintenance, replacement, etc.), $Bud_{act}$ is a budget to spend on the repair activity, and δ is an auxiliary variable to be multiplied by a rate to determine a penalty cost for the repair activity. In some embodiments, the symmetrical soft constraint is determined for multiple repair activities. As δ approaches 0, an additional penalty cost imposed on the objective function J may decrease. In the objective function J, the additional penalty cost due to the symmetrical soft constraint can be included as:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i} + (r \times \delta)$$

where r is a penalty rate that can be adjusted to reduce/increase an impact of the symmetrical soft budgetary constraint on the objective function J. As such, as r increases, objective function optimizer 940 may attempt to reduce a value of δ to optimize (e.g., reduce) overall costs.

In some embodiments, the soft constraint is implemented as an asymmetrical soft constraint. An asymmetrical soft constraint can allow for having different penalty rates for total costs falling below a target budget and for total costs exceeding the target budget. For example, if the objective function J is optimized subject to an asymmetrical soft constraint, a penalty cost p for a repair activity can be added to the objective function J where p is subject to the following constraints:

$$p \geq r_{over}(C_{act} - Bud_{act})$$

$$p \geq -r_{under}(C_{act} - Bud_{act})$$

where $C_{act}$ is a total cost from a repair activity (e.g., maintenance, replacement, etc.), $Bud_{act}$ is a budget for the repair activity, $r_{over}$ is a penalty rate for costs exceeding the budget, and $r_{under}$ is a penalty rate for costs falling below the budget. In the objective function J, the additional penalty cost due to the asymmetrical soft constraint can be included as:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i} + p$$

where p is subject to the above constraints. Soft constraints are described in greater detail below with reference to FIG. 19A.

In some embodiments, objective function optimizer 940 uses the constraints to optimize the objective function J over the optimization period. For example, a user may communicate to high level optimizer 832 a maintenance budget that indicates that no more than $10,000 can be spent on maintenance over a next maintenance budget time period. In response to receiving the maintenance budget, high level optimizer 832 may generate a constraint in the objective function J such that that no more than $10,000 can be allocated towards maintenance over the next maintenance budget time period. As such, objective function optimizer 940 may determine an optimal solution to the objective function J such that a total maintenance expenditure for all maintenance during the optimization period is less than or equal to $10,000. As another example, a user may communicate to high level optimizer 832 via user interface 836 a first maintenance budget time period indicating a period of time when the first maintenance budget time period occurs. For example, the maintenance budget time period may include a start time (e.g., month, day, year), and an end time (e.g., month, day, year). In some embodiments, the first maintenance budget time period may fall entirely within the optimization period. In some embodiments, the first maintenance budget time period may fall only partially within the optimization period. In response to receiving the first maintenance budget time period, high level optimizer 832 can generate an additional constraint in the optimization problem. The additional constraint can indicate that total maintenance and/or capital costs should be less than a target budget (e.g., a maximum maintenance and replacement budget for a time period). This can result in different decision variables being set in order to not exceed the first maintenance budget, according to some embodiments.

Figure 14A:
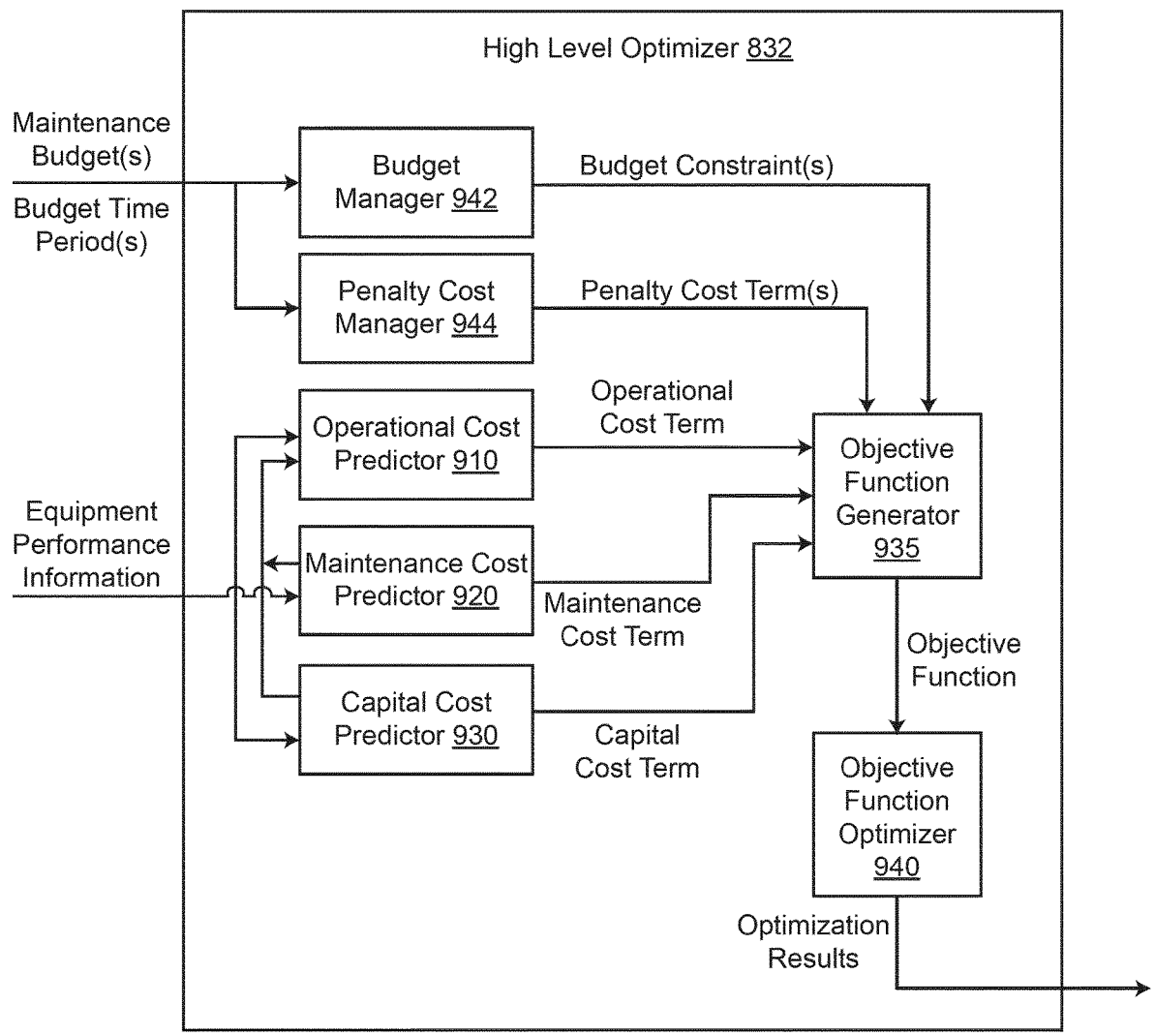
FIG. 14A is a block diagram illustrating the high level optimizer of FIG. 9 with additional constraint managers, according to some embodiments.

Referring now to FIG. 14A, a block diagram further illustrating high level optimizer 832 is shown, according to some embodiments. In some embodiments, high level optimizer 832 can be configured to determine constraints for the objective function J and optimize the objective function J based on the constraints. In some embodiments, high level optimizer 832 includes a budget manager 942 configured to generate budget constraints and provide the budget constraints to objective function generator 935 and/or objective function optimizer 940. In some embodiments, high level optimizer 832 includes a penalty cost manager 944 configured to generate a penalty cost term and provide the penalty cost term to objective function generator 935. In some embodiments, high level optimizer 832 uses at least one of budget manager 942 and penalty cost manager 944 to generate budget constraints and penalty cost terms, respectively, for objective function generator 935 and/or objective function optimizer 940. In some embodiments, certain components of high level optimizer 832 are part of a single component. However, each component is shown separately in FIG. 14A for ease of explanation.

In some embodiments, budget manager 942 provides the budget constraints to objective function generator 935 and/or objective function optimizer 940 based on the received maximum budgets and/or the received budget time periods. In some embodiments, the maximum budgets can be maximum maintenance budgets and/or maximum capital purchase budgets for corresponding budget time periods. Similarly, the budget time periods can be maintenance budget time periods and/or capital purchase time periods, according to some embodiments. In some embodiments, a budget constraint can associate a budget time period with a maximum budget (i.e., there is a maximum budget for the budget time period). In some embodiments, the budget constraint may act as a hard budgetary constraint such that objective function optimizer 940 optimizes the objective function J generated by objective function generator 935 so that an amount spent on maintenance and/or capital purchases (e.g., $) is equal to or less than the maximum budget for each budget time period.

In some embodiments, the maximum budgets and/or the budget time periods communicated to budget manager 942 are determined based on previous budget time periods. In some embodiments, MPM system 602 described with reference to FIG. 6 can be configured to use results from previous budget time periods to plan for upcoming budget time periods. For example, if a previous budget time period had an excessively high maximum budget, MPM system 602 may lower a maximum budget for an upcoming budget time period. Likewise, MPM system 602 may be able to estimate a maximum budget for an upcoming budget time period based on future predictions, according to some embodiments. The future predictions may be based on degradation models of equipment, upcoming renovations to a building, future budget restrictions, etc. For example, if a degradation state of many components of MPM system 602 is estimated to reach a critical level during a same budget time period based on degradation models of each component, MPM system 602 may estimate that a high maximum budget may be needed for the budget time period. In some embodiments, degradation models of building equipment are provided during installation of the building equipment. In some embodiments, degradation models of the building equipment are generated by MPM system 602 based on measured performance variables of the building equipment over time.

In some embodiments, maintenance cost predictor 920 and/or capital cost predictor 930 can provide a maintenance cost term or a capital cost term to determine a total activity expenditure $Cost_{act,j}$ for a $j^{th}$ budget time period and a total activity expenditure $Cost_{act}$ for the optimization period. In general, the total activity expenditure for a $j^{th}$ budget time period can be calculated by the following equation:

$$Cost_{act,j} = \sum_{i=1}^{h} C_{act,i} B_{act,i} Mask_{j,i}$$

where $Cost_{act,j}$ is the total activity expenditure for the $j^{th}$ budget time period (e.g., the maintenance cost term and/or the capital cost term), $C_{act,i}$ is an array of maintenance or replacement costs (e.g., $C_{main,i}$ or $C_{cap,i}$), each of which represents the cost of a different maintenance or replacement activity that can be performed at time step i, $B_{act,i}$ is an array of binary decision variables indicating whether each of the different types of activities will be performed at time step i (e.g., $B_{main,i}$ or $P_{cap,i}$), h is the duration of the horizon or optimization period over which the optimization is performed (e.g., a total number of time steps i in the optimization period), and $Mask_{j,i}$ is a binary variable (e.g., 0 or 1) indicating whether time step i occurs during the $j^{th}$ budget time period.

Further, the total activity expenditure for the optimization period can be calculated by the following equation:

$$Cost_{act} = \sum_{i=1}^{h} C_{act,i} B_{act,i}$$

where $Cost_{act}$ is the total activity expenditure for the optimization period. In some embodiments, $Mask_{j,i}$ can indicate whether or not the time step i occurs during a budget time period (e.g., a maintenance budget time period or a capital cost budget time period). For example, $Mask_{j,i}=0$ may indicate that the current time step i does not occur during the $j^{th}$ budget time period, so no expenditures can be incurred towards $Cost_{act,j}$ at time step i. In general, $Mask_{j,i}$ may be an element of a matrix Mask that has the following form:

$$Mask = \begin{bmatrix} Mask_{1,1} & Mask_{1,2} & \ldots & Mask_{1,h} \\ Mask_{2,1} & Mask_{2,2} & \ldots & Mask_{2,h} \\ \vdots & \vdots & \ddots & \vdots \\ Mask_{n,1} & Mask_{n,2} & \ldots & Mask_{n,h} \end{bmatrix}$$

where h is a last time step in the optimization period (i.e., i=h), n is a total number of budget time periods in the optimization period (i.e., a total number of maintenance budget time periods and/or a total number of capital cost budget time periods), and $Mask_{j,i}$ is a binary decision variable indicating whether time step i occurs during the $j^{th}$ budget time period.

For example, in an embodiment with 2 budget time periods and a total of 3 time steps during the optimization period, Mask may have the following form:

$$Mask = \begin{bmatrix} Mask_{1,1} & Mask_{1,2} & Mask_{1,3} \\ Mask_{2,1} & Mask_{2,2} & Mask_{2,3} \end{bmatrix}$$

where $Mask_{1,1}$ is a binary variable indicating whether time step 1 occurs during a budget time period 1, $Mask_{2,1}$ is a binary variable indicating whether time step 1 occurs during a budget time period 2, etc. Further, Mask of the example above can also be shown as:

$$\text{Mask} = \begin{bmatrix} 0 & 0 & 1 \\ 1 & 1 & 0 \end{bmatrix}$$

where $\text{Mask}_{1,1}=0$ indicates that time step i=1 does not occur during the budget time period j=1, $\text{Mask}_{1,2}=0$ indicates that time step i=2 does not occur during the budget time period j=1, $\text{Mask}_{1,3}=1$ indicates that time step i=3 occurs during the budget time period j=1, and $\text{Mask}_{2,1}=1$, $\text{Mask}_{2,2}=1$, and $\text{Mask}_{2,3}=0$ indicates that the budget time period j=2 occurs over time step i=1 to i=2. In some embodiments, graph 1500 and graph 1600 described below with reference to FIG. 15 and FIG. 16 respectively can further detail how a total activity expenditure for a $j^{th}$ maintenance budget time period and/or a total activity expenditure for an optimization period can be used.

In some embodiments, objective function generator 935 can generate an objective cost function for the case when multiple budget time periods occur within the optimization period. For example, objective function generator 935 can generate the objective function:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i}$$

In some embodiments, high level optimizer 832 can define a maximum budget vector $\text{Bud}_{max}$ that includes a maximum budget for each budget time period over an optimization period. In general, $\text{Bud}_{max}$ can have the following form:

$$\text{Bud}_{max} = \begin{bmatrix} \text{Bud}_{max,1} \\ \text{Bud}_{max,2} \\ \vdots \\ \text{Bud}_{max,n} \end{bmatrix}$$

where n is a number of budget time periods (e.g., the number of maintenance budget time periods) that occur during the optimization period, and $\text{Bud}_{max,j}$ indicates a maximum budget for the $j^{th}$ budget time period. In some embodiments, budget manager 942 can generate a constraint for the objective function J:

$$\sum_{i=1}^{h} C_{act,i} B_{act,i} \text{Mask}_i \leq \text{Bud}_{max}$$

where $C_{act,i}$ is an array of costs having an element for each of the possible maintenance/replacement activities that can be performed at time step i, $B_{act,i}$ is a column vector of binary decision variables that indicate whether each of the possible maintenance/replacement activities is performed at time step i, $\text{Mask}_i$ is a column vector (i.e., a column of the Mask matrix corresponding to time step i) and having an element for each budget time period j such that each element of the Mask vector indicates whether the time step i is within the corresponding budget time period j, and $\text{Bud}_{max}$ is a column vector having an element for each budget time period j such that each element of $\text{Bud}_{max}$ defines the maintenance/replacement activity budget for the corresponding budget time period j. For example, if $\text{Bud}_{max,1}=100$, objective function optimizer 940 optimizes (e.g., minimizes) the objective function J such that the j=1 budget time period does not have a cumulative maintenance/replacement expenditure over 100 (e.g., $100).

In some embodiments, values of $\text{Bud}_{max}$ are determined based on a maximum available budget including all expenses (e.g., operation, maintenance, replacement, employee salary, etc.) for each budget time period and degradation of building equipment. As building equipment degrades, more of the maximum available budget may be required to be allocated towards maintenance and replacement of the building equipment. For example, if degradation state of all building devices of the building equipment is low, values of $\text{Bud}_{max}$ may be smaller than if degradation states of some building devices are large. In other words, a budget for maintenance/replacement for each budget time period can be allocated from a maximum available budget each for budget time period based on degradation states of building equipment. In some embodiments, graph 1700 and graph 1800 described below with reference to FIG. 17 and FIG. 18 respectively further illustrate utilization of maximum budget vector $\text{Bud}_{max}$.

In some embodiments, budget manager 942 generates a constraint for the objective function J in the form of an additional state of the optimization problem. The state can be, for example, a remaining amount of a budget and/or an amount already spent on maintenance/replacement. The state can be tracked throughout an optimization period to constrain optimization of the objective function J to keep the states within certain parameter bounds. For example, if the state includes the remaining amount of budget, a value of the state may be equal to the maintenance/replacement budget at a beginning of the optimization period and can decrease for each maintenance/replacement performed. If performing the optimization and the state illustrates a hard constraint, the optimization may be required to determine a solution that maintains the value of the state equal to or greater than 0. If performing the optimization and the state illustrates a soft constraint, the optimization may allow the value of the state to drop below 0, however, an additional penalty cost may be incurred. Advantageously, implementing the budgetary constraints as states can allow the optimization problem to be solved using a dynamic programming framework.

Figure 18:
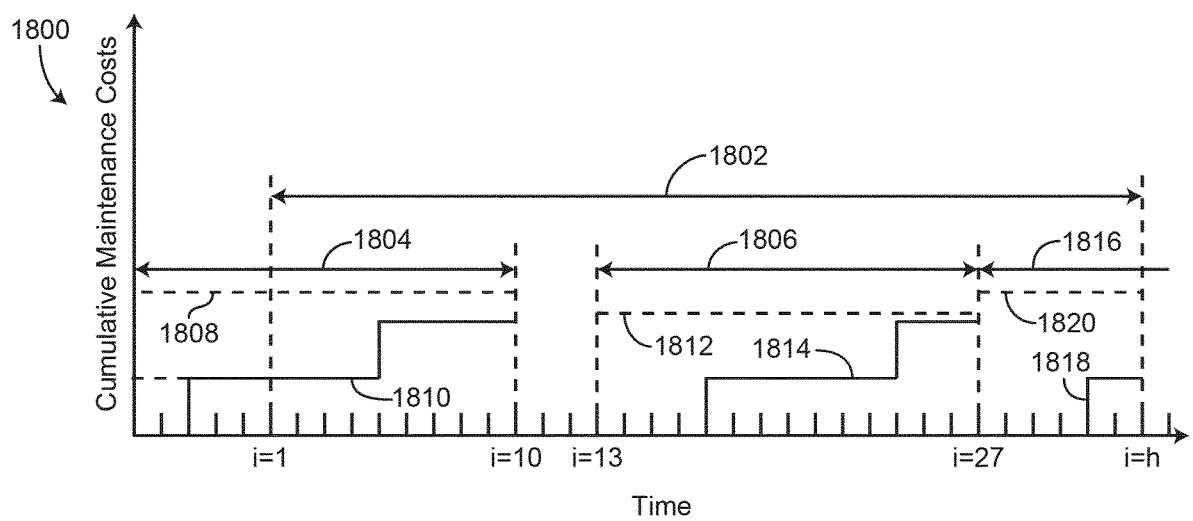
FIG. 18 is a graph illustrating cumulative maintenance costs over an optimization period with at least one budget period extending partially outside the optimization period, according to some embodiments.

Referring now to FIGS. 14A and 18, if only a fraction of a budget time period occurs during an optimization period, high level optimizer 832 should adjust a maintenance and replacement budget allocated for the budget time period occurring only partially during the optimization period. Graph 1800 of FIG. 18 shows a first maintenance budget time period 1804 and a third maintenance budget time period 1816 both partially occurring within an optimization period 1802. If a budget time period occurs only partially within an optimization period, budget manager 942 may be required to determine an available budget for the optimization period as to not disrupt past and/or future optimization periods.

For example, as shown in FIG. 18, first maintenance budget time period 1804 is shown to begin before the start of optimization period 1802 at i=1. As first maintenance budget time period 1804 occurs only partially within optimization period 1802, budget manager 942 can set $\text{Bud}_{max,1}$ a maximum budget for first maintenance budget time period 1804, of a maximum budget vector $\text{Bud}_{max}$ to the remaining amount of assets available for first maintenance budget time period 1804. Particularly, as shown in graph 1800 of FIG.

18, first maintenance budget time period 1804 includes an expenditure before the beginning of optimization period 1802 (e.g., at three time steps before i=1). Budget manager 942 can account for expenditures (e.g., maintenance expenditures or capital cost expenditures) that occur before optimization period 1802 by setting a value of $\text{Bud}_{max,1}$ to the remaining amount of assets for first maintenance budget time period 1804. As shown in FIG. 18, first maintenance budget time period 1804 includes a single expense that can be deducted from $\text{Bud}_{max,1}$. For example, if $\text{Bud}_{max,1}$ is allocated $1,000, but $200 was spent prior to optimization period 1802 starting, budget manager 942 can set $\text{Bud}_{max,1}$=$800 for optimization period 1802.

In some embodiments, if only part of a budget time period occurs during an optimization period, budget manager 942 determines a reduced budget value. In general, the reduced budget value can be modeled by the following equation:

$$\text{Bud}_{reduced} = P \cdot \text{Bud}_{max}$$

where $\text{Bud}_{reduced}$ is the reduced budget, $\text{Bud}_{max}$ is the maximum budget for the budget time period that partially occurs over the optimization period (e.g., first maintenance budget period 1804), and P is a normalized value (i.e., $0 \leq P \leq 1$) indicating a fraction of the budget time period that occurs within the optimization period. For example, if the budget time period occurs entirely during the optimization period (e.g., second maintenance budget time period 1806 occurs entirely within optimization period 1802 as shown in FIG. 18), then the value of P may be 1 such that $\text{Bud}_{reduced} = \text{Bud}_{max}$. If the budget time period occurs only partially during the optimization period (e.g., first maintenance budget time period 1804 and third maintenance budget time period 1816 occur partially within optimization period 1802) P may indicate an amount (e.g., a half, a third, a quarter, etc.) of the budget time period that occurs within the optimization period. For example, if 50% of the budget time period occurs during the optimization period, then P=0.5. In some embodiments, the reduced budget is calculated for budget time periods that start within the optimization period but end after the end of the optimization period (e.g., third maintenance budget time period 1816 starts within optimization period 1802 but ends after the end of optimization period 1802).

If the $n^{th}$ budget time period occurs partially within the optimization period (e.g., third maintenance budget time period 1816 occurs partially within optimization period 1802 as shown in FIG. 18), budget manager 942 determines the $n^{th}$ budget as:

$$\text{Bud}_{reduced,n} = P \cdot \text{Bud}_{max,n}$$

according to some embodiments. Budget manager 942 can update the $n^{th}$ value of the maximum budget vector $\text{Bud}_{max}$ as $\text{Bud}_{reduced,n}$ and provide the updated maximum budget vector $\text{Bud}_{max}$ to objective function generator 935 and/or objective function optimizer 940 as constraints.

Referring again to FIG. 14, penalty cost manager 944 can provide penalty cost terms to objective function generator 935. In some embodiments, a penalty cost term defines a penalty cost based on a difference between a maximum budget and an estimated expenditure (e.g., an estimated maintenance expenditure or an estimated capital purchase expenditure) for a budget time period as calculated by objective function optimizer 940. In some embodiments, a penalty cost is an additional cost taken into consideration by objective function optimizer 940 when optimizing objective function J. In some embodiments, a modified objective function $J_{mod}$ includes both a solution to objective function J as well as the penalty cost. In general, $J_{mod}$ can be modeled by the following equation:

$$J_{mod} = J + \sum_{j=1}^{n} w_j p_{k,j}$$

where J is the objective function J, $w_j$ is a weight that increases or decreases the value of $p_{k,j}$, and $p_{k,j}$ is the penalty cost incurred over the $j^{th}$ budget time period. In some embodiments, $w_1$ has a value of 1 which can indicate no additional weight is attributed to $p_{k,j}$. In some embodiments, $w_j$ is a normalized value that can be adjusted to either increase the effect of $p_{k,j}$ (causing objective function optimizer 940 to achieve a solution that results in the maximum budget and the estimated expenditure for the budget time period being substantially equal), or decreased to reduce the effect of $p_{k,j}$. In some embodiments, the penalty cost can be modeled by a piecewise function. In general, the piecewise function that models the penalty cost can have the following form:

$$p_{k,j} = \begin{cases} A|\text{Bud}_{max,j} - \text{Cost}_{est,j}| & \text{if } \text{Bud}_{max,j} - \text{Cost}_{est,j} < 0 \\ 0 & \text{if } \text{Bud}_{max,j} - \text{Cost}_{est,j} = 0 \\ B|\text{Bud}_{max,j} - \text{Cost}_{est,j}| & \text{if } \text{Bud}_{max,j} - \text{Cost}_{est,j} > 0 \end{cases}$$

where $p_k$ is the penalty cost, A is a slope for $\text{Bud}_{max,j} - \text{Cost}_{est,j} < 0$, B is a slope for $\text{Bud}_{max,j} - \text{Cost}_{est,j} > 0$, $\text{Bud}_{max,j}$ is the maximum budget over budget time period j (e.g., the $j^{th}$ value of the maximum budget vector $\text{Bud}_{max}$), and $\text{Cost}_{est,j}$ is the estimated expenditure over budget time period j. In some embodiments, A and/or B can be increased or decreased to add more weight to the penalty cost. For example, increasing A can result in an increased value of $p_{k,j}$ when $\text{Bud}_{max,j} - \text{Cost}_{est,j} < 0$. In some embodiments, increasing A and/or B can incentivize determining a solution to the objective function J that lowers the difference between $\text{Bud}_{max,j}$ and $\text{Cost}_{est,j}$ such that $p_{k,j}$ is substantially equal to zero. In some embodiments, A and B are described in further detail below with reference to FIG. 19A. In some embodiments, $\text{Cost}_{est,j}$ for a $j^{th}$ budget time period can be modeled by the following equation:

$$\text{Cost}_{est,j} = \text{Cost}_{main,j} + \text{Cost}_{cap,j}$$

or:

$$\text{Cost}_{est,j} = \text{Cost}_{cap,j}$$

or:

$$\text{Cost}_{est,j} = \text{Cost}_{main,j}$$

where $\text{Cost}_{main,j}$ is the maintenance cost term for a $j^{th}$ budget time period, and $\text{Cost}_{cap,j}$ is the capital cost term of the objective function J for the $j^{th}$ budget time period. In some embodiments, when calculating $p_{k,j}$, A can be greater than B which can indicate that a higher penalty cost may be incurred if the estimated expenditure exceeds the maximum budget. Based on a value of A and B, objective function optimizer 940 may, for example, determine optimal values of decision variables that minimize the penalty cost incurred relative to the values of A and B. In some embodiments, when objective function optimizer 940 determines an optimal maintenance schedule, which can include both maintenance activities and capital purchases, objective function optimizer 940 can be configured to minimize the difference between the maximum budget and the estimated expenditure to lower the penalty cost. In some embodiments, the value of the penalty cost is related to the difference between the maximum budget and the estimated expenditure such that increased difference between the maximum budget and the estimated expenditure corresponds to (e.g., results in) a higher value of the penalty cost. In some embodiments, the penalty cost may increase at a higher rate when the estimated expenditure exceeds the maximum budget rather than when the estimated expenditure falls below the maximum budget. In some embodiments, objective function optimizer 940 may work to reduce the difference between the maximum budget and the estimated expenditure as to minimize the penalty cost.

In some embodiments, high level optimizer 832 can define an expenditure difference as a difference between a maximum budget and an estimated expenditure over a budget time period. In general, the expenditure difference can be modeled using the following equation:

$$J_{gap,j} = \text{Bud}_{max,j} - \text{Cost}_{est,j}$$

where $J_{gap,j}$ is the expenditure difference for the $j^{th}$ budget time period, $\text{Bud}_{max,j}$ is the maximum budget of the $j^{th}$ budget time period, and $\text{Cost}_{est,j}$ is an estimated expenditure over budget time period j. In some embodiments, the expenditure difference can be used by objective function optimizer 940 to estimate whether hard budgetary constraints will be adhered to. In some embodiments, $J_{gap,j}$ may be positive, indicating that the final value of the cumulative expenditure is estimated to be under the maximum budget for the budget time period. In some embodiments, $J_{gap,j}$ may be equal to 0, indicating that exactly the maximum budget is estimated to be accumulated in costs over the $j^{th}$ budget time period. In some embodiments, $J_{gap,j}$ may be negative, indicating that more than the maximum budget is estimated accumulated in costs over the budget time period. In some embodiments, the hard budgetary constraint can result in the objective function J being unsolvable. In some embodiments, if the objective function J is unsolvable, the objective function optimizer 940 can return an error. In some embodiments, expenditure difference can be used by objective function 940 to determine a penalty cost for the budget time period. In general, the larger expenditure difference is, the larger the penalty cost can be. Penalty cost is described in greater detail below with reference to FIG. 19A.

Model Predictive Maintenance with Failure Risk

Figure 14B:
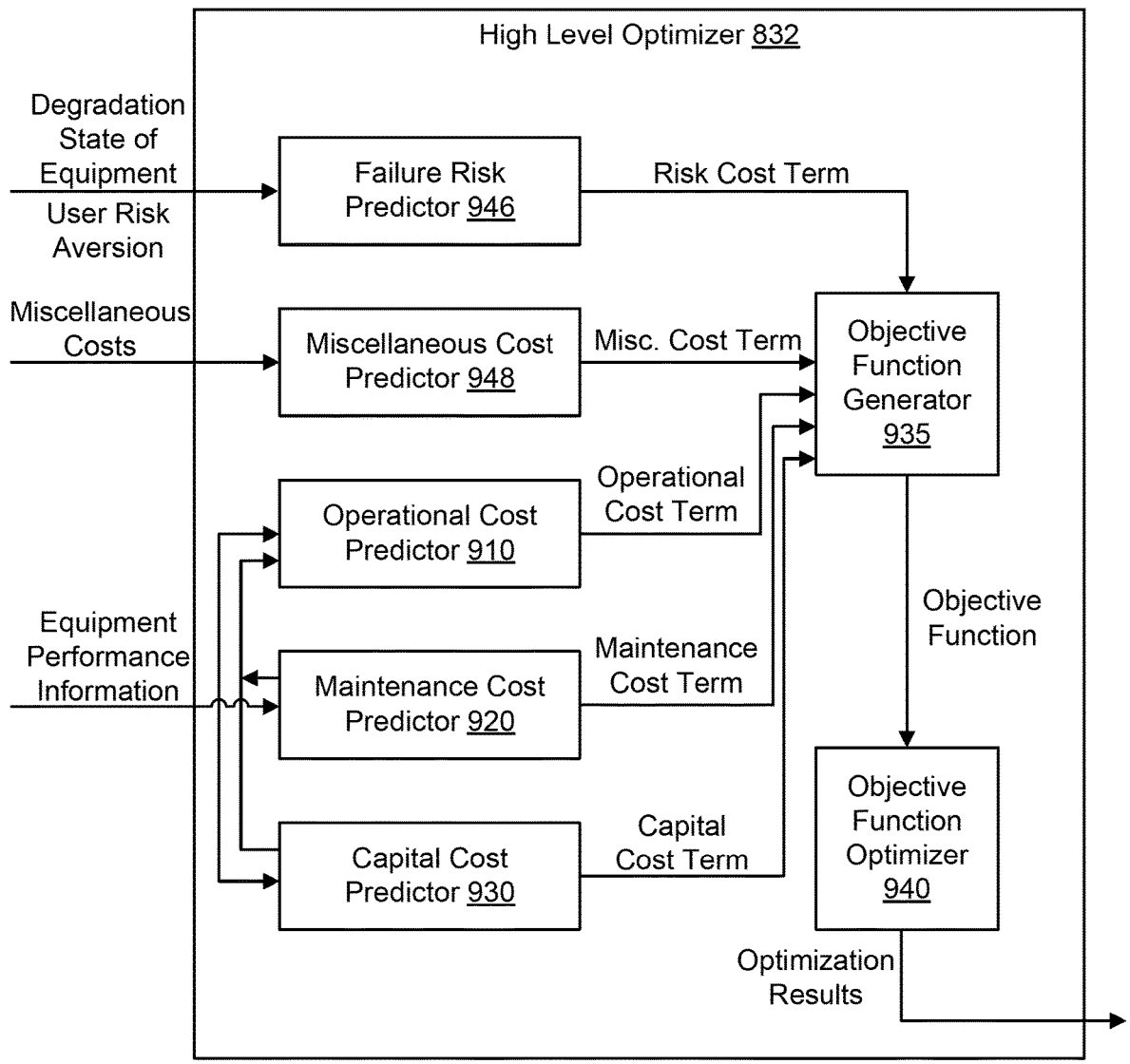
FIG. 14B is a block diagram illustrating the high level of optimizer of FIG. 9 including a failure risk predictor is shown, according to some embodiments.

Referring now to FIG. 14B, a block diagram further illustrating high level optimizer 832 is shown, according to some embodiments. In some embodiments, high level optimizer 832 incorporates a failure risk of building equipment in the objective function J and optimizes the objective function J based on the failure risk. In some embodiments, high level optimizer 832 as shown in FIG. 14B incorporates budget manager 942 and/or penalty cost manager 944 as described above with reference to FIG. 14A. In some embodiments, high level optimizer 832 as shown in FIG. 14B illustrates a separate use case such that an objective function generated by objective function generator 935 incorporates the risk cost term and may or may not incorporate budget constraints/penalty cost terms.

In some embodiments, high level optimizer 832 includes a failure risk predictor 946 to generate a risk cost term and provide the risk cost term to objective function generator 935. As building equipment degrades over time, a probability of the building equipment failing may increase. Specifically, the probability that the building equipment may fail at a future time step may be greater than or equal to the probability that the building equipment may fail at a current time step if no maintenance/replacement of the building equipment is performed. Failure of building equipment may require BMS 606 to incur costs related to maintenance and/or replacement of the building equipment along with various opportunity costs such as unmet loads or missed production. For example, if an indoor unit (IDU) of a VRF system fails and the failure results in a safety hazard for occupants of a room, costs related to performing maintenance/replacement of the IDU and costs related to closing the room (e.g., renting a new room for the occupants, cancelling meetings in the room, missed production, etc.) may be incurred.

The risk cost term generated by failure risk predictor 946 can incorporate a probability of failure of tracked building equipment for time steps of an optimization period along with a cost of failure of the tracked building equipment. As described, the tracked building equipment can include any building equipment for which a degradation state and/or other performance information is observed.

Based on the risk cost term provided by failure risk predictor 946, objective function generator 935 can generate an objective function (e.g., the objective function J) incorporating the risk cost term along with the cost terms provided by predictors 910-930. For example, the objective function generated by objective function generator 935 may have the following form:

$$J(m_k) = \sum_{k=1}^{h} \left\{ c_{op,k}(\delta_k) + \begin{bmatrix} c_{main,k} \\ c_{replace,k} \end{bmatrix}^T m_k + C_{fail,k}^T P_{fail,k}(\delta_k) \right\}$$

where $C_{op,k}(\delta_k)$ is an operational cost dependent on a state of degradation $\delta_k$, $C_{main,k}$ is a cost of maintenance at time step k of an optimization period, $C_{replace,k}$ is a cost of replacement at time step k, $m_k$ is a binary vector representing which maintenance actions are taken at time step k, $P_{fail,k}(\delta_k)$ is a vector of probabilities of failure for each component of the tracked building equipment (e.g., each tracked component of BMS 606) dependent on the state of degradation $\delta_k$, $C_{fail,k}$ is a cost of failure of the tracked building equipment, and h is a total number of time steps of the optimization period. In the above objective function, the T superscript indicates a transpose of the associated matrix. Values of $C_{fail,k}$ can include a cost to repair/replace the tracked building equipment and/or any opportunity costs related to failure of the tracked building equipment. It should be appreciated that the first block of the maintenance vector includes maintenance options while the second block of the maintenance vector includes replacement options. The first and second blocks are split apart to illustrate how maintenance and replacement with new building equipment are both considered. In some embodiments, the first and second blocks indicating maintenance and replacement options respectively are combined into a single block. Further, it should be appreciated that $C_{fail,k}^T P_{fail,k}(\delta_k)$ illustrates the risk cost term of the objective function.

In some embodiments, the objective function generated by objective function generator 935 incorporating the risk cost term has the following form:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i} + \sum_{i=1}^{h} C_{fail,i}^T P_{fail,i}(\delta_i)$$

where $C_{fail,i}$ is a cost of failure of building equipment at a time step i of an optimization period, $P_{fail,i}(\delta_i)$ is a probability of failure at time step i based on a state of degradation $\delta_i$ at time step i, and all other variables are as described above.

Based on the objective function including the risk cost term, objective function optimizer 940 can determine optimal values of decision variables such that an overall cost is optimized (e.g., minimized). Due to the risk cost term, certain maintenance and/or replacement may occur at an earlier/later time step than if the risk cost term were not included in the objective function. Particularly, the risk cost term can be managed by objective function optimizer 940 such that a probability of failure for any building device of building equipment is kept sufficiently low such that costs are optimized. In some embodiments, the risk cost term may require objective function optimizer 940 to ensure building devices of building equipment have maintenance/replacement performed more frequently than if the risk cost term were not included in the objective function such that degradation states of the building devices do not reach critical levels where the building devices are likely to fail.

In some embodiments, failure of building equipment is considered to occur if a value of $\delta_i$ exceeds a randomly distributed threshold value. In some embodiments, the threshold values of failure for each building device of building equipment differ depending on the specific building device. For example, if degradation is measured as a percentage of reliability as compared to reliability at installation, a specific IDU may be considered to have failed if the specific IDU falls below 30% of installation reliability, whereas a fan of an HVAC system may be considered to have failed if the fan falls below 20% of installation reliability. In some embodiments, the threshold value of failure for each building device of building equipment is the same. For example, if degradation is measured based on a percentage of installation reliability, if any building device falls below 15% of installation reliability, the building device may be considered to have failed. In some embodiments, failure of building equipment is considered to occur if, for example, the building equipment cannot start, the building equipment is producing outputs that are dangerous for occupants (e.g., smoke, harmful gasses), etc. As such, if optimizing the objective function including the risk cost term, objective function optimizer 940 can determine values of decisions variables that decrease a probability of building devices failing.

In some embodiments, objective function optimizer 940 allows some building devices of building equipment to have a high probability of failure (e.g., >50%, >60%, etc.) in order to prioritize maintenance/replacement of other building devices. For example, to optimize costs, objective function optimizer 940 may determine values of decisions variables that result in a fan having a high probability of failure in order perform maintenance/replacement of a ventilation shaft at an earlier time step. The decision to temporarily allow the fan to have the high probability of failure may a smaller impact on cost (e.g., due to additional maintenance and/or opportunity costs) in comparison to if the ventilation shaft were to fail. As such, maintenance/replacement of the ventilation shaft may be prioritized over maintenance/replacement of the fan in order to further optimize (e.g., reduce) overall costs. Decisions made by objective function optimizer 940 due to a distribution of a probability of failure is shown in greater detail below with reference to FIGS. 19B and 19C.

In some embodiments, the optimization performed by objective function optimizer 940 is constrained by a risk aversion value. A risk aversion value can be set by a user and/or the system to indicate a maximum allowable probability of failure for certain building devices. For example, a user may set a risk aversion value of 45% for building devices with a failure cost greater than $500. Due to the risk aversion value, the optimization can determine an optimal maintenance and replacement schedule such that any building device with an estimated failure cost greater than $500 has a probability of failure of less than 45% throughout an optimization period. Effectively, a risk aversion value can place a constraint on the optimization such that decision variables related to maintenance and/or replacement of building equipment ensure probability of failure of certain building devices is kept below a particular value. In some embodiments, if objective function optimizer 940 cannot determine a solution that maintains a probability of failure of a particular building device below a risk aversion value, an alert is provided to a user indicating the probability of failure of the particular building device may exceed the risk aversion value.

In some embodiments, a probability of failure at any week into the future is found by integrating a density function from the beginning of a week to the end of the week. The probability of failure can be multiplied by a cost of failure and added to the cost function (e.g., the objective function J). In some embodiments, the cost of failure is a random variable rather than a fixed variable. In some embodiments, the probability of failure is displayed on a device (e.g., a mobile device, a computer, etc.). For example, a cumulative distribution function (CDF) of the probability of failure can be indicated on the device as a gradient indicating a probability of failure. The gradient may, for example, transition from green to yellow to red such that green indicates a probability of failure is low, yellow indicates failure is likely approaching, and red indicates failure is likely to happen in the near future.

High level optimizer 832 of FIG. 14B is also shown to include a miscellaneous cost predictor 948. Miscellaneous cost predictor 948 can generate a miscellaneous cost term to provide to objective function generator 935. The miscellaneous cost term can include maintenance activities, replacement activities, and/or other activities that result in miscellaneous expenses. In some embodiments, the repairs accounted for by miscellaneous cost predictor 948 impact reliability of building equipment but do not result in any efficiency changes. If a miscellaneous repair activity (e.g., a maintenance/replacement activity that incurs miscellaneous expenses) does not impact efficiency of building equipment, the miscellaneous repair activity may not affect operational costs over an optimization period. For example, a miscellaneous repair activity can include a building operator replacing screws of an outdoor unit (ODU) of a VRF system to stabilize critical components of the ODU. In some embodiments, replacing the screws of the ODU affects reliability of the ODU (i.e., by increasing stabilization of the critical components), but does not impact efficiency of the ODU. As such, replacing the screws can improve reliability of the ODU, but might not have any direct impact on operational costs incurred due to operation of the ODU.

In some embodiments, the miscellaneous cost term allows users to incorporate other miscellaneous expenses with the objective function J to provide a more accurate determination of total costs over an optimization period. For example, a user may incorporate salary costs of employees into the objective function J via the miscellaneous cost term. Salary costs may come out of a same budget as maintenance/replacement expenses and a user may desire to have objective function optimizer 940 determine an optimal solution in accordance with the other miscellaneous expenses entered by users. In some embodiments, users can flag certain miscellaneous expenses as mandatory such that the optimization performed by objective function optimizer 940 cannot avoid incurring the flagged miscellaneous expenses. By allowing users to add miscellaneous expenses to the objective function J, the users can get a more accurate picture of total costs over an optimization period.

In some embodiments, the objective function J including the miscellaneous cost term generated by miscellaneous cost predictor 948 can be shown by the following:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i} + \sum_{i=1}^{h} C_{misc,i} B_{misc,i}$$

where $C_{misc,i}$ is a miscellaneous maintenance expense at time step i, and $B_{misc,i}$ is a binary variable indicating whether the miscellaneous expense is incurred at time step i.

Another example of an objective function which can be generated by objective function generator 935 is shown in the following equation:

$$J = C_{op} P_{op} \Delta t + C_{main} B_{main} + C_{cap} B_{cap} + C_{misc} B_{misc}$$

$$J = [C_{op,1} \ C_{op,2} \ \ldots \ C_{op,h}][P_{op,1} \ P_{op,2} \ \ldots \ P_{op,h}]^T \Delta t +$$

$$[C_{main,1} \ C_{main,2} \ \ldots \ C_{main,m}] \begin{bmatrix} B_{main,1,1} & B_{main,1,2} & \ldots & B_{main,1,h} \\ B_{main,2,1} & B_{main,2,2} & \ldots & B_{main,2,h} \\ \vdots & \vdots & \ddots & \vdots \\ B_{main,m,1} & B_{main,m,2} & \ldots & B_{main,m,h} \end{bmatrix} +$$

$$[C_{cap,1} \ C_{cap,2} \ \ldots \ C_{cap,p}] \begin{bmatrix} B_{cap,1,1} & B_{cap,1,2} & \ldots & B_{cap,1,h} \\ B_{cap,2,1} & B_{cap,2,2} & \ldots & B_{cap,2,h} \\ \vdots & \vdots & \ddots & \vdots \\ B_{cap,p,1} & B_{cap,p,2} & \ldots & B_{cap,p,h} \end{bmatrix} +$$

$$[C_{misc,1} \ C_{misc,2} \ \ldots \ C_{misc,s}] \begin{bmatrix} B_{misc,1,1} & B_{misc,1,2} & \ldots & B_{misc,1,h} \\ B_{misc,2,1} & B_{misc,2,2} & \ldots & B_{misc,2,h} \\ \vdots & \vdots & \ddots & \vdots \\ B_{misc,s,1} & B_{misc,s,2} & \ldots & B_{misc,s,h} \end{bmatrix}$$

where the array $C_{misc}$ includes a miscellaneous cost value $C_{misc,i}$ for a particular miscellaneous expense l=1 ... s of the optimization period, and the array $B_{misc}$ includes a binary decision variable for a particular miscellaneous expense l=1 ... s at a particular time step i=1 ... h of the optimization period.

In some embodiments, a user defines what miscellaneous expenses are to be considered during optimization of the objective function J to improve reliability of building equipment. In some embodiments, the risk cost term is considered by objective function optimizer 940 in conjunction with the miscellaneous cost term. As the miscellaneous cost term may provide additional options to objective function optimizer 940 to increase reliability of building equipment, objective function optimizer 940 may have more options to decrease a probability of failure of the building equipment. For example, a user may define a miscellaneous repair activity of applying a sealant to piping of a ventilation system to protect against cracks in the piping. While the sealant may not increase efficiency of the piping, it may increase reliability as the piping may be less likely to break due to cracks. In some embodiments, both the user and the system contribute miscellaneous repair activities to miscellaneous cost predictor 948 to include in the miscellaneous cost term. Each additional miscellaneous repair activity can provide an alternative option to increase reliability of building equipment. Depending on reliability improvements of each miscellaneous repair activity, a particular miscellaneous repair activity may be less expensive than performing a typical maintenance and/or a full replacement of the building equipment that can affect both reliability and efficiency of building equipment. As such, the miscellaneous repair activities may allow objective function optimizer 940 to further optimize the objective function J by reducing a value of the risk cost term.

One example of the objective function J generated by objective function generator 935, if both the risk cost term generated by failure risk predictor 946 and the miscellaneous cost term generated by miscellaneous cost predictor 948 are incorporated into the objective function J, is shown by the following equation:

$$J = \sum_{i=1}^{h} C_{op,i} P_{op,i} \Delta t + \sum_{i=1}^{h} C_{main,i} B_{main,i} +$$

$$\sum_{i=1}^{h} C_{cap,i} B_{cap,i} + \sum_{i=1}^{h} C_{misc,i} B_{misc,i} + \sum_{i=1}^{h} C_{fail,i}^T P_{fail,i}(\delta_i)$$

Based on the above objective function, objective function optimizer 940 can determine values of decision variables such that overall costs are optimized (e.g., minimized). Depending on a failure cost of each building device, objective function optimizer 940 may determine that additional maintenance, replacement, and/or miscellaneous repair activities should be performed on building devices with a high failure cost to keep a probability of failure of said building devices low.

In some embodiments, the objective function J includes some and/or all of the miscellaneous cost term, the failure cost term, and budgetary constraints. If the objective function J includes all of the miscellaneous cost term, the failure cost term, and budgetary constraints, objective function optimizer 940 can determine an optimal solution to optimize (e.g., minimize) overall costs due to each term of the objective function J while constrained to any budgetary constraints in the optimization.

Optimization of Budget Periods over an Optimization Period

Figure 15:
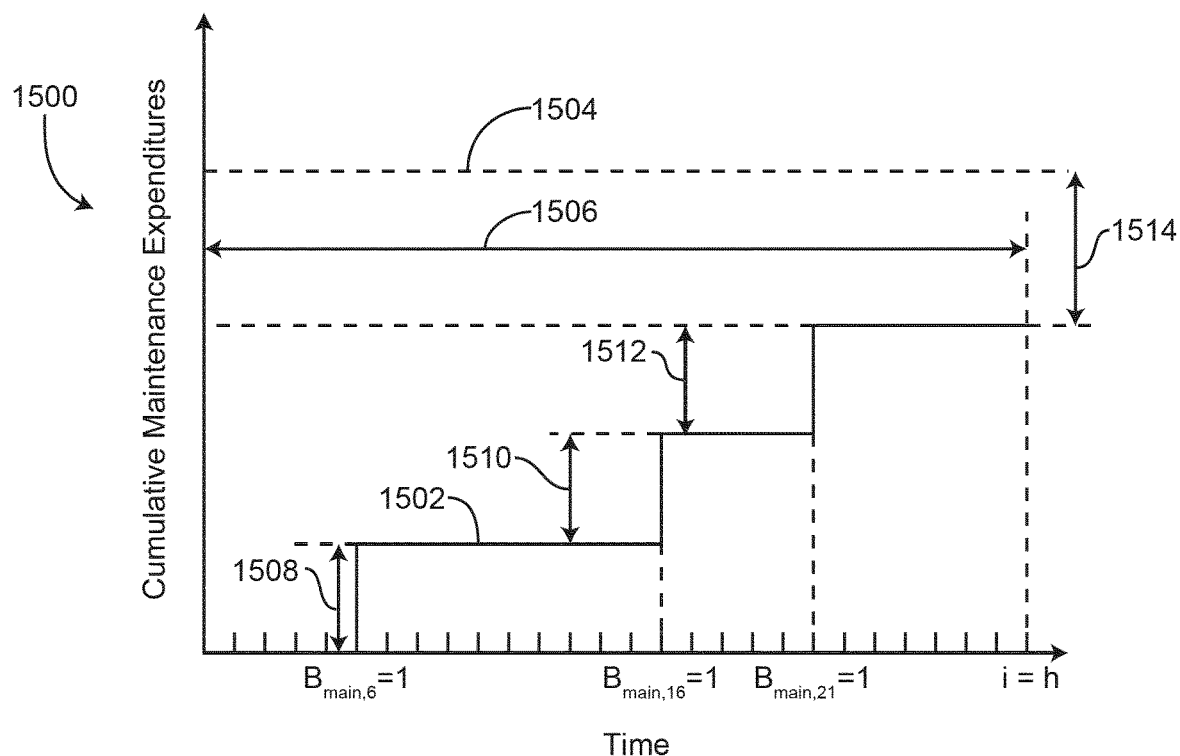
FIG. 15 is a graph illustrating cumulative maintenance expenditures over an optimization period while under a hard budgetary constraint, according to some embodiments.

Referring now to FIG. 15, a graph 1500 illustrating cumulative maintenance expenditures over an optimization period while under a hard budgetary constraint is shown, according to some embodiments. In some embodiments, capital purchase over an optimization period while under a hard budgetary constraint can be illustrated similar to and/or the same as the maintenance expenditures described herein. In some embodiments, the hard budgetary constraint is a maximum maintenance budget indicating a maximum amount (e.g., $) that can be spent on maintenance over a maintenance budget time period. In graph 1500, an optimization period 1506 is shown, such that optimization period 1506 is the same period of time as the maintenance budget time period. In FIG. 15, optimization period 1506 and the maintenance budget time period may be the same such that the objective function J does not need to include multiple maintenance budget time periods, thereby reducing the amount of constraints placed upon the objective function J.

Graph 1500 is also shown to include a maximum maintenance budget 1504, according to some embodiments. In some embodiments, maximum maintenance budget 1504 can be a maximum allowable amount that can be spent on maintenance over optimization period 1506. In some embodiments, maximum maintenance budget 1504 can be communicated to model predictive maintenance system 602 via user interface 836 described in greater detail above with reference to FIG. 13. In some embodiments, maximum maintenance budget 1504 can be represented as a variable $Bud_{max}$, such that $Bud_{max}$ can equal the maximum amount that is allowed to be spent on maintenance over optimization period 1506.

Still referring to FIG. 15, graph 1500 illustrates how maintenance expenditures may be determined over optimization period 1506 by objective function optimizer 940. Until time step 6, no maintenance expenditures are made, according to some embodiments. At time step 6 of graph 1500, a first maintenance expenditure 1508 is shown, according to some embodiments. In some embodiments, a cost of first maintenance expenditure 1508 can be represented as $Cost_{main,1}$. In general, a maintenance expenditure can be shown to occur at time step i as $B_{main,i}=1$. In some embodiments, $B_{main,i}$ may be $B_{act,i}$ described with reference to FIG. 14A for a maintenance activity. For example, first maintenance expenditure 1508 is shown to occur at time step 6 as $B_{main,6}=1$, according to some embodiments. Likewise, if maintenance does not occur at time step i then $B_{main,i}=0$. In some embodiments, first maintenance expenditure 1508 may occur due to a determination from high level optimizer 832 described with reference to FIG. 14A that maintenance should be performed at time step 6. After first maintenance expenditure 1508 is performed, a cumulative maintenance expenditure $Cost_{main}$ can be described as $Cost_{main}=Cost_{main,1}$.

Graph 1500 is also shown to include a time interval 1502, according to some embodiments. In some embodiments, $Cost_{main}=Cost_{main,1}$ may define the cumulative maintenance expenditure over the entire duration of time interval 1502. At time step 16, a second maintenance expenditure 1510 is shown to be performed, such that a cost of second maintenance expenditure 1510 can be represented as $Cost_{main,2}$. Similar to first maintenance expenditure 1508, a maintenance is shown to occur at time step 16 as $B_{main,16}=1$. In some embodiments, second maintenance expenditure 1510 may increase the cumulative maintenance expenditure $Cost_{main}$ to $Cost_{main}=Cost_{main}\ Cost_{main,2}$. Finally, at time step 21, a third maintenance expenditure 1512 is shown to occur, such that a cost of third maintenance expenditure 1512 can be represented as $Cost_{main,3}$. Similar to first maintenance expenditure 1508, a maintenance is shown to occur at time step 21 as $B_{main,21}=1$, according to some embodiments. In some embodiments, third maintenance expenditure 1512 may increase the cumulative maintenance expenditure $Cost_{main}$ to $Cost_{main}=Cost_{main,1}+Cost_{main,2}+Cost_{main,3}$. In some embodiments, optimization period 1504 is shown from time step i=1 to time step i=h. During optimization period 1504, objective function optimizer 940 may determine an optimal maintenance and replacement schedule indicating that an optimal cumulative cost of maintenance is $Cost_{main}=Cost_{main,1}+Cost_{main,2}+Cost_{main,3}$ and that maintenance occurs at time steps 6, 16, and 21 as shown above, according to some embodiments. In some embodiments, the determination of the optimal maintenance and replacement schedule may indicate the objective function J for optimization period 1504 is optimized.

Graph 1500 is also shown to include a maintenance expenditure difference 1514. In some embodiments, maintenance expenditure difference is defined as a difference between maximum maintenance budget 1504 and a final value of the cumulative maintenance expenditure $Cost_{main}$ as determined by a total cost of all maintenance expenditures over optimization period 1506. In some embodiments, maintenance expenditure difference 1514 can be represented as a variable $J_{gap}$. In general, maintenance expenditure difference 1514 can be calculated similar to and/or the same as a maintenance expenditure difference calculated by objective function optimizer 940 described above with reference to FIG. 14A. In some embodiments, if $J_{gap}<0$ (i.e., the final value of the cumulative maintenance expenditure is greater than maximum maintenance budget 1504), objective function optimizer will have to determine a new solution to the objective function J as the hard budgetary constraint was exceeded.

Figure 16:
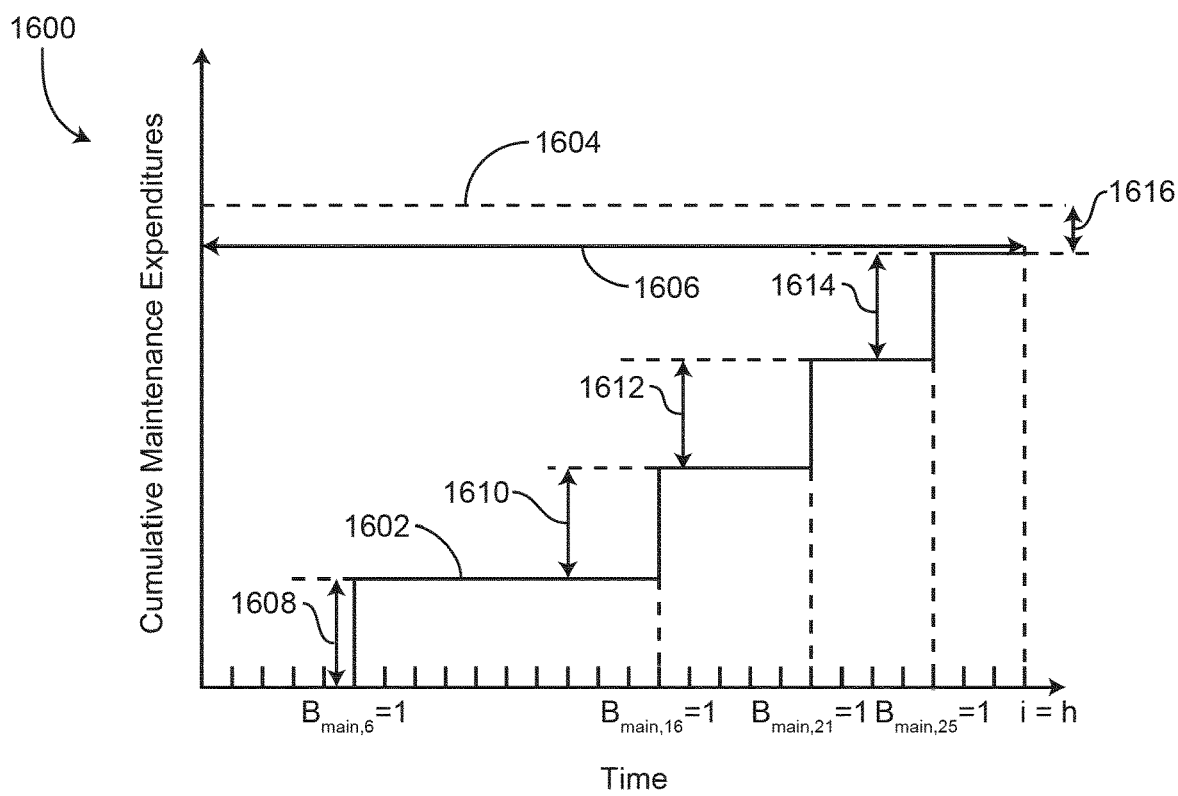
FIG. 16 is a graph illustrating cumulative maintenance expenditures over an optimization period while under a soft budgetary constraint, according to some embodiments.

Referring now to FIG. 16, a graph 1600 illustrating cumulative maintenance expenditures over an optimization period while under a soft budgetary constraint is shown, according to an exemplary embodiment. In some embodiments, capital purchases over an optimization period while under a soft budgetary constraint can be illustrated similar to and/or the same as the maintenance expenditures described herein. In some embodiments, the soft budgetary constraint may be a penalty cost, such that the penalty cost is determined based on a difference between a maximum maintenance budget 1604 and an estimated maintenance expenditure, similar to and/or the same as the penalty cost calculated with reference to FIG. 14A. In some embodiments, some and/or all of graph 1600 may be similar to and/or the same as graph 1500 described with reference to FIG. 15.

Graph 1600 is shown to include a maximum maintenance budget 1604, according to some embodiments. In some embodiments, maximum maintenance budget 1604 may be similar to and/or the same as maximum maintenance budget 1504 described with reference to FIG. 15. Graph 1600 is also shown to include an optimization period 1606, according to some embodiments. In some embodiments, optimization period 1606 is similar to and/or the same as optimization period 1506 described with reference to FIG. 15. Graph 1600 is also shown to include a first maintenance expenditure 1608, a second maintenance expenditure 1610, and a third maintenance expenditure 1612, according to some embodiments. In some embodiments, first maintenance expenditure 1608, second maintenance expenditure 1610, and third maintenance expenditure 1612 are similar to and/or the same as first maintenance expenditure 1508, second maintenance expenditure 1510, and third maintenance expenditure 1512 described above with reference to FIG. 15 respectively. Graph 1600 is also shown to include a time interval 1602, such that time interval 1602 may be similar to and/or the same as time interval 1502 described with reference to FIG. 15, according to some embodiments.

In some embodiments, graph 1600 differs from graph 1500 described with reference to FIG. 15 because of the soft budgetary constraint being used rather than a hard budgetary constraint. In some embodiments, graph 1600 is shown to include a fourth maintenance expenditure 1614 that occurs at time step 25. In some embodiments, fourth maintenance expenditure 1614 may be an additional maintenance expenditure to minimize a maintenance expenditure difference 1616. In some embodiments, maintenance expenditure difference 1616 may be calculated similar to and/or the same as maintenance expenditure difference 1514 described with reference to FIG. 15 (i.e., maximum maintenance budget 1604 minus a summation of each maintenance expenditure over optimization period 1606). In some embodiments, fourth maintenance expenditure 1614 may be performed to minimize maintenance expenditure difference 1616 due to the soft budgetary constraint. In some embodiments, the penalty cost defined by the soft budgetary constraint increases as maintenance expenditure difference 1616 increases. Based on a penalty cost term provided by penalty cost manager 944, the penalty cost can be calculated. In some embodiments, objective function optimizer 940 may optimize the objective function J as to minimize the penalty cost (i.e., by reducing maintenance expenditure difference 1616). In some embodiments, the penalty cost can be a multiple of maintenance expenditure difference 1616. For example, if all maintenance expenditures over optimization period 1606 exceed maximum maintenance budget 1604, there may be a triple penalty. For instance, if maximum maintenance budget 1604 were exceeded by $100, then an additional penalty cost of $300 may be incurred. Based on the soft budgetary constraint, objective function optimizer 940 can optimize the objective function J by adding additional maintenance expenditures to minimize maintenance expenditure difference 1616 as to lower the penalty cost, according to some embodiments. For example, fourth maintenance expenditure 1614 at time step 25 may not have normally been performed without the soft budgetary constraint. However, in order to optimize objective function J, objective function optimizer 940 can determine that the additional cost incurred through fourth maintenance expenditure 1614 minimizes objective function J by decreasing the penalty cost.

In some embodiments, the soft budgetary constraint may be implemented in order to encourage most and/or all of maximum maintenance budget 1604 to be spent. For example, a maintenance budget may allocate $15,000 for maintenance over optimization period 1606. As such, the amount not spent from maximum maintenance budget 1604 after optimization period 1606 is effectively lost from a maintenance perspective. Thus, if a user desires to exhaust the maximum maintenance budget 1604, the penalty cost term can facilitate in determining an optimal solution of objective function J that corresponds to a maximum amount of maximum maintenance budget 1604 being spent, according to some embodiments. Graph 1900 described with reference to FIG. 19A further illustrates how the soft budgetary constraint can be imposed on the objective function J.

Figure 17:
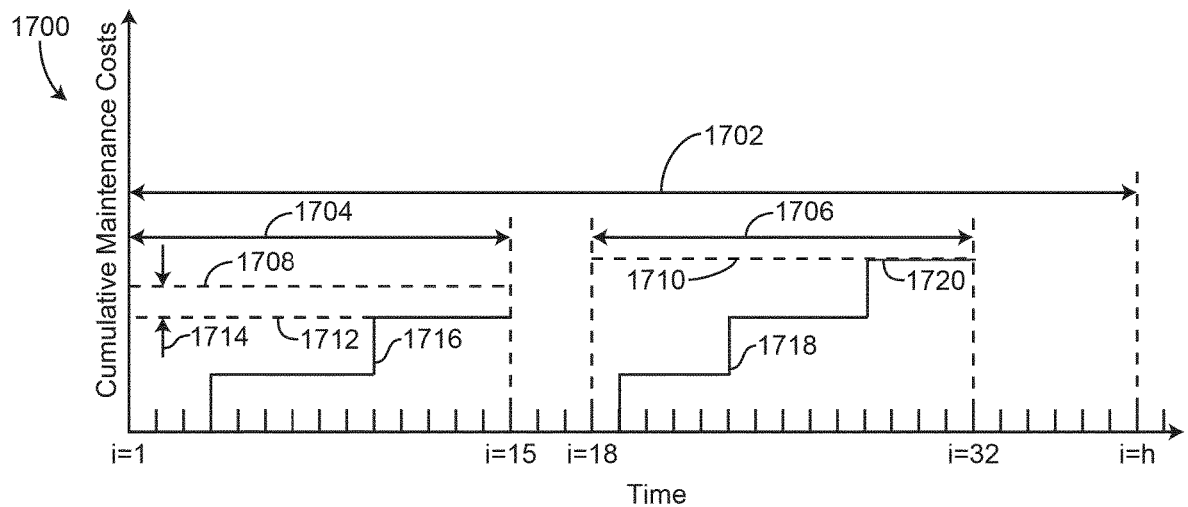
FIG. 17 is a graph illustrating cumulative maintenance costs over an optimization period with multiple budget periods, according to some embodiments.

Referring now to FIG. 17 a graph 1700 illustrating cumulative maintenance costs for an optimization period spanning multiple maintenance budget time periods is shown, according to some embodiments. In some embodiments, cumulative capital purchase costs for an optimization period spanning multiple capital purchase time periods can be illustrated similar to and/or the same as cumulative maintenance costs are in graph 1700. In some embodiments, optimization period 1702 may be longer than individual maintenance budget time periods for a building management system (BMS). When more than one maintenance budget time period falls within optimization period 1702, the objective function J generated by objective function generator 935 may need to be optimized by objective function optimizer 940 in such a way as to optimize (e.g., minimize) the objective function J such that a cumulative maintenance expenditure for each maintenance budget time period does not exceed a maximum maintenance budget for the maintenance budget time period, according to some embodiments.

Graph 1700 is shown to include a first maintenance budget time period 1704 from time step 1 to time step 15 and a second maintenance budget time period 1706 from time step 18 to time step 32, according to some embodiments. In some embodiments, first maintenance budget time period 1704 has a first maximum maintenance budget 1708. In some embodiments, second maintenance budget time period 1706 has a second maximum maintenance budget 1710. In some embodiments, first maximum maintenance budget 1708 is greater than or less than second maximum maintenance budget 1710. In some embodiments, first maximum maintenance budget 1708 is equal to second maximum maintenance budget 1710.

First maintenance budget time period 1704 includes a first series 1716, according to some embodiments. In some embodiments, first series 1716 represents a series of maintenance expenditures over first maintenance budget time period 1704. First series 1716 shows a first maintenance expenditure occurring at time step 4 and a second maintenance expenditure occurring at time step 10, according to some embodiments. Likewise, second maintenance budget time period 1706 includes a second series 1718, according to some embodiments. In some embodiments, second series 1718 represents a series of maintenance expenditures over second maintenance budget time period 1706. Second series 1718 shows three maintenance expenditures occurring at time steps 19, 23, and 28, according to some embodiments. In some embodiments, a total maintenance expenditure can be calculated for either first maintenance budget time period 1704 and/or second maintenance budget time period 1706 by objective function optimizer 940 through the equation for calculating $Cost_{act,j}$ described above with reference to FIG. 14A.

In some embodiments, $Cost_{main,1}$ indicates a first total maintenance expenditure 1712 for first maintenance budget time period 1704. In some embodiments, first total maintenance expenditure 1712 may be different than first maximum maintenance budget 1708, which indicates that a first maintenance expenditure difference 1714 is non-zero. In some embodiments, first maintenance expenditure difference 1714 can be calculated similar to and/or the same as a maintenance expenditure difference described with reference to FIG. 14A. In some embodiments, if a soft budgetary constraint similar to and/or the same as the soft budgetary constraint described with reference to FIG. 16 is applied, a penalty cost may be incurred based on how large first maintenance expenditure difference 1714 is.

In some embodiments, $Cost_{main,2}$ indicates a second total maintenance expenditure 1720. In some embodiments, second total maintenance expenditure 1720 may be equal to second maximum maintenance budget 1710. In some embodiments, if a soft budgetary constraint is applied and second total maintenance expenditure 1720 is equal to second maximum maintenance budget 1710, there may be no penalty cost incurred. In some embodiments, if a soft budgetary constraint is applied and second total maintenance expenditure 1720 is not equal to second maximum maintenance budget 1710, a penalty cost may be incurred.

Still referring to FIG. 17, the objective function J may need to be optimized by objective function optimizer 940 in such a way as to optimize over the entire duration of optimization period 1702 while adhering to budgetary constraints of both first maintenance budget time period 1704 and second maintenance budget time period 1706. For example, the maximum budget vector $Bud_{max}$ for graph 1700 may then be a 2×1 vector with the following form:

$$Bud_{max} = \begin{bmatrix} Bud_{max_1} \\ Bud_{max_2} \end{bmatrix}$$

where $Bud_{max_1}$ can define first maximum maintenance budget 1708 and $Bud_{max_2}$ can define second maximum maintenance budget 1710. In some embodiments, objective function optimizer 940 can utilize the maximum budget vector $Bud_{max}$ when determining an optimal value of the objective function J. In some embodiments, when determining the optimal value of the objective function J, objective function optimizer 940 will adhere to the maximum budget constraint defined above with reference to FIG. 14A. In some embodiments, by adhering to the maximum budget constraint, the objective function J can be optimized without exceeding a maximum maintenance budget for any maintenance budget time period in optimization period 1702.

In some embodiments, there may be time steps during optimization period 1702 that do not occur during any maintenance budget time period (e.g., time steps 14 to 17 and 31 to h of graph 1700). In some embodiments, the objective function J may have a hard budgetary constraint for each time step that does not occur during any maintenance budget time period, such that the hard budgetary constraint can indicate that no costs may be incurred towards maintenance during said time steps. Based on the hard budgetary constraint, for each time step that does not occur during a maintenance budget time period, objective function optimizer 940 may set $Mask_{j,i}=0$ to indicate time step i does not occur during maintenance budget time period j. In some embodiments, all values in a column of Mask can be 0, indicating that a time step associated with the column does not occur during any maintenance budget time period. For example, Mask may have the values:

$$\begin{bmatrix} 1 & 1 & 0 & 0 & 0 \\ 0 & 0 & 0 & 1 & 1 \end{bmatrix}$$

where a third column is all 0's. In some embodiments, the third column being all 0's can indicate that neither a maintenance budget time period 1 or a maintenance budget time period 2 occur during time step 3.

Referring now to FIG. 18, a graph 1800 illustrating cumulative maintenance costs over an optimization period 1802 with maintenance budget time periods occurring partially outside optimization period 1802 is shown, according to some embodiments. In some embodiments, cumulative capital purchase costs over an optimization period with capital purchase time periods occurring partially outside the optimization period can be illustrated similar to and/or the same as graph 1800 is for cumulative maintenance costs. In graph 1800, a first maintenance budget time period 1804 is shown to begin before optimization period 1802 begins, according to some embodiments. Further, a second maintenance budget time period 1806 is shown to occur during optimization period 1802, while a third maintenance budget time period 1816 is shown to begin during optimization period 1802 and continue after optimization period 1802 ends, according to some embodiments.

First maintenance budget time period 1804 is shown to include a first series of maintenance expenditures 1810, according to some embodiments. As shown in graph 1800, a first maintenance expenditure was made before the beginning (i.e., time step 1) of optimization period 1802, according to some embodiments. In some embodiments, budget manager 942 described with reference to FIG. 14A may receive hard budgetary constraints regarding first maintenance budget time period 1804. The hard budgetary constraints regarding first maintenance budget time period 1804 may include a first timespan describing a time period when first maintenance budget time period 1804 occurs, a first maximum maintenance budget 1808 describing a maximum amount that may be spent on maintenance during first maintenance budget time period 1804, and an initial expenditure describing how much has been spent on maintenance during first maintenance budget time period 1804 prior to optimization period 1802 beginning (i.e., before time step 1). Based on the initial expenditure and other hard budgetary constraints, objective function optimizer 940 described with reference to FIG. 14A may optimize (i.e., minimize) the objective function/generated by objective function generator 935 in such a way as to determine an optimal solution for the objective function J that will not result in the first maximum maintenance budget 1808 being exceeded, according to some embodiments. In some embodiments, may reduce the first maximum maintenance budget 1808 by the initial expenditure to simplify optimization of the objective function J. In some embodiments, maximum maintenance budget 1808 may be a soft budgetary constraint associated with a penalty cost, in which case objective function optimizer 940 may exceed maximum maintenance budget 1808 and incur a penalty cost in order to lower a cumulative cost over the entire optimization period 1802.

Graph 1800 is also shown to include second maintenance budget time period 1806 which is shown to include a second series of maintenance expenditures 1814 and a second maximum maintenance budget 1812, according to some embodiments. In some embodiments, second maintenance budget time period 1806 may be optimized by objective function optimizer 940 in a manner similar to and/or the same as second maintenance budget time period 1706 described with reference to FIG. 17.

Graph 1800 is also shown to include third maintenance budget time period 1816, such that third maintenance budget time period 1816 is shown to include a third maximum maintenance budget 1820 and a third set of maintenance expenditures 1818, according to some embodiments. Third maintenance budget time period 1816 is shown to begin during optimization period 1802, but continue after optimization period 1802 ends, according to some embodiments. In some embodiments, optimization of the objective function J may be configured to treat third maintenance budget time period 1816 as a shortened maintenance budget time period such that only the time steps of third maintenance budget time period 1816 occurring during optimization period 1802 are considered. During the shortened maintenance budget time period, decision variables can be optimized in such a way as to use some and/or all of third maximum maintenance budget 1820 before optimization period 1802 ends. In some other embodiments, optimization of the objective function J may be configured to consider time steps during third maintenance budget time period 1816 that occur after optimization period 1802 ends to not unduly complicate a next optimization period. In some embodiments, the objective function J can be constrained to use a portion of third maximum maintenance budget 1820 during optimization period 1802. For example, third maximum maintenance budget 1820 can be $10,000 during third maintenance budget time period 1816, but only a quarter of the time steps occurring during third maintenance budget time period 1816 may occur during optimization period 1802. The objective function J may then be constrained to only a predetermined percentage of third maximum maintenance budget 1820 that can be used during the time steps such that third maintenance budget time period 1816 and optimization period 1802 overlap. This can allow a remaining amount of third maximum maintenance budget 1820 to be used during the next optimization period. In some embodiments, when a maintenance budget time period occurs during a portion of optimization period 1802, an amount available of the maximum maintenance budget for the maintenance budget time period is directly proportional to how much of the maintenance budget time period occurs during the optimization period 1802 (e.g., if 50% of the maintenance budget time period occurs during optimization period 1802 then 50% of the maximum maintenance budget for the maintenance budget time period is available).

Figure 19A:
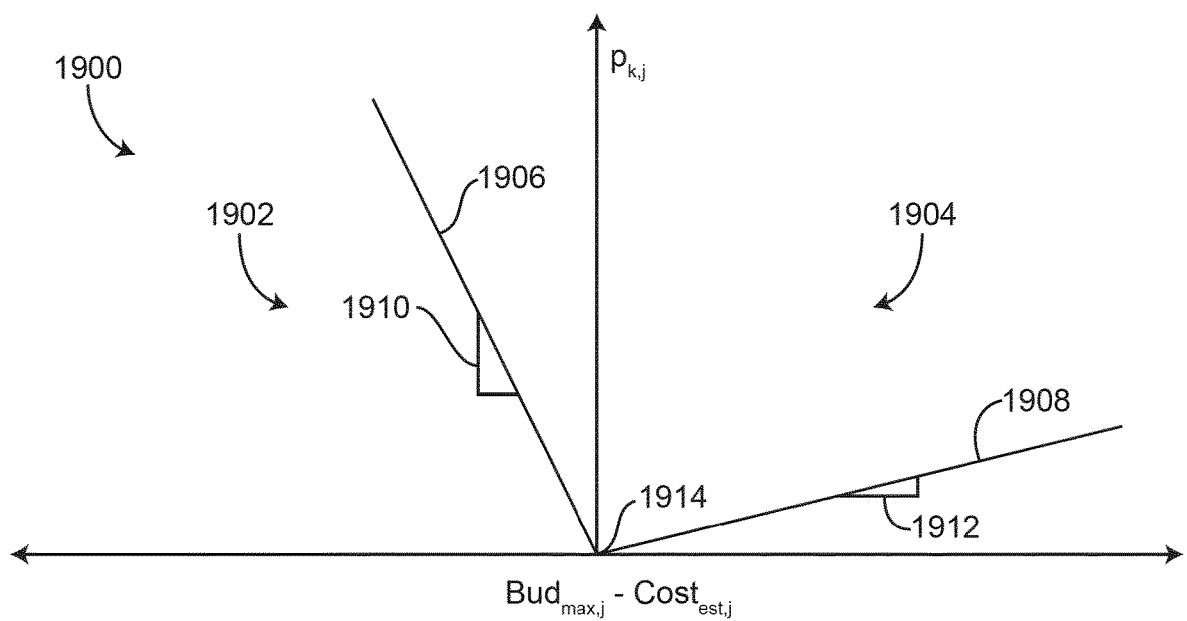
FIG. 19A is a graph illustrating a penalty cost as a function based on a maintenance budget minus an expected maintenance expenditure, according to some embodiments.

Referring now to FIG. 19A, a graph 1900 illustrating a penalty cost as a function based on a difference between maintenance budget and an estimated maintenance expenditure is shown, according to some embodiments. In some embodiments, penalty costs for capital purchases can be illustrated similar to and/or the same as graph 1900 is for maintenance costs. Graph 1900 is shown to include a positive portion 1904 such that the maintenance budget is greater than the estimated maintenance expenditure, according to some embodiments. Graph 1900 is also shown to include a negative portion 1902 such that the maintenance budget is less than the estimated maintenance expenditure, according to some embodiments. Further, graph 1900 is also shown to include an equilibrium point 1914 such that the maintenance budget is equal to the estimated maintenance expenditure, according to some embodiments. Graph 1900 is also shown to include a slope 1910 and a slope 1912, according to some embodiments. In some embodiments, slope 1910 may describe the slope for $Bud_{max,j} - Cost_{est,j} < 0$ (i.e., A) in the piecewise function calculating $p_{k,j}$ as described with reference to FIG. 14A. In some embodiments, slope 1912 may describe the slope for $Bud_{max,j} - Cost_{est,j} > 0$ (i.e., B) in the piecewise function calculating $p_{k,j}$ as described with reference to FIG. 14A. In some embodiments, $Bud_{max,j}$ and $Cost_{est,j}$ as shown in graph 1900 may be similar to and/or the same as $Bud_{max,j}$ and $Cost_{est,j}$ described with reference to FIG. 14A. In some embodiments, objective function optimizer 940 may be able to determine values of decision variables that result in $Bud_{max,j}$ equaling $Cost_{est,j}$ shown as equilibrium point 1914, in which case no penalty cost may be incurred. In some embodiments, as the penalty cost is decreased, the modified objective function $J_{mod}$ as described with reference to FIG. 14A is also decreased.

In some embodiments, graph 1900 may be for a single type of maintenance in a maintenance budget time period. In some embodiments, an overall maintenance budget for the maintenance budget time period can be broken down into smaller maintenance budgets for specific maintenance projects. For example, the overall maintenance budget over the maintenance budget time period may be $20,000, such that $5,000 can be allocated towards heating, ventilation, and air conditioning (HVAC) maintenance, $5,000 can be allocated towards window maintenance, and $10,000 can be allocated towards other maintenance. In the above example, each type of maintenance may incur a different penalty cost (i.e., the values of A and B may be different for each type of maintenance) for the estimated maintenance expenditure of the specific maintenance project exceeding or falling below the maintenance budget for the specific maintenance project in the maintenance budget time period. Objective function optimizer 940 can then determine values of decision variables that optimize objective function J that is constrained by an overall value of all penalty costs incurred for each type of maintenance. In some embodiments, the overall maintenance budget over the maintenance budget time period may have a hard budgetary constraint such that the overall maintenance budget is not be exceeded, but the maintenance for each type of maintenance can be exceeded so long as the overall maintenance budget is not exceeded. In this case, objective function optimizer 940 may determine decision variables that exceed the maintenance budget for a specific maintenance project if the objective function J can be further optimized based on those determinations.

If slope 1910 is different than slope 1912, graph 1900 may represent an asymmetrical budget constraint such that a penalty cost associated with spending more than a maximum budget is penalized differently than spending less than the maximum budget. However, if slope 1910 is the same as slope 1912, graph 1900 may represent a symmetrical budget constraint such that spending more than the maximum budget is penalized the same as spending less than the maximum budget.

Figure 19B:
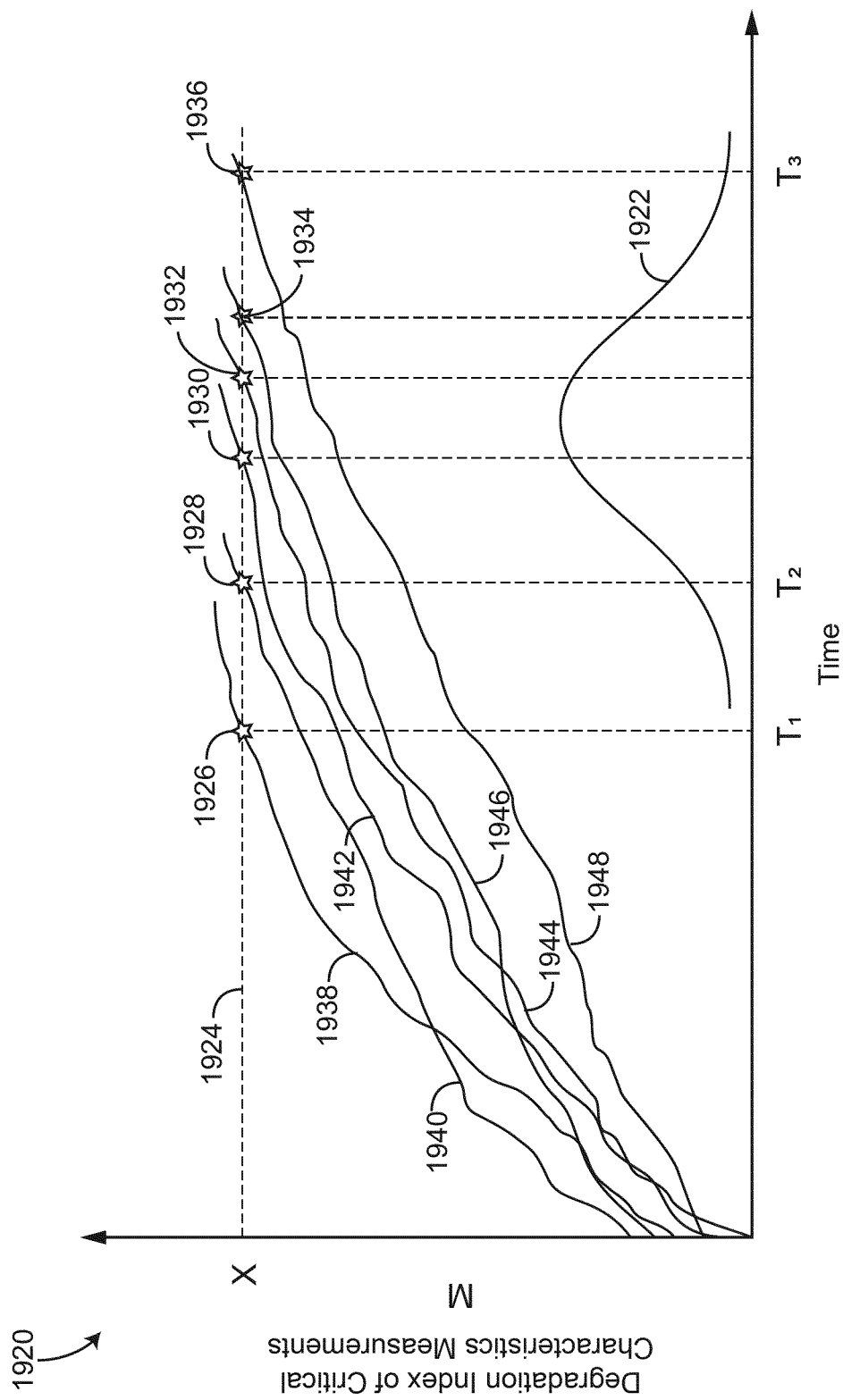
FIG. 19B is a graph illustrating a probability of failure distribution of building equipment based on degradation of the building equipment, according to some embodiments.

Referring now to FIG. 19B, a graph 1920 illustrating a probability of failure distribution of building equipment based on degradation of the building equipment is shown, according to some embodiments. Graph 1920 is shown to include a distribution 1922. Distribution 1922 can indicate a probability of failure of a building device of the building equipment. Based on distribution 1922, the probability of failure of the building device can be determined for various times during an optimization period. For example, distribution 1922 can indicate that a probability of failure of the building device is a smaller value at time $T_1$ in comparison to time $T_2$. Similarly, at time $T_n$ the probability of failure of the building device is shown to be larger than at times $T_1$ and $T_2$. It should be appreciated that while distribution 1922 is shown to follow a standard distribution, distribution 1922 can be any probability distribution depending on how degradation of the building device affects a probability of failure.

Graph 1920 is also shown to include a threshold value X, shown as a threshold value 1924, and multiple critical points 1926-1936. Graph 1920 is also shown to include multiple series 1938-1948 indicating degradation index values of certain characteristics of the building device over time. At each critical points 1926-1936, one of series 1938-1948 is shown to equal an associated point of critical points 1926-1936. For example, series 1938 is shown to equal critical point 1926 at time $T_1$. As shown in graph 1920, a series exceeding threshold value 1924 can indicate that some aspect/component/etc. of the building device has exceeded some critical value. For example, if the building device is a fan and series 1940 indicates a number of rotations of said fan, threshold value 1924 may be a number of rotations the fan is estimated to perform without issue (e.g., as indicated by a company that produced the fan). In some embodiments, each of series 1938-1948 has a unique threshold value 1924. For example, if the building device is a fan, threshold value

1924 for series 1938 may be a number of rotations if series 1938 indicates a number of rotations of the fan, whereas threshold value 1924 for series 1942 may be an amount of time the fan has been operated since installation.

As each of series 1938-1948 approach and/or exceed threshold value 1924, the probability of failure of the device may increase as indicated by distribution 1922. As more of series 1938-1948 exceed threshold value 1924 at critical values 1926-1936, the probability of failure indicated by distribution 1922 is shown to increase. For example, probability of failure as indicated by distribution 1922 is shown to be low (e.g., <30%) even after series 1938 and series 1940 exceed threshold value 1924 at times $T_1$ and $T_2$. However, by a time at which series 1948 exceeds threshold value 1924 at time $T_n$, the probability of failure of the building device is shown to be large (e.g., >90%). If a risk cost term is included in the objective function J, objective function optimizer 940 can utilize distribution 1922 to estimate how probability of failure of building equipment will vary over a time period and can determine an impact of the risk cost term on results of optimization of the objective function J. Objective function optimizer 940 can utilize distribution 1922 in combination with an estimated failure cost to determine a value of the risk cost term at different time steps over an optimization period.

Figure 19C:
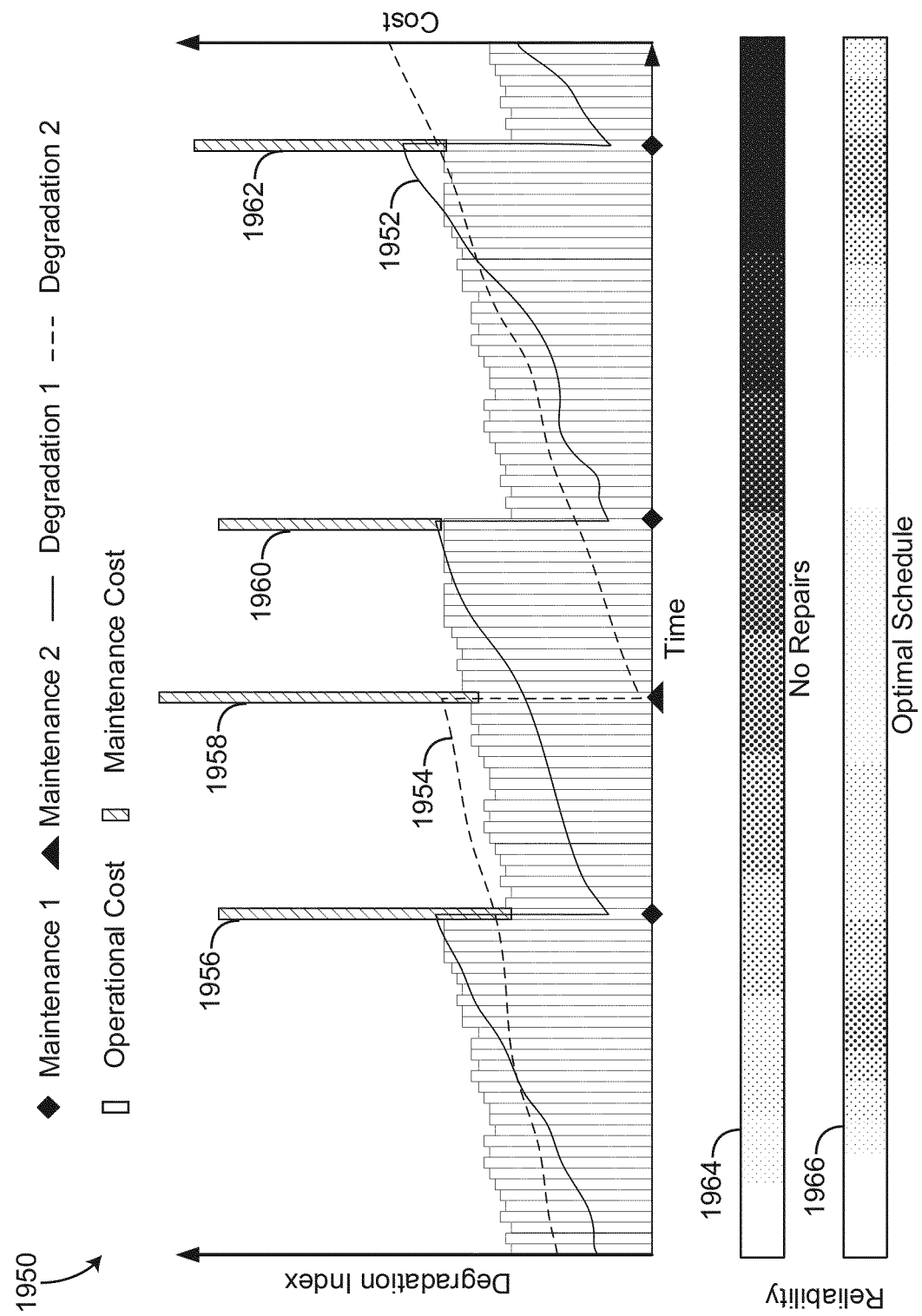
FIG. 19C is a graph illustrating how total costs are affected based on maintenance performed to reduce degradation of building equipment, according to some embodiments.

Referring now to FIG. 19C a graph 1950 illustrating how total costs are affected based on maintenance performed to reduce degradation of building equipment, according to some embodiments. It should be appreciated that while graph 1950 includes maintenance activities, any type of repair activity (e.g., replacement, maintenance, etc.) may have similar effects. Graph 1950 is shown to include a series 1952 and a series 1954. Series 1952 and series 1954 can illustrate degradation index values of various building devices over a time period. For example, series 1952 can illustrate degradation index values of a heater over the time period, whereas series 1954 can illustrate degradation index values of an IDU over the time period. In some embodiments, series 1952 and series 1954 indicate degradation index values of different components of a single building device. For example, series 1952 can indicate degradation index values of a condenser coil of an ODU whereas series 1954 can indicate degradation index values of a fan of the ODU.

As values of series 1952 and series 1954 increase, operational costs may increase due to decreased efficiency of associated components. For example, if series 1952 illustrates degradation index values of an AHU, operational costs related to operating the AHU may increase due to efficiency degradation of heating/cooling coils of the AHU, a fan of the AHU, etc.

If no maintenance/replacement is performed, series 1952 and series 1954 may continue to increase until they exceed a failure threshold such that components associated with series 1952 and series 1954 are considered to have failed. Failure of components can be measured by various states such as, for example, an inability for the components to activate/turn on, the components consuming a certain amount of energy more than optimal energy consumption, a reliability of the components being below some threshold value, etc. To reduce values of series 1952 and series 1954, maintenance can be performed on the building equipment to improve efficiency of the building equipment. As shown in graph 1950, maintenance is shown to occur at maintenance times 1956-1962. In particular, components related to series 1952 are shown to receive maintenance at maintenance time 1956, maintenance time 1960, and maintenance time 1962 whereas components related to series 1954 are shown to receive maintenance at maintenance time 1958. As mentioned above, activities performed at maintenance times 1956-1962 are shown as maintenance activities for simplicity but can include any maintenance activities, replacement activities, and/or any other activities that can increase efficiency and/or reliability of building equipment.

At each of maintenance times 1956-1962, a maintenance cost is shown to be incurred. As mentioned above, as values of series 1952 and series 1954 increase, operational costs of operating components related to series 1952 and series 1954 increase as well. To reduce operational costs, maintenance can be performed to increase efficiency of the components, thereby reducing operational costs. However, performing maintenance may incurs a maintenance cost. As such, objective function optimizer 940 may need to determine when to perform maintenance such that maintenance costs are not larger than reductions in operational costs. In some embodiments, if a risk cost term is incorporated in the objective function J, performing maintenance to reduce impact of the risk cost term may further optimize the objective function J even if the cost of maintenance is larger than a reduction in operational costs.

FIG. 19C is also shown to include a reliability gradient 1964 and a reliability gradient 1966. Reliability gradient 1964 can indicate how reliability of building equipment changes over time if no repairs (e.g., maintenance, replacement, etc.) are performed. Particularly, as time progresses, reliability gradient 1964 is shown to become darker, indicating that reliability of building equipment is deteriorating. Each repair activity performed on building equipment can improve reliability of the building equipment, thereby reducing a probability of failure of the building equipment. For example, repairing wiring of electrical equipment can increase reliability of the electrical equipment by ensuring electrical connections are stable. In some embodiments, if no repairs are performed, reliability of the building equipment cannot improve and continues to deteriorate until the building equipment fails.

Reliability gradient 1966 can illustrate how reliability changes over time if an optimal repair schedule is implemented. The optimal repair schedule can include maintenance activities, replacement activities, and/or other activities that can increase reliability of building equipment. The optimal repair schedule can indicate optimal times to perform repairs to ensure reliability of the building equipment is maintained. As shown in reliability gradient 1966, the reliability of the building equipment is maintained over time as compared to reliability gradient 1964 in which no repairs are performed.

The optimal repair schedule can be determined via optimization of a cost function (e.g., the objective function J) to determine what repairs should be performed and when to perform said repairs. As each repair has some associated cost (e.g., a maintenance cost), the optimization may be required to determine optimal repair times to optimize (e.g., reduce) costs and ensure reliability of the building equipment is maintained. If a risk cost term is incorporated in the cost function, the risk cost term may affect what/when repairs are performed on the building equipment as to maintain a high level of reliability, thereby reducing an impact of the risk cost term on the cost function.

Model Predictive Maintenance Processes

Figure 20:
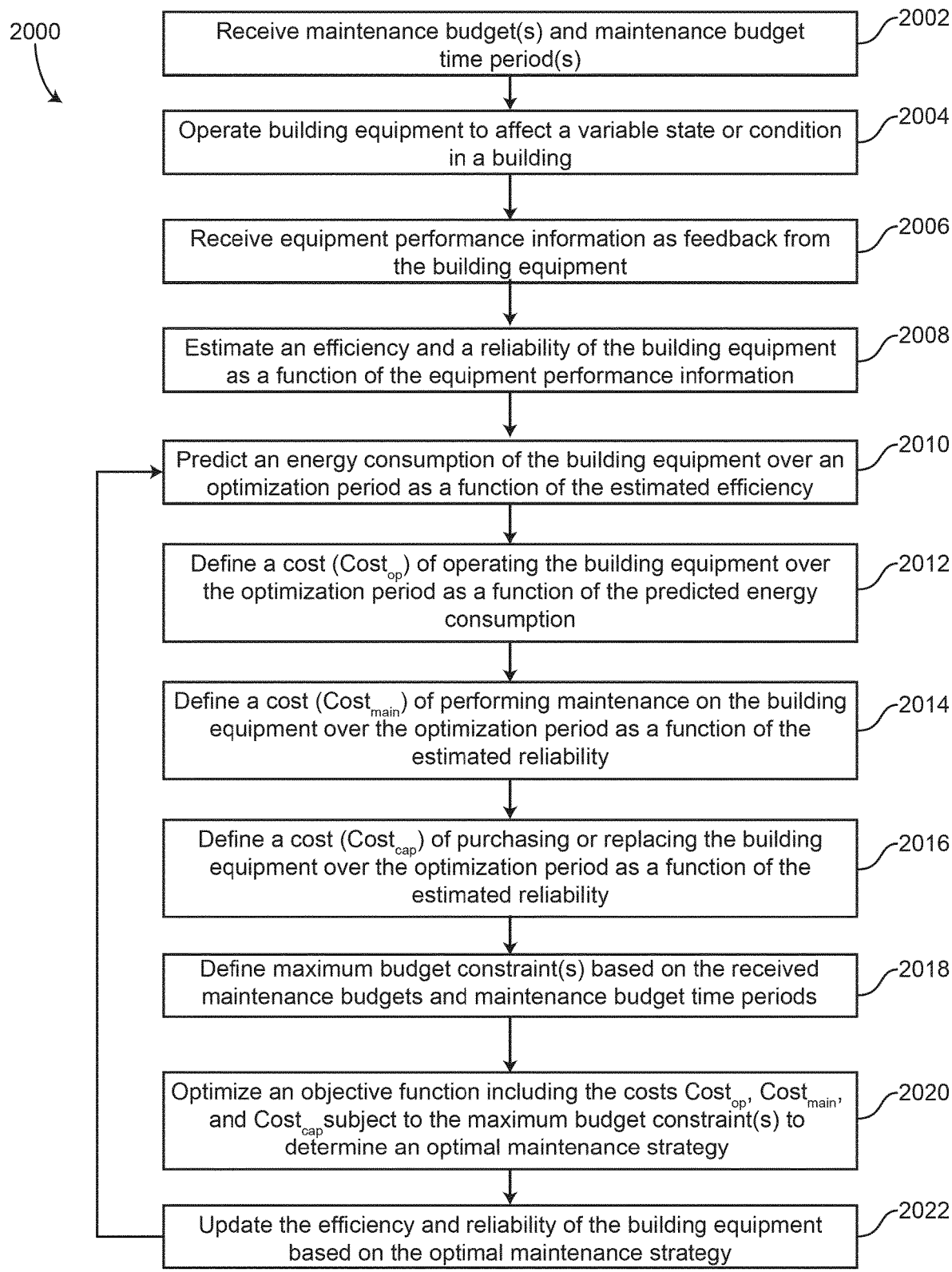
FIG. 20 is a flowchart of a process for operating the MPM system of FIG. 13 subject to one or more hard budgetary constraints, according to some embodiments.

Referring now to FIG. 20, a flowchart of a process 2000 for operating model predicative maintenance (MPM) system 602 described with reference to FIG. 13 subject to hard budgetary constraints is shown, according to some embodiments. In some embodiments, process 2000 can be applied similarly to and/or the same to capital purchases as it is shown to maintenance costs. In some embodiments, process 2000 can be performed by components of building system 600. In some embodiments, process 2000 can be performed by MPM system 602, as described in greater detail above with reference to FIGS. 6-9. In some embodiments, process 2000 may be similar to and/or the same as process 1000 described with reference to FIG. 10.

Process 2000 includes receiving, via MPM system 602, maintenance budgets and maintenance budget time periods for each maintenance budget (step 2002), according to some embodiments. In some embodiments, a maintenance budget time period may be a period of time that the maintenance budget time period occurs during. The period of time in which the maintenance budget time period occurs may occur entirely within, partially within, or not at all within an optimization period of an optimal maintenance strategy, according to some embodiments. In some embodiments, a maintenance budget for a maintenance budget time period may be a hard budgetary constraint that indicates an amount spent on maintenance during the maintenance budget time period should not exceed the maintenance budget. For example, if the maintenance budget is $10,000, no more than $10,000 may be spent on maintenance over the maintenance budget time period. In some embodiments, budget manager 942 described with reference to FIG. 14A can be configured to perform step 2002.

Process 2000 is also shown to include operating building equipment to affect a variable state or condition in a building (step 2004), according to some embodiments. In some embodiments, step 2004 through step 2016 may be similar to and/or the same as step 1002 through step 1014 described with reference to FIG. 10.

Process 2000 includes defining maximum budget constraints based on the received maintenance budgets and maintenance budget time periods (step 2018), according to some embodiments. In some embodiments, the maximum budget constraints can be a maximum amount (e.g., $) that can be spent on maintenance over an optimization period. In some embodiments, a first maintenance budget time period and/or a last maintenance budget time period will occur during a portion of the optimization period. If the first maintenance budget time period occurs during a portion of the optimization period, a remaining budget (i.e., an amount not spent in a previous optimization period) can be used as a maximum budget constraint for the first maintenance budget time period, according to some embodiments. If the last maintenance budget time period occurs during a portion of the optimization period, the equation for $Bud_{reduced}$ described above with reference to FIG. 14A can be used by budget manager 942 to generate a maximum budget constraint based for the last maintenance budget time period, according to some embodiments. In some embodiments, budget manager 942 can be configured to perform step 2018.

Process 2000 includes the objective function J being optimized subject to the maximum budget constraint and/or the maximum maintenance budgets for the maintenance budget time periods (step 2020), according to some embodiments. In some embodiments, step 2020 may be similar to and/or the same as step 1016 described with reference to FIG. 10. In some embodiments, during optimization of the objective function J, the maximum budget constraint may prevent certain maintenance/replacement activities from being performed if the cost incurred by the maintenance/replacement activities would result in a total maintenance expenditure for the optimization period exceeding the maximum budget constraint. In some embodiments, the maximum budget constraint may only be used in step 2020 if the optimization period is a same period of time as a single maintenance budget time period (i.e., n=1 in step 2018). In some embodiments, when the optimization period is not the same period of time as the single maintenance budget time period (e.g., the single maintenance budget time period only occurs during a portion of the optimization period, there are two or more maintenance budget time periods that occur during the optimization period, etc.), the maximum budget constraint may not be used in step 2020, and instead the objective function J can be constrained subject to each maintenance budget for each maintenance budget time period received in step 2002. In this way, the objective function J can be optimized as to not exceed the maintenance budget for each maintenance budget time period. Depending on how the optimization problem is solved, the budgetary constraints may be implemented as states (e.g., a remaining budget) to be tracked over the optimization period, as additional terms on the objective function J, etc. In any case, step 2020 can ensure that the optimal maintenance strategy adheres to any budgetary constraints defined in step 2018. In some embodiments, objective function optimizer 940 can be configured to perform step 2020.

Process 2000 includes MPM system 602 updating efficiency and reliability of the building equipment based on the optimal maintenance strategy (step 2022), according to an exemplary embodiment. In some embodiments, step 2022 may be similar to and/or the same as step 1018 described with reference to FIG. 18. After completion of step 2022, process 2000 may return to step 2010.

Figure 21:
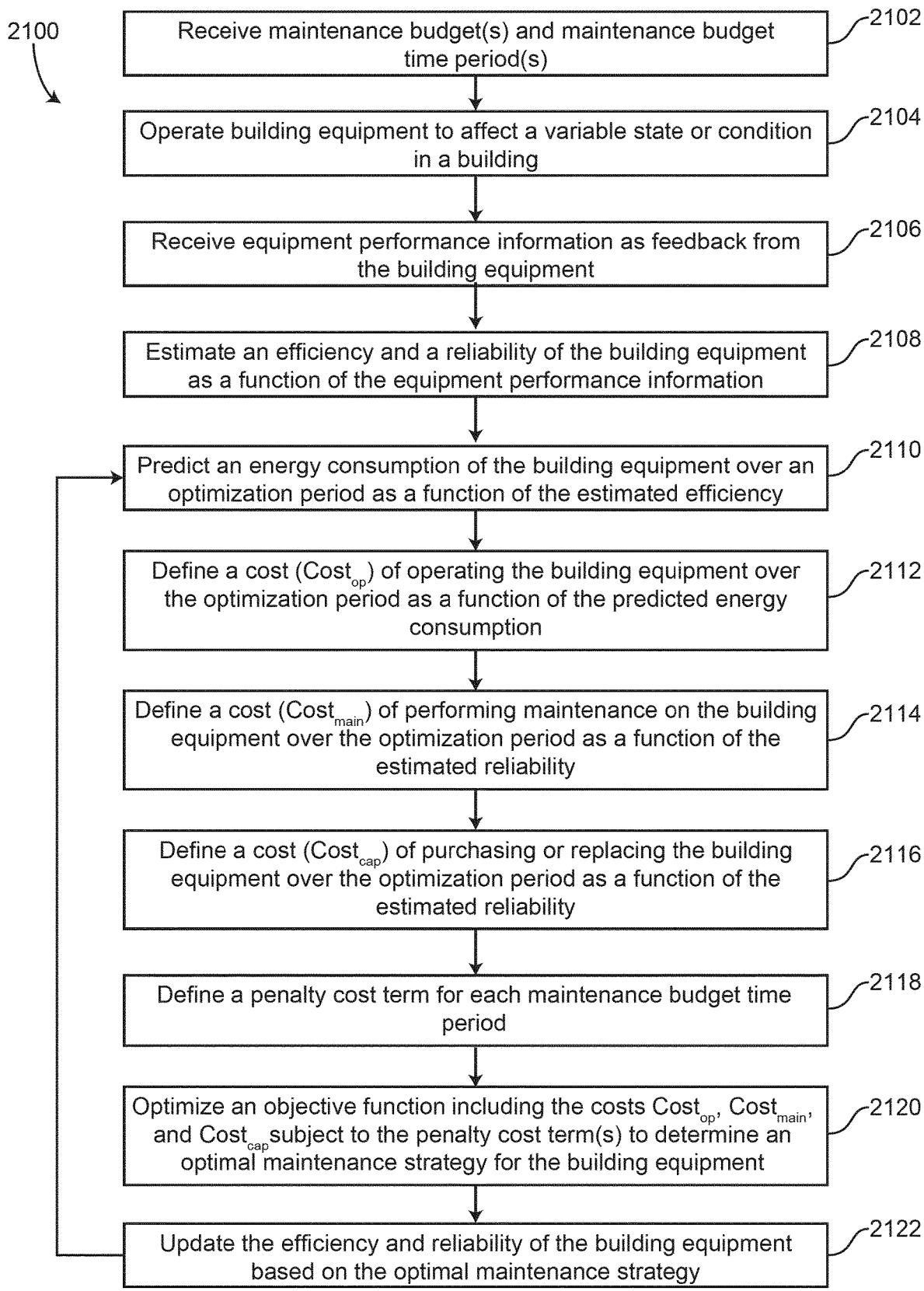
FIG. 21 is a flowchart of a process for operating the MPM system of FIG. 13 subject to a soft budgetary constraint, according to some embodiments.

Referring now to FIG. 21, a flowchart of a process 2100 performed by MPM system 602 described with reference to FIG. 13 subject to a soft budgetary constraint is shown, according to an exemplary embodiment. In some embodiments, process 2000 can be applied similarly to and/or the same to capital purchases as it is shown to maintenance costs. In some embodiments, process 2100 can be performed by components of building system 600. In some embodiments, process 2100 can be performed by MPM system 602, as described with reference to FIGS. 6-9. In some embodiments, process 2100 may be similar to and/or the same as process 2000 described with reference to FIG. 20. Further, step 2102 through step 2116 may be similar to and/or the same as step 2002 through step 2016 described with reference to FIG. 2000, according to some embodiments.

Process 2100 includes defining a penalty cost term for each maintenance budget time period based on a difference between a maximum maintenance budget and a total maintenance cost during a maintenance budget time period (step 2118), according to some embodiments. In some embodiments, a penalty cost term can be defined more each maintenance budget time period received in step 2102. Each penalty cost term constrain optimization of the objective function J such that as the difference between a maintenance budget and a total maintenance cost during a maintenance budget time period increases, a penalty cost associated to the maintenance budget time period can increase. In some embodiments, penalty cost manager 944 can be configured to perform step 2118.

Process 2100 includes the objective function J being optimized subject to each penalty cost term defined in step 2118 (step 2120), according to some embodiments. In some embodiments, an optimal maintenance strategy can be generated such that objective function J is optimized while adhering to each penalty cost. In some embodiments, some and/or all of the maintenance budget time periods may incur some penalty cost (i.e. $p_{k,j} \neq 0$ for the maintenance budget time period), but the penalty costs incurred may be small enough that objective function J is still optimized. In some embodiments, objective function optimizer 940 can be configured to perform step 2120.

Process 2100 includes MPM system 602 updating efficiency and reliability of the building equipment based on the optimal maintenance strategy (step 2122), according to an exemplary embodiment. In some embodiments, step 2122 may be similar to and/or the same as step 2022 described with reference to FIG. 20. After completion of step 2122, process 2100 may continue at step 2110.

Figure 22:
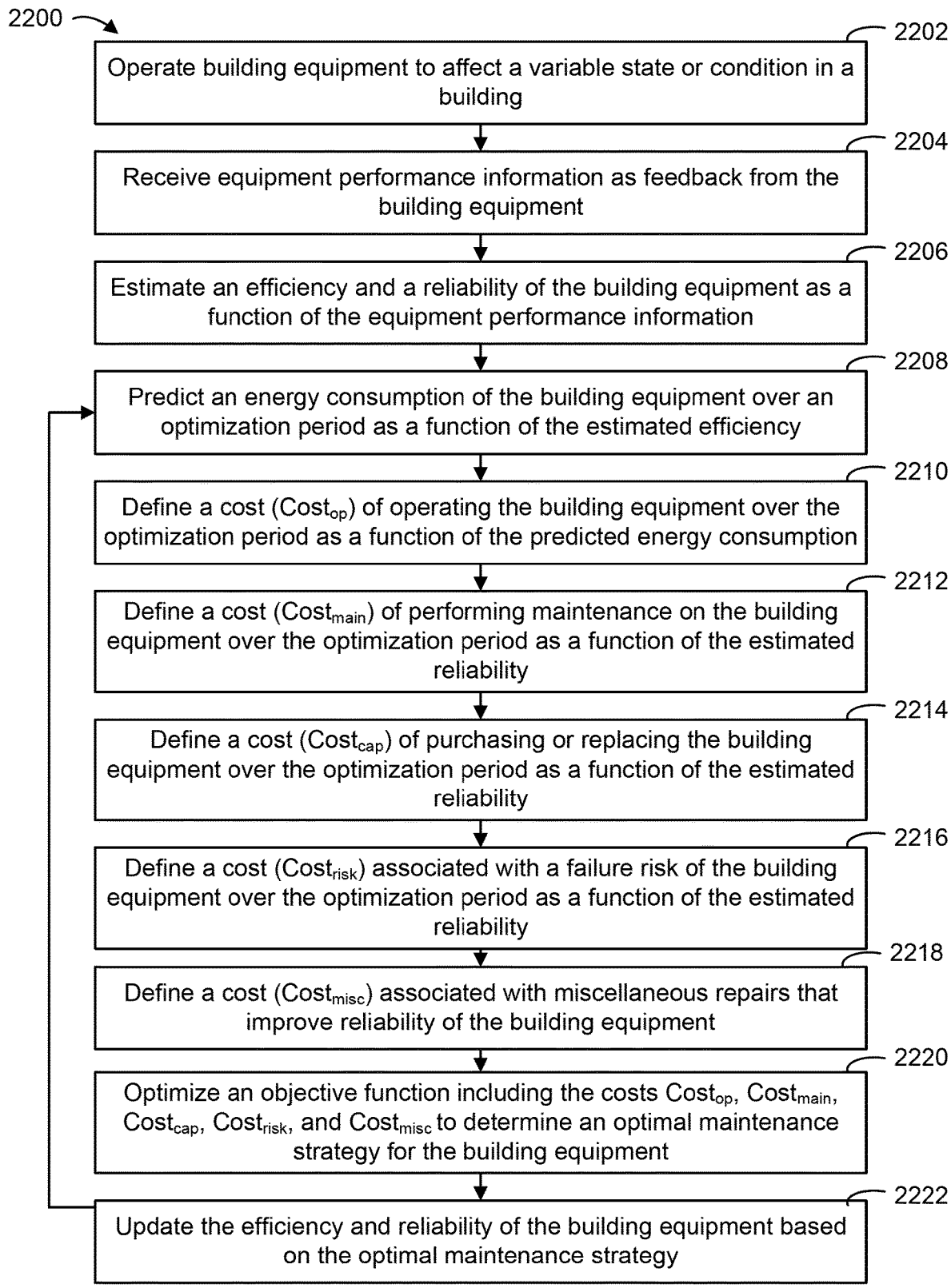
FIG. 22 is a flowchart of a process for operating the MPM system of FIG. 13 subject to a failure risk of building equipment, according to some embodiments.

Referring now to FIG. 22, a process 2200 for operating MPM system 602 as described with reference to FIG. 13 subject to a failure risk of building equipment is shown, according to some embodiments. By incorporating the failure risk of building equipment into MPM, a cost function (e.g., the objective function J) can optimize (e.g., reduce) costs that may be incurred due to building equipment failing. Incorporating failure risk can ensure that decisions regarding maintenance/replacement of building equipment reduce a chance of unexpected failure of the building equipment while optimizing costs. Unexpected failure of building equipment can result in additional costs such as performing maintenance/replacement of the building equipment to return the building equipment to operating condition, and also opportunity costs such as, for example, unmet load or missed production. In some embodiments, some and/or all steps of process 2200 are performed by MPM system 602.

Process 2200 is shown to include operating building equipment to affect a variable state or condition in a building (step 2202), according to some embodiments. In some embodiments, steps 2202-2214 are similar to and/or the same as steps 1002-1014 of process 1000 as described with reference to FIG. 10. In some embodiments, steps 2202-2214 are performed by MPM system 602.

Process 2200 is shown to include defining a cost $Cost_{risk}$ associated with a failure risk of the building equipment over the optimization period as a function of the estimated reliability (step 2216), according to some embodiments. $Cost_{risk}$ can be defined by a total of all risk costs $C_{risk,i}$ for each time step i of an optimization period. In some embodiments, step 2216 includes using the estimated reliability of the building equipment over the optimization period to determine a probability of failure of devices of the building equipment at each time step of the optimization period. Based on the probability of failure of devices, an impact of failure on total costs over the optimization can be estimated. To estimate the impact of failure on total costs, costs related to equipment failure can be determined. In particular, a cost to perform maintenance/replacement of building devices and/or opportunity costs related to failure of the building devices can be determined. Opportunity costs can include any costs beyond maintenance/replacement costs that are incurred due to failure of a building device. For example, if a heater of an HVAC system fails, a space where the heater is located may need to be temporarily closed down (e.g., for occupant safety). Closing the space may result in costs related to occupants renting other spaces, cancellation of valuable meetings, etc., all of which can result in additional costs and/or lost opportunities that can affect total costs of a building system over an optimization period.

Step 2216 can include determining the costs $C_{risk,i}$ associated with various risk costs (e.g., a total of maintenance/replacement costs and opportunity costs) at a time step i. Based on the equipment performance information and/or the estimated efficiency and reliability of building equipment determined/estimated in steps 2204 and 2206 respectively, a state of degradation can be estimated. As the estimated state of degradation increases, a probability of failure of building devices may also increase.

To estimate a state of degradation of all building devices, step 2216 can include, for example, comparing a current estimated reliability of each building device and an optimal reliability based on when each building device was originally installed. To determine a value of $C_{risk,i}$, step 2216 can also include estimating a failure cost associated with each building device at each time step i. In some embodiments, failure cost of a building device is estimated by users. In some embodiments, failure cost of a building device is estimated by a system (e.g., MPM system 602) based on various information such as, for example, a location of the building device, how the building device affects conditions of a space, etc.

Based on the probability of failure and a failure cost of each building device for a time step i, $C_{risk,i}$ can be determined by the following equation:

$$C_{risk,i} = C_{fail,i}{}^T P_{fail,i}(\delta_i)$$

where $P_{fail,i}(\delta_i)$ is a vector of probabilities of failure for each building device of the tracked building equipment on the state of degradation $\delta_i$, $C_{fail,i}$ matrix defining a cost of failure of each building devices. Further, a value of $Cost_{risk}$ (i.e., a total risk cost over an optimization period) can be determined by the following equation:

$$Cost_{risk} = \sum_{i=1}^{h} C_{fail,i}^T P_{fail,i}(\delta_i)$$

where h is a total number of time steps in the optimization period. In some embodiments, step 2216 is performed by failure risk predictor 946.

Process 2200 is shown to include defining a cost $Cost_{misc}$ associated with miscellaneous repairs that improve reliability of the building equipment (step 2218), according to some embodiments. Miscellaneous repairs provide an additional repair options to improve reliability of building equipment. In some embodiments, miscellaneous repairs improve reliability of the building equipment, but do not improve efficiency of the building equipment. Miscellaneous repairs can be particularly useful during the optimization described below in step 2220 to reduce an impact of $Cost_{risk}$ on the objective function. As $Cost_{risk}$ grows as reliability of the building equipment decreases, miscellaneous repairs to improve reliability may provide advantageous alternatives to maintenance and replacement activities defined by $Cost_{main}$ and $Cost_{cap}$. In some embodiments, miscellaneous repairs associated with $Cost_{main}$ are incorporated with $Cost_{main}$ and/or $Cost_{cap}$. In some embodiments, step 2218 is performed by miscellaneous cost predictor 948.

Process 2200 is shown to include optimizing an objective function including the costs $Cost_{op}$, $Cost_{main}$, $Cost_{cap}$, $Cost_{risk}$, and $Cost_{misc}$ to determine an optimal maintenance strategy for the building equipment (step 2220), according to some embodiments. In some embodiments, step 2220 is similar to and/or the same as step 1016 of process 1000 as described with reference to FIG. 10. It should be appreciated that the optimal maintenance strategy can include maintenance and/or replacement for building equipment. By incorporating $Cost_{risk}$ into the objective function, certain building devices of the building equipment may be prioritized for maintenance/replacement to ensure a probability of failure is kept low. To optimize (e.g., reduce) results of the objective function, building devices with a high opportunity cost associated with failure may be determined by the objective function to receive additional and/or more frequent maintenance/replacement to ensure a probability of failure of the building devices with the high opportunity cost is kept low (e.g., 1%, 5%, etc.).

If $Cost_{misc}$ is included in the objective function and/or miscellaneous repairs are included in $Cost_{main}$ and/or $Cost_{cap}$, optimization of the objective function may determine certain miscellaneous repairs should be performed to decrease an impact of $Cost_{risk}$ on the objective function. Each miscellaneous repair can increase an estimated reliability of an associated building device, thereby decreasing an impact of $Cost_{risk}$ for the associated building device. Advantageously, miscellaneous repairs may be less expensive than maintenance and/or replacement activities and as such can provide a more inexpensive alternative for reducing $Cost_{risk}$. In step 2220, the optimization can account for each repair activity defined by $Cost_{misc}$, $Cost_{main}$, and/or $Cost_{cap}$ to determine an optimal maintenance and replacement schedule that minimizes costs over an optimization period.

In some embodiments, the optimization is constrained by a risk aversion value. A risk aversion value can be set by a user and/or the system to indicate a maximum allowable probability of failure for certain building devices. For example, a user may set a risk aversion value of 20% for building devices with a failure cost equal to or greater than $1,000. Due to the risk aversion value, the optimization can determine an optimal maintenance and replacement schedule such that any building device with an estimated failure cost equal to or greater than $1,000 has a probability of failure of less than 20% throughout an optimization period. Effectively, a risk aversion value can place a constraint on the optimization such that decision variables related to maintenance and/or replacement of building equipment ensure probability of failure of certain building devices is kept below a particular value. In some embodiments, step 2220 is performed by objective function optimizer 940.

Process 2200 is shown to include updating the efficiency and reliability of the building equipment based on the optimal maintenance strategy (step 2222), according to some embodiments. In some embodiments, step 2222 is similar to and/or the same as step 1018 of process 1000 as described with reference to FIG. 10. In some embodiments, step 2222 is performed by MPM system 602.

Model Predictive Maintenance of a Variable Refrigerant Flow System

Figure 23A:
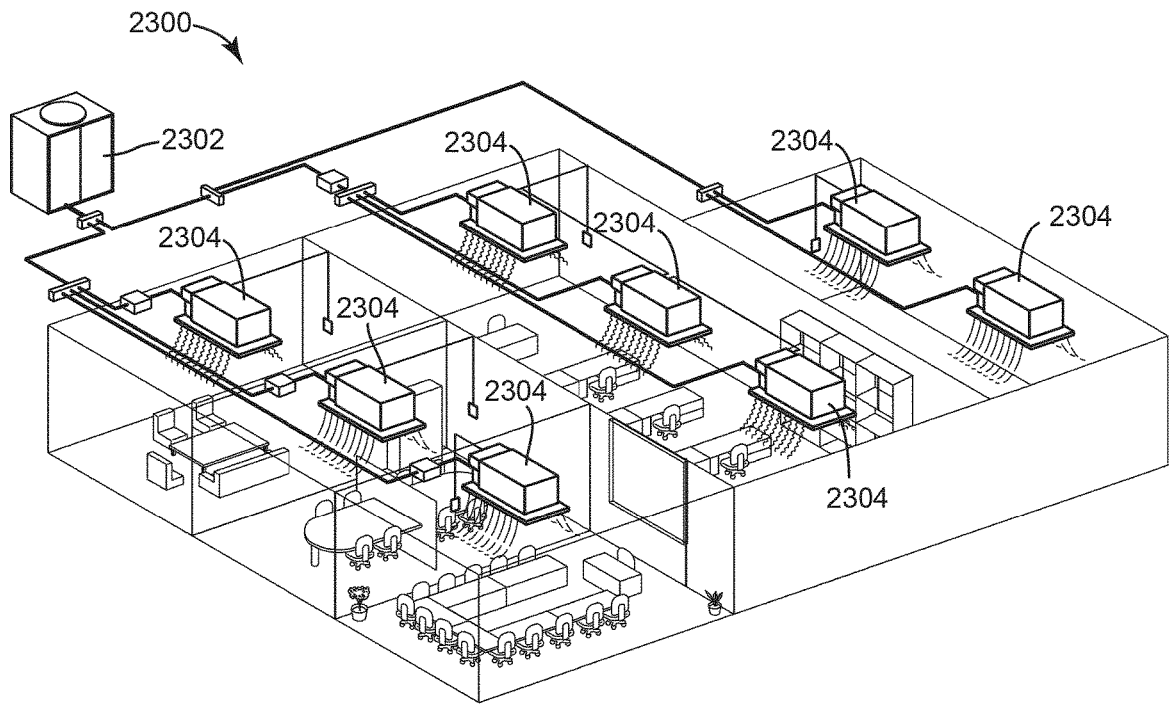
FIGS. 23A-23B are drawings of a variable refrigerant flow (VRF) system having one or more outdoor VRF units and a plurality of indoor VRF units, according to some embodiments.
Figure 23B:
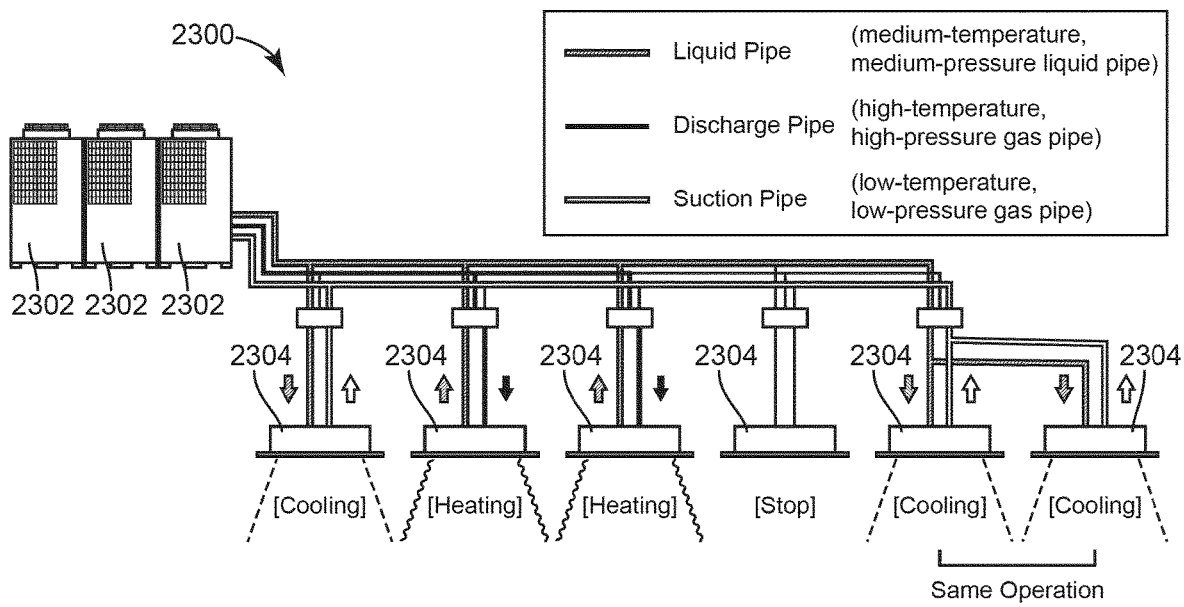

Referring now to FIGS. 23A-23B, a variable refrigerant flow (VRF) system 2300 is shown, according to some embodiments. VRF system 2300 is shown to include a plurality of outdoor VRF units 2302 and a plurality of indoor VRF units 2304. Outdoor VRF units 2302 can be located outside a building and can operate to heat or cool a refrigerant. Outdoor VRF units 2302 can consume electricity to convert refrigerant between liquid, gas, and/or super-heated gas phases. Indoor VRF units 2304 can be distributed throughout various building zones within a building and can receive the heated or cooled refrigerant from outdoor VRF units 2302. Each indoor VRF unit 2304 can provide temperature control for the particular building zone in which the indoor VRF unit is located.

A primary advantage of VRF systems is that some indoor VRF units 2304 can operate in a cooling mode while other indoor VRF units 2304 operate in a heating mode. For example, each of outdoor VRF units 2302 and indoor VRF units 2304 can operate in a heating mode, a cooling mode, or an off mode. Each building zone can be controlled independently and can have different temperature setpoints. In some embodiments, each building has up to three outdoor VRF units 2302 located outside the building (e.g., on a rooftop) and up to 128 indoor VRF units 2304 distributed throughout the building (e.g., in various building zones).

Many different configurations exist for VRF system 2300. In some embodiments, VRF system 2300 is a two-pipe system in which each outdoor VRF unit 2302 connects to a single refrigerant return line and a single refrigerant outlet line. In a two-pipe system, all of the outdoor VRF units 2302 operate in the same mode since only one of a heated or chilled refrigerant can be provided via the single refrigerant outlet line. In other embodiments, VRF system 2300 is a three-pipe system in which each outdoor VRF unit 2302 connects to a refrigerant return line, a hot refrigerant outlet line, and a cold refrigerant outlet line. In a three-pipe system, both heating and cooling can be provided simultaneously via dual refrigerant outlet lines.

In some embodiments, VRF system 2300 may be integrated with model predictive maintenance (MPM) system 602 described with reference to FIGS. 6-9. In some embodiments, MPM system 602 can be configured to determine an optimal maintenance strategy for VRF system 2300 and any/all components therein. In some embodiments, MPM system 602 can be configured to determine an optimal purchase/replacement strategy for VRF system 2300 and any/all components therein similar to and/or the same as the below.

In some embodiments, MPM system 602 can be configured to monitor some and/or all of the components of VRF system 2300 for each component's current state of degradation and usage estimations (e.g., load predictions and performance curves). For example, MPM system 602 may monitor each of the indoor VRF units 2304 and each of the outdoor VRF units 2302. Each of the VRF units may have a different current state of degradation due to various factors (e.g., when the VRF unit was installed, how often the VRF unit is used, what average level of power the VRF unit is run at, etc.). Based on the current state of degradation and usage estimations, MPM system 602 may be able to predict operational costs, maintenance costs, and/or capital costs. In some embodiments, these predictions are made through a process similar to and/or the same as process 1000 described with reference to FIG. 10.

In some embodiments, after the various costs above are predicted, the objective function J can be generated for an optimization period. After the objective function J is generated, MPM system 602 can be configured to optimize (i.e., minimize) the objective function J. In some embodiments, this optimization can determine optimal values of decision variables for each of the components of VRF system 2300. For example, one decision variable may indicate that an indoor VRF unit 2304 may need to have maintenance performed on it at a particular time step during the optimization period in response to a building zone not being cooled properly. Another decision variable may indicate that an outdoor VRF unit 2302 may need to be replaced (i.e., incurring a capital cost) at a particular time step in the optimization period in response to a detection that the outdoor VRF unit 2302 is consuming an additional 50% more power than when the outdoor VRF unit 2302 was installed.

In some embodiments, MPM system 602 managing the maintenance of VRF system 2300 may be configured to implement budgetary constraints when determining the optimal maintenance strategy for the VRF system 2300. The budgetary constraints may include hard budgetary constraints, soft budgetary constraints, or some combination of hard budgetary constraints and soft budgetary constraints, according to various embodiments. In some embodiments, a hard budgetary constraint may be a maximum maintenance budget such that maintenance expenditures for a time period (e.g., a budget period) during an optimization period are not exceeded. In some embodiments, the hard budgetary constraint may be similar to and/or the same as the hard budgetary constraint described with reference to FIG. 14A. In some embodiments, a soft budgetary constraint may include a penalty cost that can be added during optimization of the objective function J for a difference between a maintenance budget and an actual amount spent on maintenance for a time period during the optimization period. In some embodiments, the soft budgetary constraints may be similar to and/or the same as the soft budgetary constraint described with reference to FIG. 14A. In some embodiments, while determining the optimal maintenance strategy for the VRF system 2300, the hard budgetary constraint(s) and/or the soft budgetary constraint(s) may alter the values of decision variables in order to fit within the constraints while optimizing the objective function J.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A model predictive maintenance system for building equipment, the model predictive maintenance system comprising:
processing circuitry configured to:
predict a cost of operating the building equipment over a duration of an optimization period;
generate one or more budget constraints defining a maintenance budget;
optimize an objective function to determine a maintenance schedule for the building equipment and operating decisions for the building equipment, the objective function comprising maintenance costs of the building equipment, the predicted cost of operating the building equipment, and a penalty cost term based on the maintenance costs of the building equipment relative to the maintenance budget; and
control the building equipment by generating electronic control signals based on the operating decisions for the building equipment and causing the building equipment to affect a variable state or condition in a building using the electronic control signals.

2. The model predictive maintenance system of claim 1, wherein:
the maintenance budget comprises a budget for at least one of servicing the building equipment, repairing the building equipment, or replacing the building equipment;
the maintenance schedule comprises a schedule for at least one of servicing the building equipment, repairing the building equipment, or replacing the building equipment; and
the maintenance costs comprise predicted costs of at least one of servicing the building equipment, repairing the building equipment, or replacing the building equipment.

3. The model predictive maintenance system of claim 1, wherein the one or more budget constraints require the penalty cost term to be at least one of:
greater than or equal to a product of (1) a first penalty rate associated with spending more than the maintenance budget and (2) a difference between an amount spent on maintaining the building equipment and the maintenance budget; or
greater than or equal to a product of (1) a second penalty rate associated with spending less than the maintenance budget and (2) the difference between the amount spent on maintaining the building equipment and the maintenance budget.

4. The model predictive maintenance system of claim 1, wherein the processing circuitry is further configured to dynamically update the objective function on a real-time basis based on closed-loop feedback from the building equipment.

5. The model predictive maintenance system of claim 1, wherein the one or more budget constraints are generated based on one or more budget time periods and respective one or more maintenance budgets associated with the one or more budget time periods.

6. The model predictive maintenance system of claim 5, wherein the one or more budget constraints indicate that the maintenance costs over each of the one or more budget time periods cannot exceed the maintenance budget associated with each of the one or more budget time periods.

7. The model predictive maintenance system of claim 5, wherein the processing circuitry configured to:
 determine whether one or more of the one or more budget time periods occur partially outside the optimization period; and
 in response to a determination that one or more of the one or more budget time periods occur partially outside the optimization period, determine one or more reduced maintenance budgets for each of the one or more of the one or more budget time periods that occur partially outside the optimization period.

8. A method for performing model predictive maintenance for building equipment, the method comprising:
 operating the building equipment to affect a variable state or condition in a building;
 predicting a cost of operating the building equipment over a duration of an optimization period;
 generating one or more budget constraints defining a maintenance budget;
 optimizing an objective function to determine a maintenance schedule for the building equipment and operating decisions for the building equipment, the objective function comprising maintenance costs of the building equipment, the predicted cost of operating the building equipment, and a penalty cost term based on the maintenance costs of the building equipment relative to the maintenance budget; and
 controlling the building equipment by generating electronic control signals based on the operating decisions for the building equipment and causing the building equipment to affect a variable state or condition in the building using the electronic control signals.

9. The method of claim 8, wherein:
 the maintenance budget comprises a budget for at least one of servicing the building equipment, repairing the building equipment, or replacing the building equipment;
 the maintenance schedule comprises a schedule for at least one of servicing the building equipment, repairing the building equipment, or replacing the building equipment; and
 the maintenance costs comprise predicted costs of at least one of servicing the building equipment, repairing the building equipment, or replacing the building equipment.

10. The method of claim 8, wherein the one or more budget constraints require the penalty cost term to be at least one of:
 greater than or equal to a product of (1) a first penalty rate associated with spending more than the maintenance budget and (2) a difference between an amount spent on maintaining the building equipment and the maintenance budget; or
 greater than or equal to a product of (1) a second penalty rate associated with spending less than the maintenance budget and (2) the difference between the amount spent on maintaining the building equipment and the maintenance budget.

11. The method of claim 8, further comprising dynamically updating the objective function on a real-time basis based on closed-loop feedback from the building equipment.

12. The method of claim 8, wherein the one or more budget constraints are generated based on one or more budget time periods and a respective one or more maintenance budgets associated with the one or more budget time periods.

13. The method of claim 12, wherein the one or more budget constraints indicate that the maintenance costs over each of the one or more budget time periods cannot exceed the maintenance budget associated with each of the one or more budget time periods.

14. One or more non-transitory computer-readable storage media having computer-executable instructions stored thereon that, when executed by one or more processors of a model predictive maintenance system, cause the model predictive maintenance system to perform operations comprising:
 operating building equipment to affect a variable state or condition in a building;
 predicting a cost of operating the building equipment over a duration of an optimization period;
 generating one or more budget constraints defining a maintenance budget;
 optimizing an objective function to determine a maintenance schedule for the building equipment and operating decisions for the building equipment, the objective function comprising maintenance costs of the building equipment, the predicted cost of operating the building equipment, and a penalty cost term based on the maintenance costs of the building equipment relative to the maintenance budget; and
 controlling the building equipment by generating electronic control signals based on the operating decisions for the building equipment and causing the building equipment to affect a variable state or condition in the building using the electronic control signals.

15. The non-transitory computer-readable storage media of claim 14, wherein:
 the maintenance budget comprises a budget for at least one of servicing the building equipment, repairing the building equipment, or replacing the building equipment;
 the maintenance schedule comprises a schedule for at least one of servicing the building equipment, repairing the building equipment, or replacing the building equipment; and
 the maintenance costs comprise predicted costs of at least one of servicing the building equipment, repairing the building equipment, or replacing the building equipment.

16. The non-transitory computer-readable storage media of claim 14, wherein the one or more budget constraints require the penalty cost term to be at least one of:
 greater than or equal to a product of (1) a first penalty rate associated with spending more than the maintenance budget and (2) a difference between an amount spent on maintaining the building equipment and the maintenance budget; or greater than or equal to a product of (1) a second penalty rate associated with spending less than the maintenance budget and (2) the difference between the amount spent on maintaining the building equipment and the maintenance budget.

17. The non-transitory computer-readable storage media of claim 14, wherein the operations further comprise dynamically updating the objective function on a real-time basis based on closed-loop feedback from the building equipment.

18. The non-transitory computer-readable storage media of claim 14, wherein the one or more budget constraints are generated based on one or more budget time periods and respective one or more maintenance budgets associated with the one or more budget time periods.

19. The non-transitory computer-readable storage media of claim 18, wherein the one or more budget constraints indicate that the maintenance costs over each of the one or more budget time periods cannot exceed the maintenance budget associated with each of the one or more budget time periods.

20. The non-transitory computer-readable storage media of claim 18, wherein the operations further comprise:
  determining whether one or more of the one or more budget time periods occur partially outside the optimization period, and
  in response to a determination that one or more of the one or more budget time periods occur partially outside the optimization period, determining one or more reduced maintenance budgets for each of the one or more of the one or more budget time periods that occur partially outside the optimization period.

* * * * *